(12) United States Patent
Bauman et al.

(10) Patent No.: US 11,858,743 B2
(45) Date of Patent: Jan. 2, 2024

(54) METHOD FOR THE ORDER-PICKING OF ARTICLES, AND ORDER-PICKING STATION

(71) Applicant: TGW Logistics Group GmbH, Marchtrenk (AT)

(72) Inventors: Alexander Bauman, Wels (AT); Timothy Lindley, Schwerte (DE); Harald Johannes Schroepf, Wels (AT); Matthias Stoetzner, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 1374 days.

(21) Appl. No.: 16/315,673

(22) PCT Filed: Jul. 6, 2017

(86) PCT No.: PCT/AT2017/060168
§ 371 (c)(1),
(2) Date: May 28, 2019

(87) PCT Pub. No.: WO2018/006112
PCT Pub. Date: Jan. 11, 2018

(65) Prior Publication Data
US 2023/0002161 A1    Jan. 5, 2023

(30) Foreign Application Priority Data
Jul. 8, 2016  (AT) .............................. A 50610/2016

(51) Int. Cl.
*B65G 1/137*       (2006.01)
*B65G 47/48*      (2006.01)
(Continued)

(52) U.S. Cl.
CPC ............ *B65G 1/1378* (2013.01); *B07C 3/008* (2013.01); *B07C 3/08* (2013.01); *B65G 47/48* (2013.01)

(58) Field of Classification Search
CPC .. B65G 1/1378; B65G 47/48; B65G 47/5186; B07C 3/008; B07C 3/08
See application file for complete search history.

(56) References Cited

U.S. PATENT DOCUMENTS 8,560,114 B2   10/2013   Suess et al.
8,634,954 B2    1/2014   Schaefer
(Continued)

FOREIGN PATENT DOCUMENTS

AT         14 694 U1      4/2016
CN         103942665 A    7/2014
(Continued)

OTHER PUBLICATIONS

International Search Report of PCT/AT2017/060168, dated Nov. 30, 2017.

*Primary Examiner* — Thomas Randazzo
(74) *Attorney, Agent, or Firm* — Collard & Roe, P.C.

(57) ABSTRACT

The invention relates to a method for order picking of items at a picking station, wherein the source containers (5) are transported to a retrieval position (33) in an arbitrary sequence, and the target containers (27) are provided in a sorting buffer (36) with buffer positions (39) ahead of a single loading position (35). A first target container is transported back into the sorting buffer for processing of different order lines after placement of an item for a first order line, and is temporarily buffered at a sorting position (42) until a source container with an item for a second order line is conveyed onward into a buffer track section (23) provided upstream of the retrieval position. A second target container is transported back into the sorting buffer for processing of different order lines after placement of an item for a first order line, and is moved via a second sorting position to one of the buffer positions and subsequently to the loading position if a source container with an item for a (Continued)

Figure 3E:
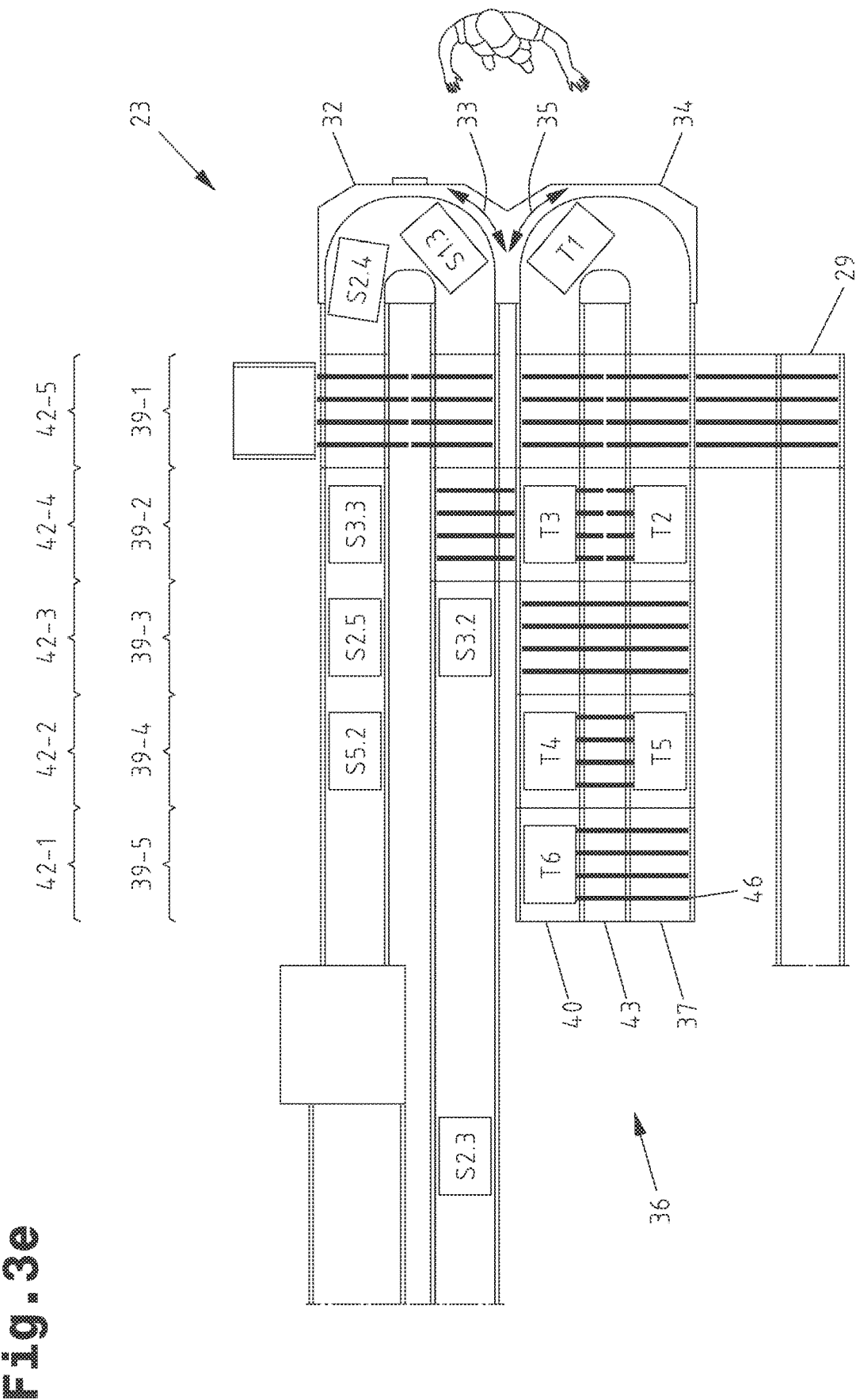

second order line has already been transported into the buffer track section. In addition, the invention relates to a picking station.

30 Claims, 33 Drawing Sheets

(51) Int. Cl.
 *B07C 3/00* (2006.01)
 *B07C 3/08* (2006.01)

(56) References Cited

U.S. PATENT DOCUMENTS

| | | | |
|---|---|---|---|
| 8,646,708 | B2 | 2/2014 | Halla |
| 8,713,899 | B2 | 5/2014 | Hortig et al. |
| 9,499,349 | B2 | 11/2016 | Hansl et al. |
| 9,771,218 | B2 | 9/2017 | Meurer |
| 9,950,863 | B2 | 4/2018 | O'Brien et al. |
| 2004/0243278 | A1 | 12/2004 | Leishman |
| 2011/0203231 | A1* | 8/2011 | Hortig .............. B65B 67/02 53/235 |
| 2015/0104286 | A1 | 4/2015 | Hansl et al. |
| 2015/0336741 | A1 | 11/2015 | Ahammer et al. |
| 2015/0378345 | A1* | 12/2015 | Winkler .............. G05B 19/19 700/216 |
| 2017/0278055 | A1 | 9/2017 | Winkler |
| 2018/0009605 | A1* | 1/2018 | Collin .............. B65G 1/1378 |
| 2018/0251303 | A1 | 9/2018 | Mathi et al. |

FOREIGN PATENT DOCUMENTS

| | | |
|---|---|---|
| CN | 104159837 B | 5/2016 |
| DE | 102 00 077 A1 | 12/2002 |
| DE | 10 2014 102 092 A1 | 8/2015 |
| DE | 10 2014 115 579 A1 | 4/2016 |
| EP | 0 860 382 A1 | 8/1998 |
| EP | 767 472 A1 | 3/2007 |
| EP | 2 098 464 B1 | 5/2011 |
| EP | 2 826 730 A1 | 1/2015 |
| EP | 2 173 644 B1 | 9/2015 |
| EP | 3 015 404 A1 | 5/2016 |
| JP | S54/131278 A | 10/1979 |
| JP | 2008-037567 A | 2/2008 |
| JP | 2010202291 A | 9/2010 |
| WO | 2010/127769 A1 | 11/2010 |
| WO | 2011/001034 A1 | 1/2011 |
| WO | 2011/103404 A1 | 8/2011 |
| WO | 2013/033744 A1 | 3/2013 |
| WO | 2013/033745 A1 | 3/2013 |
| WO | 2013/090962 A1 | 6/2013 |
| WO | 2013/090970 A2 | 6/2013 |
| WO | 2016/138101 A1 | 9/2016 |

\* cited by examiner

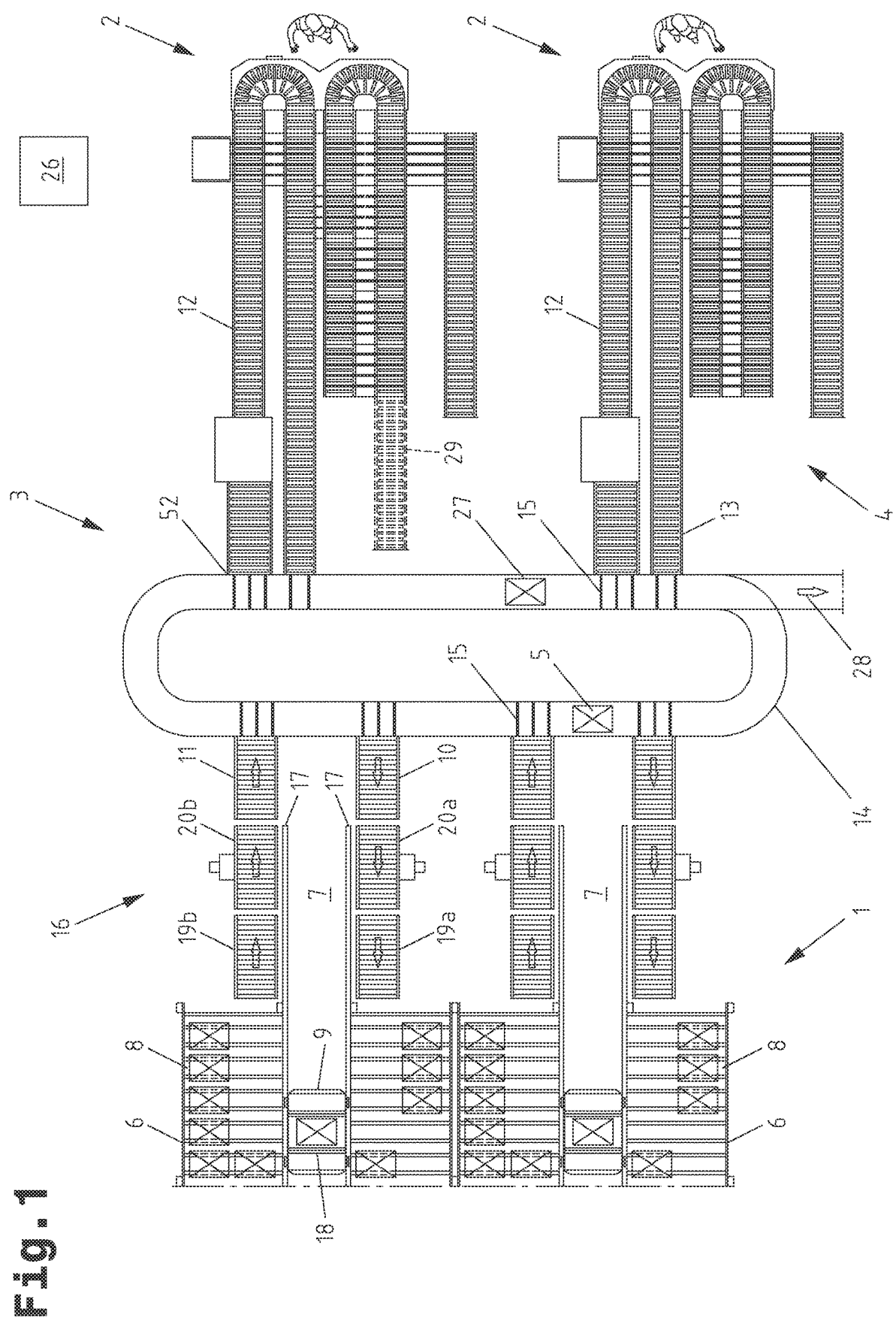

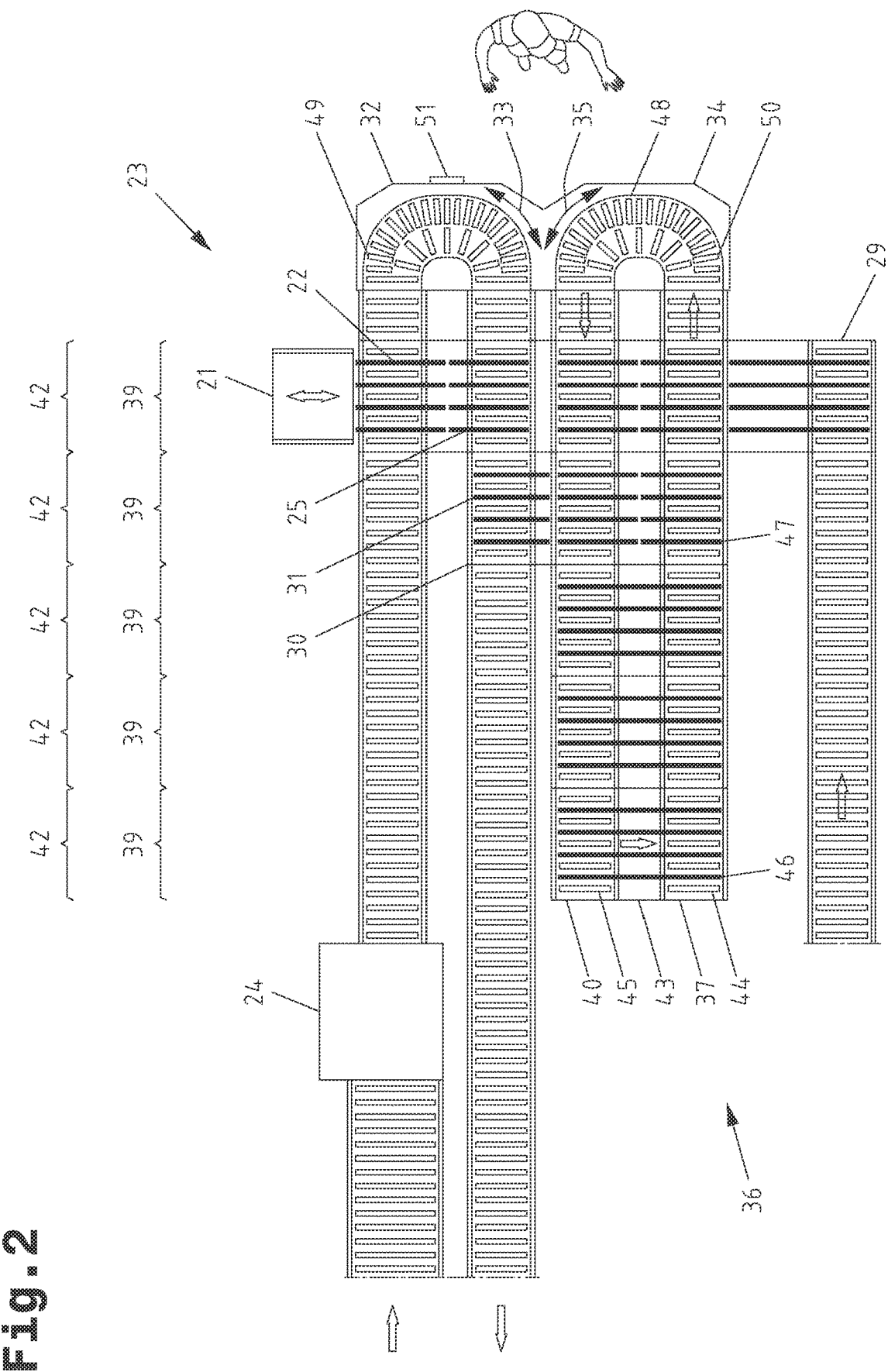

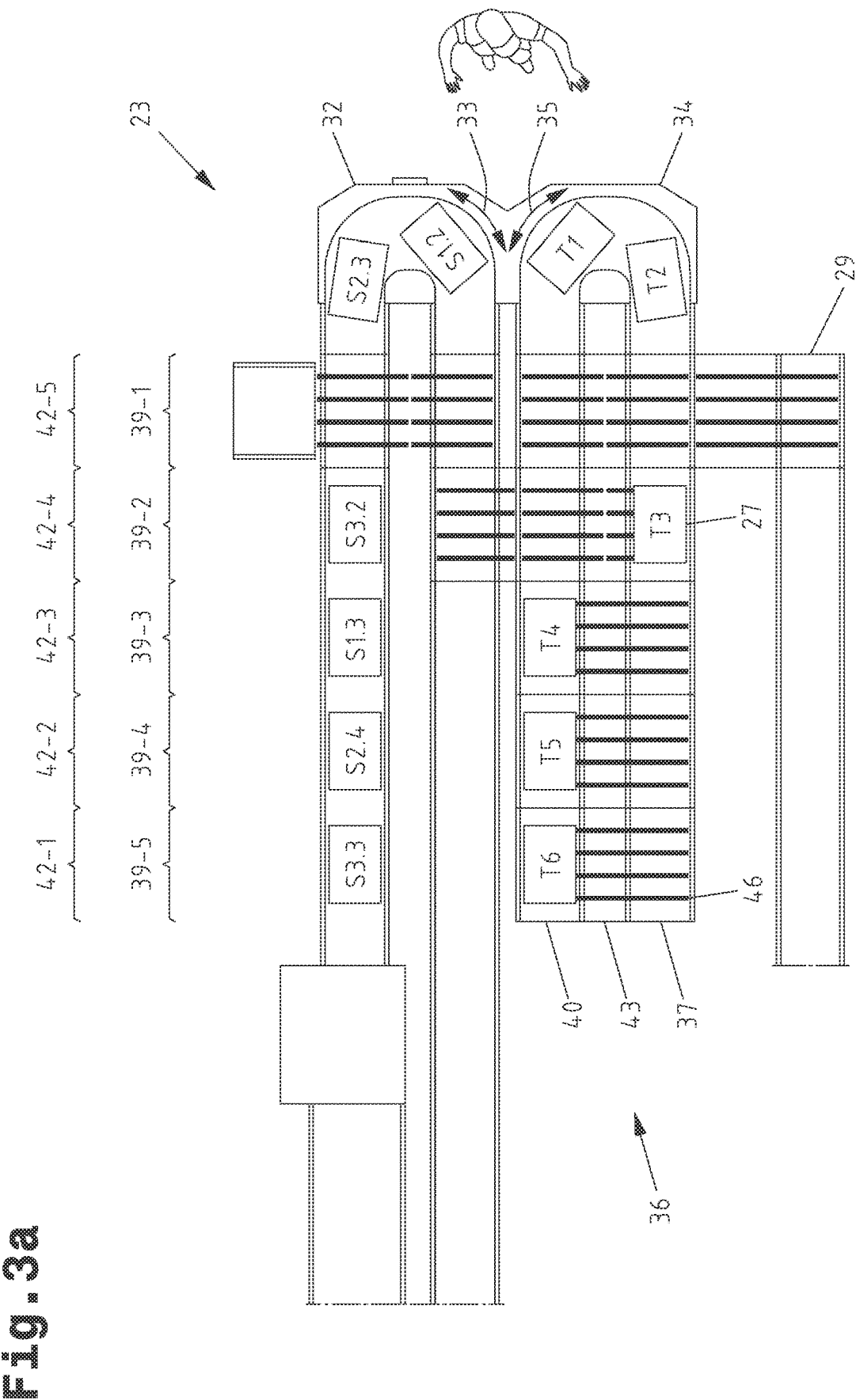

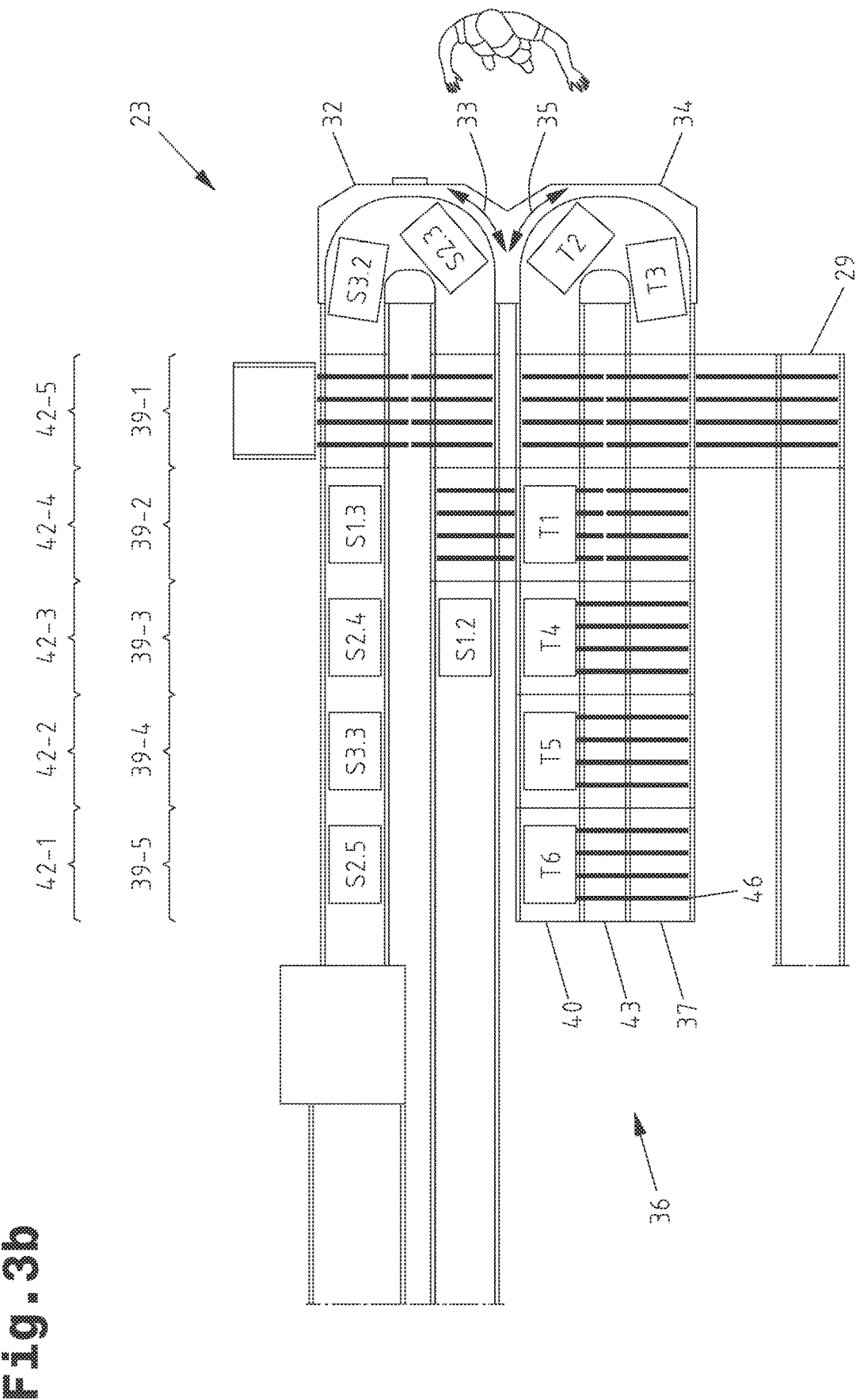

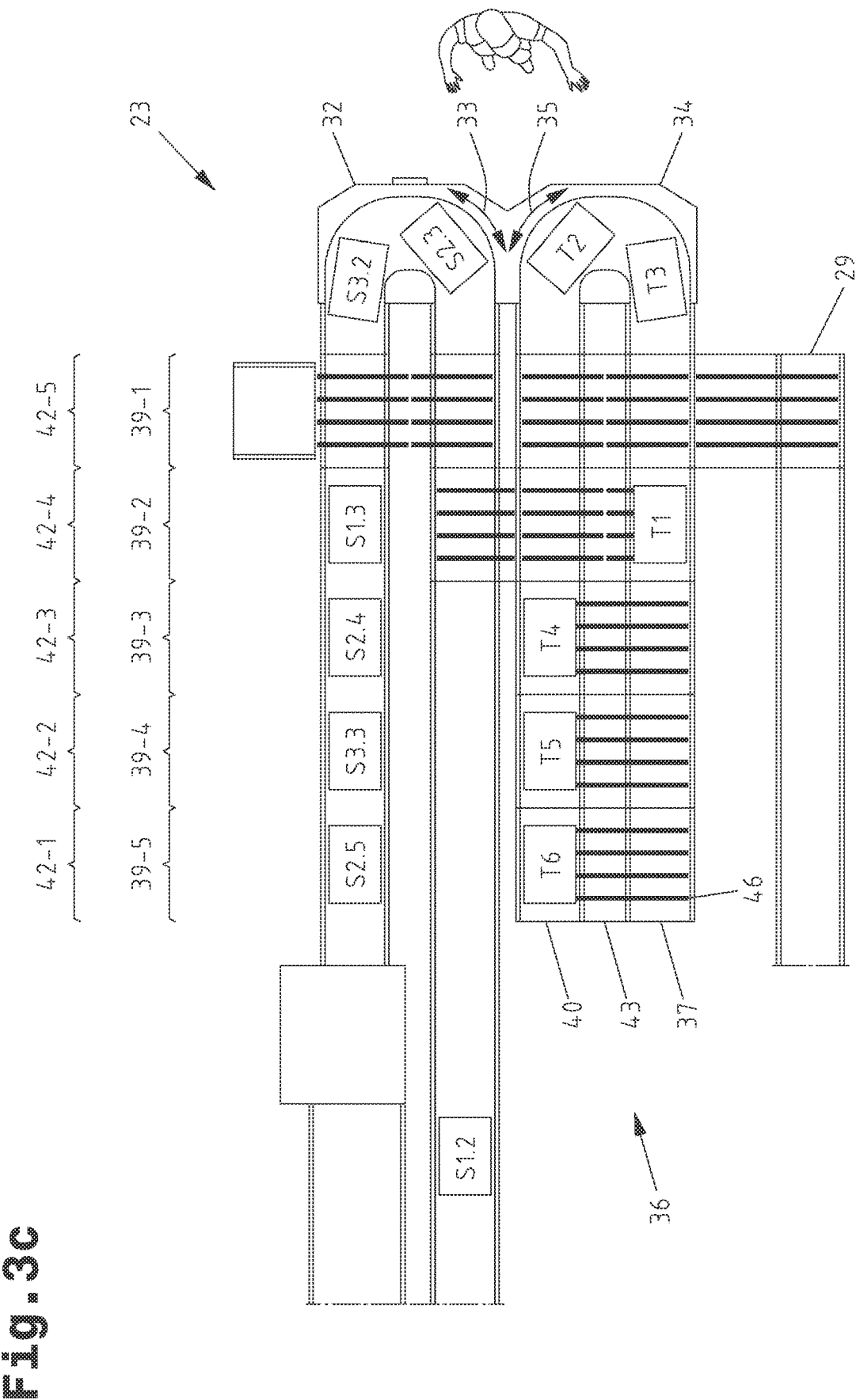

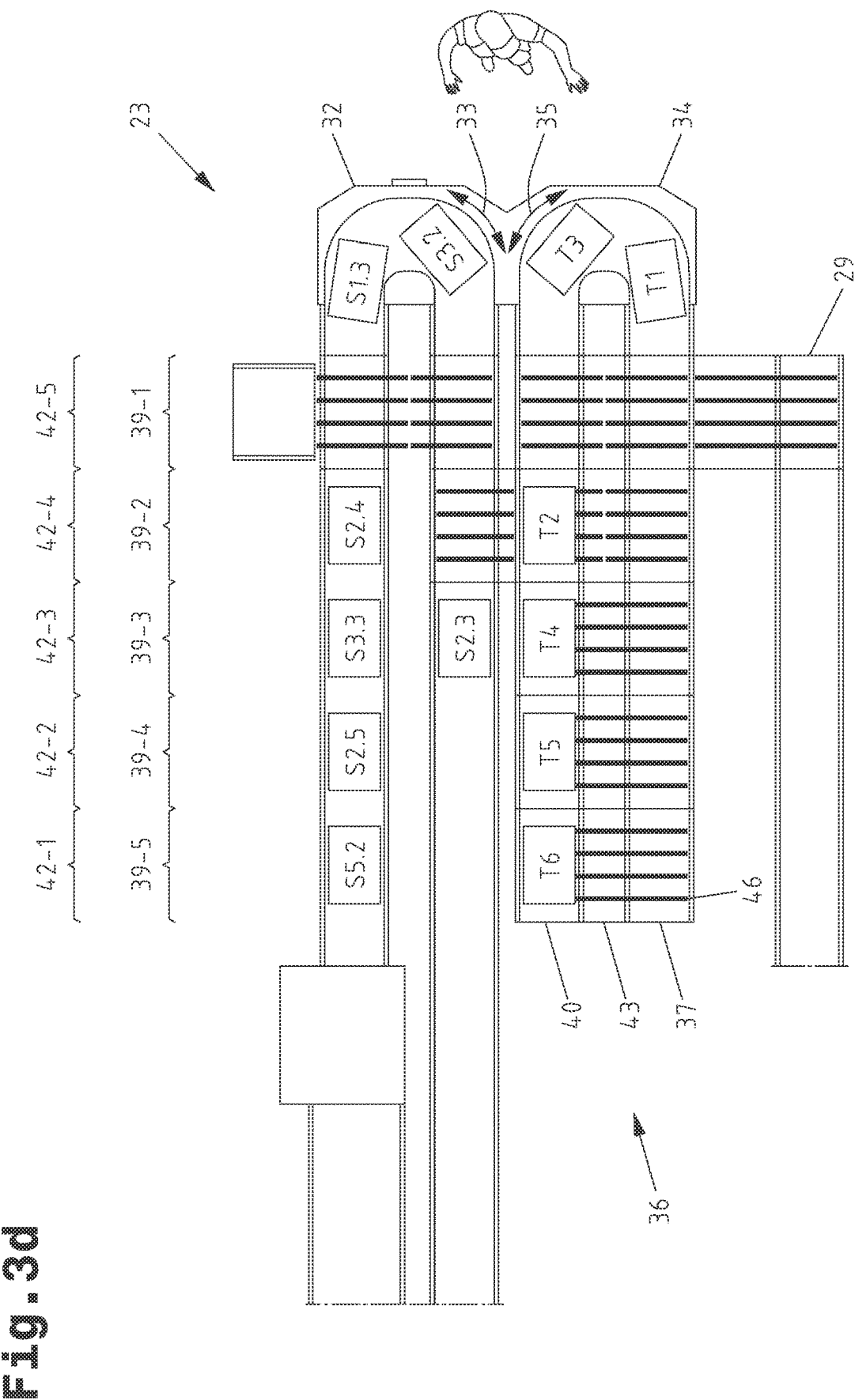

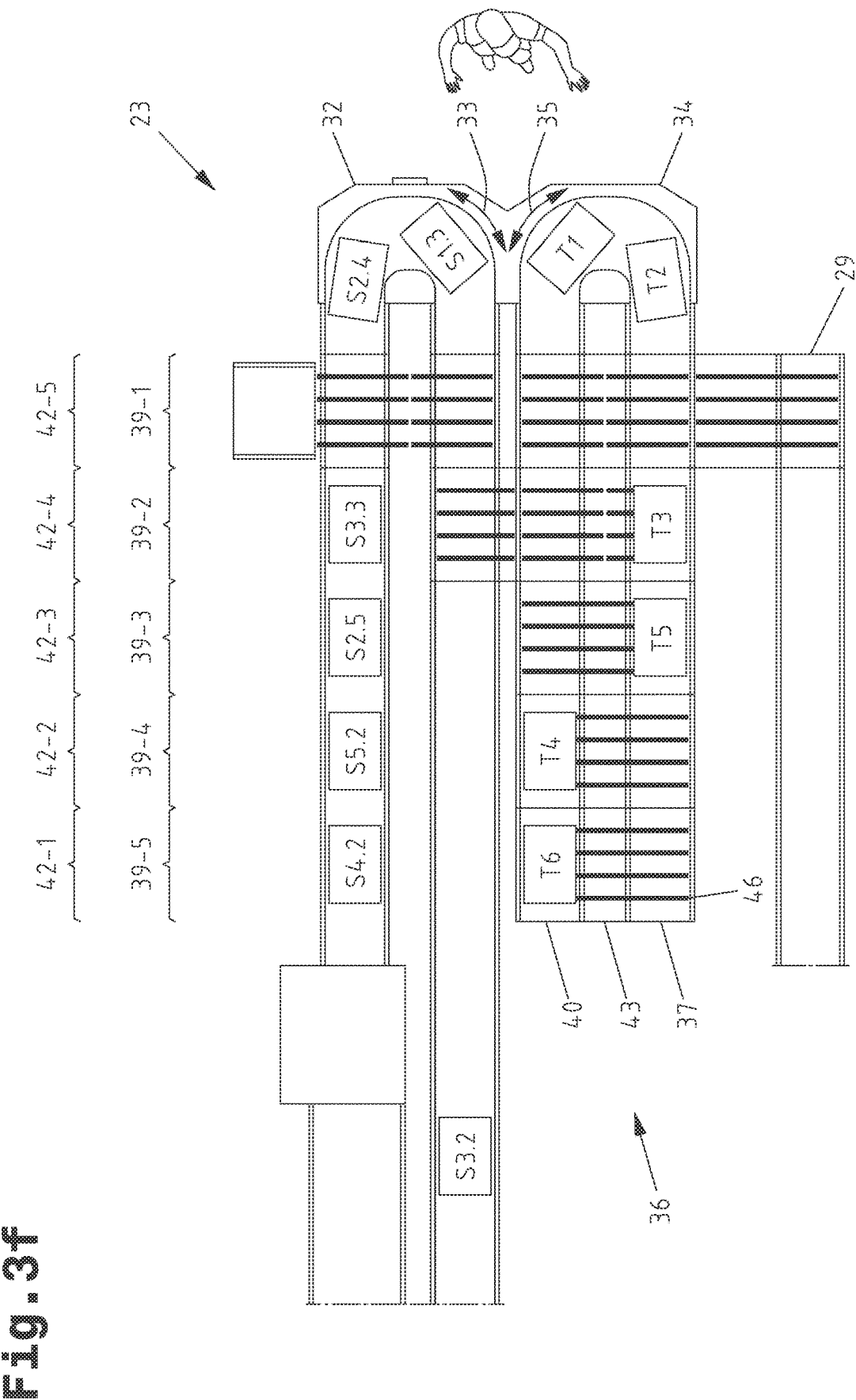

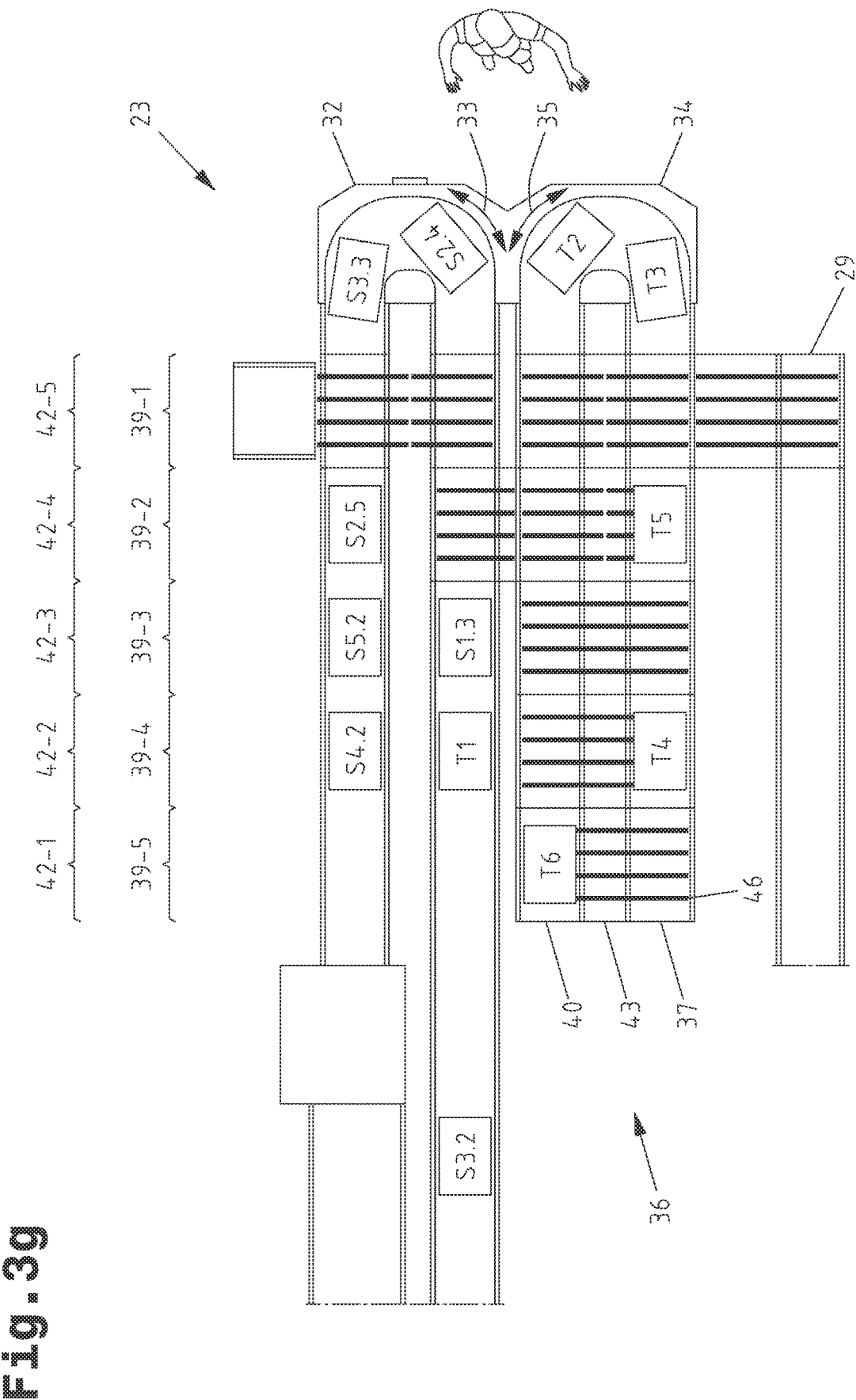

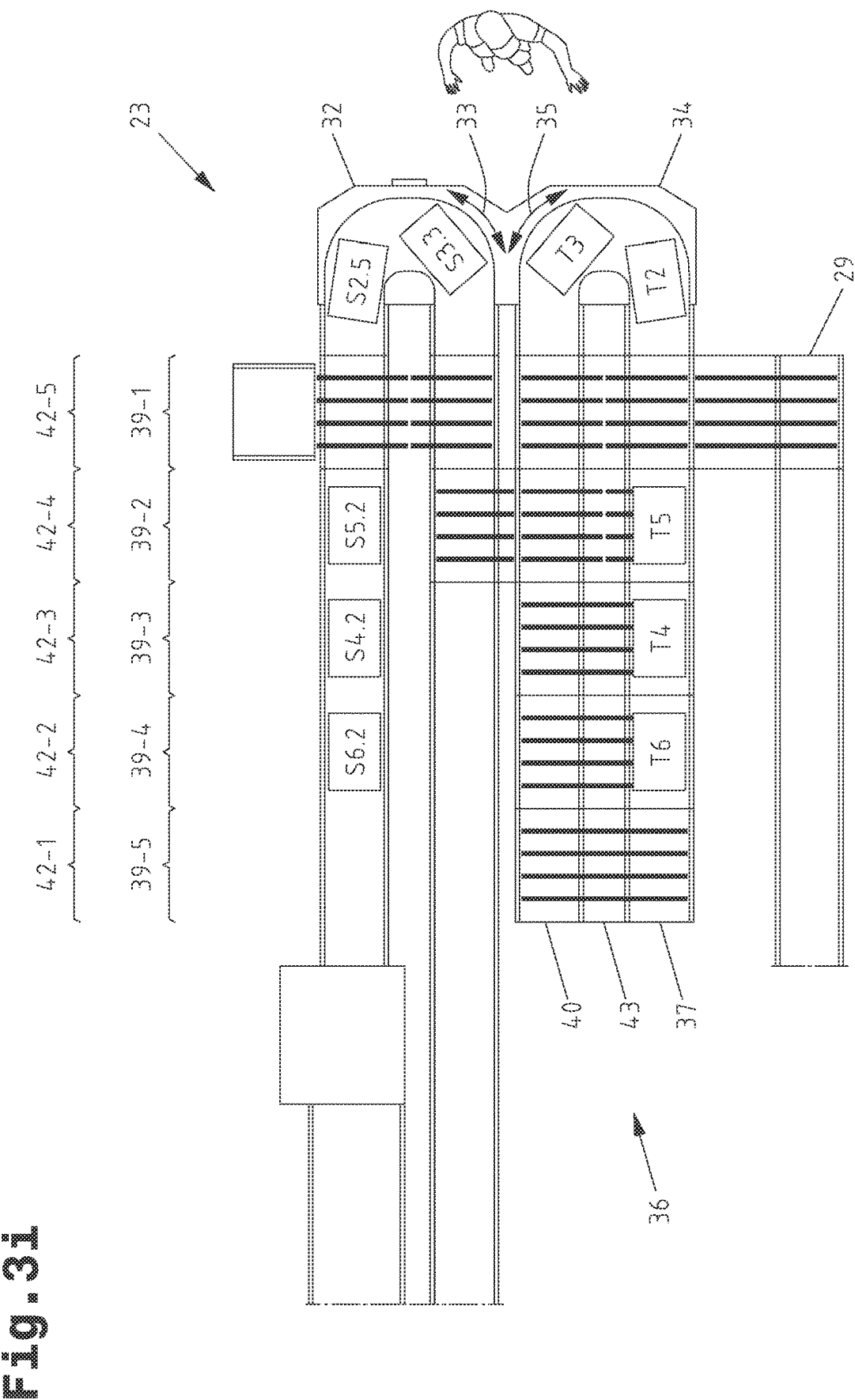

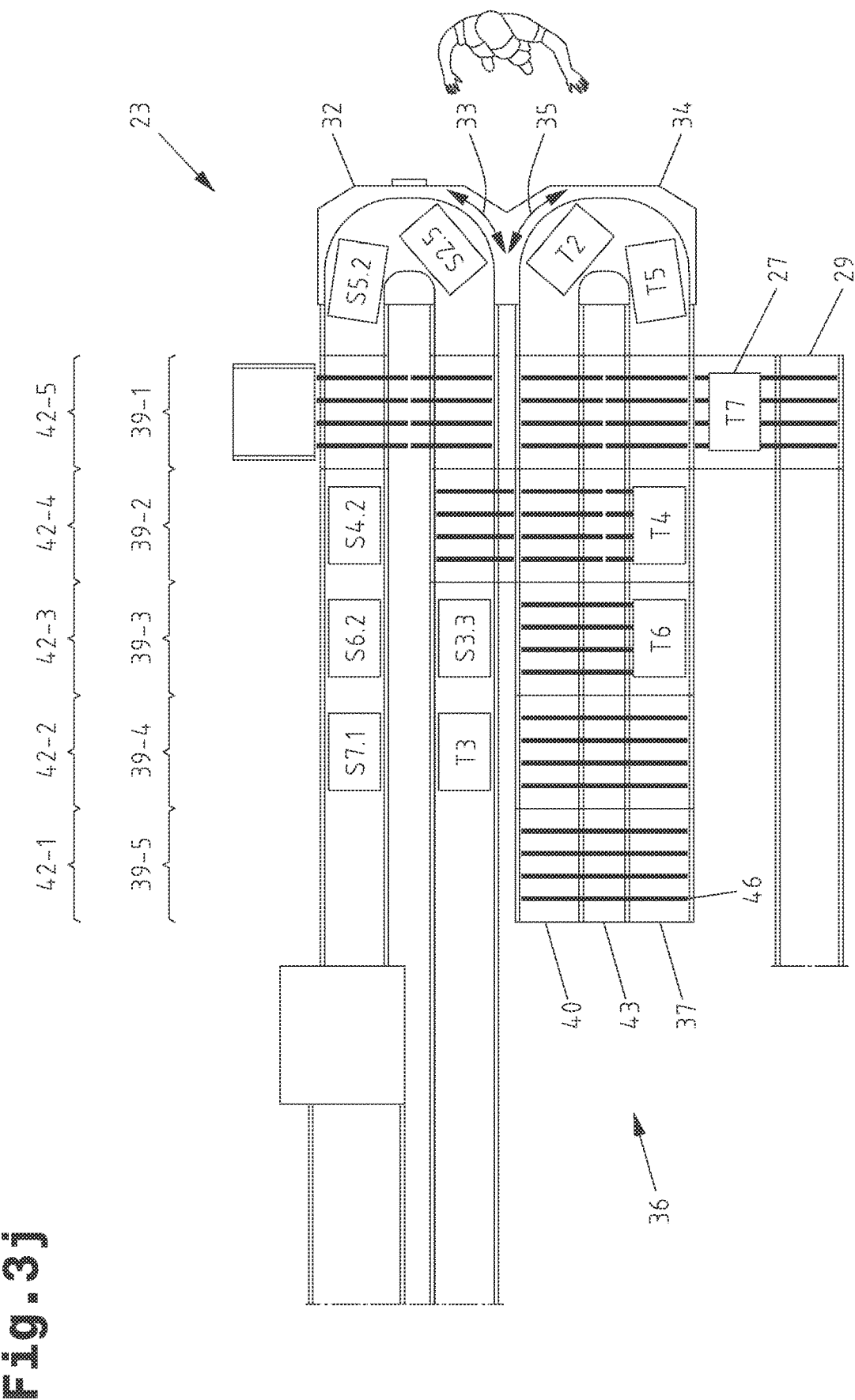

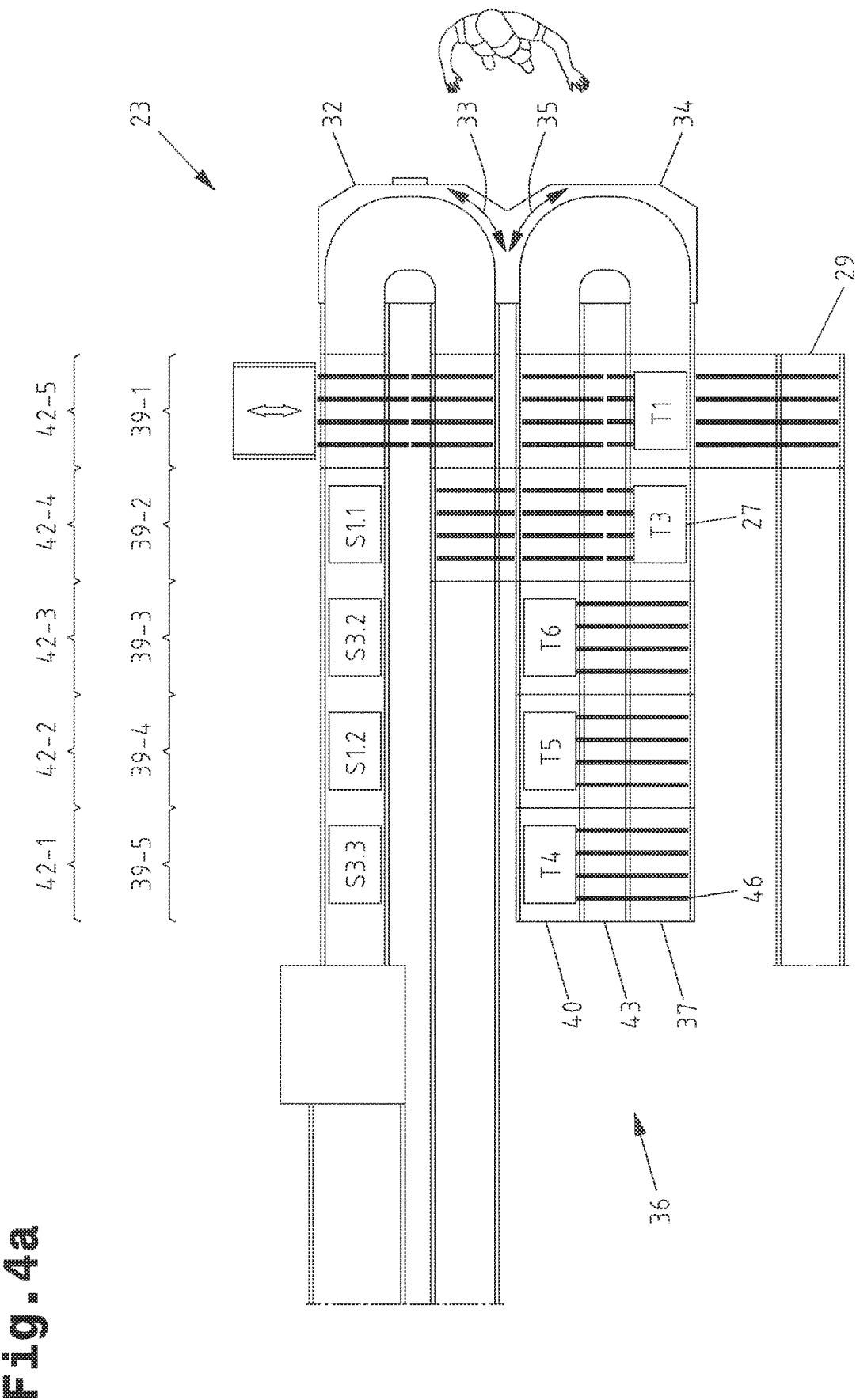

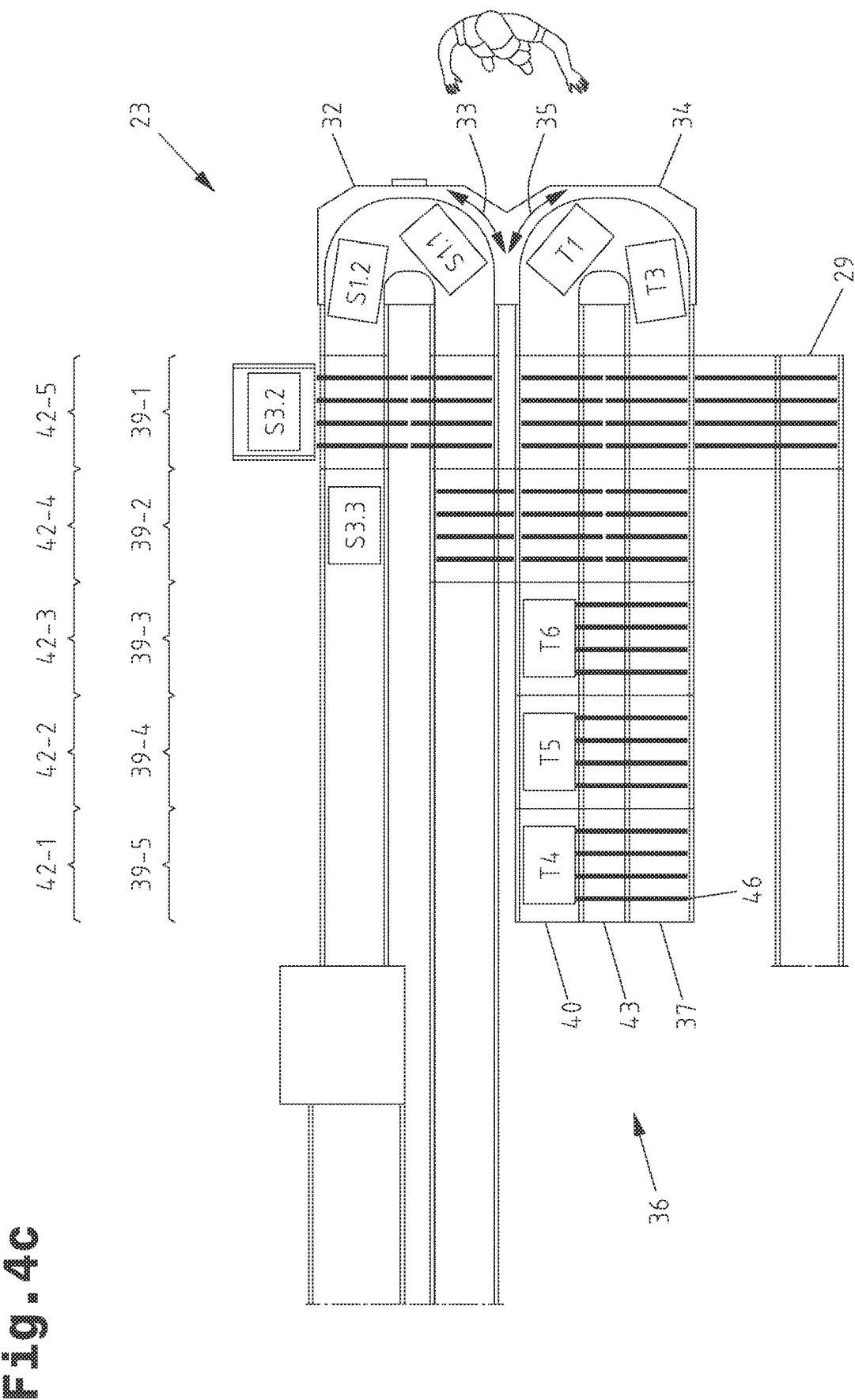

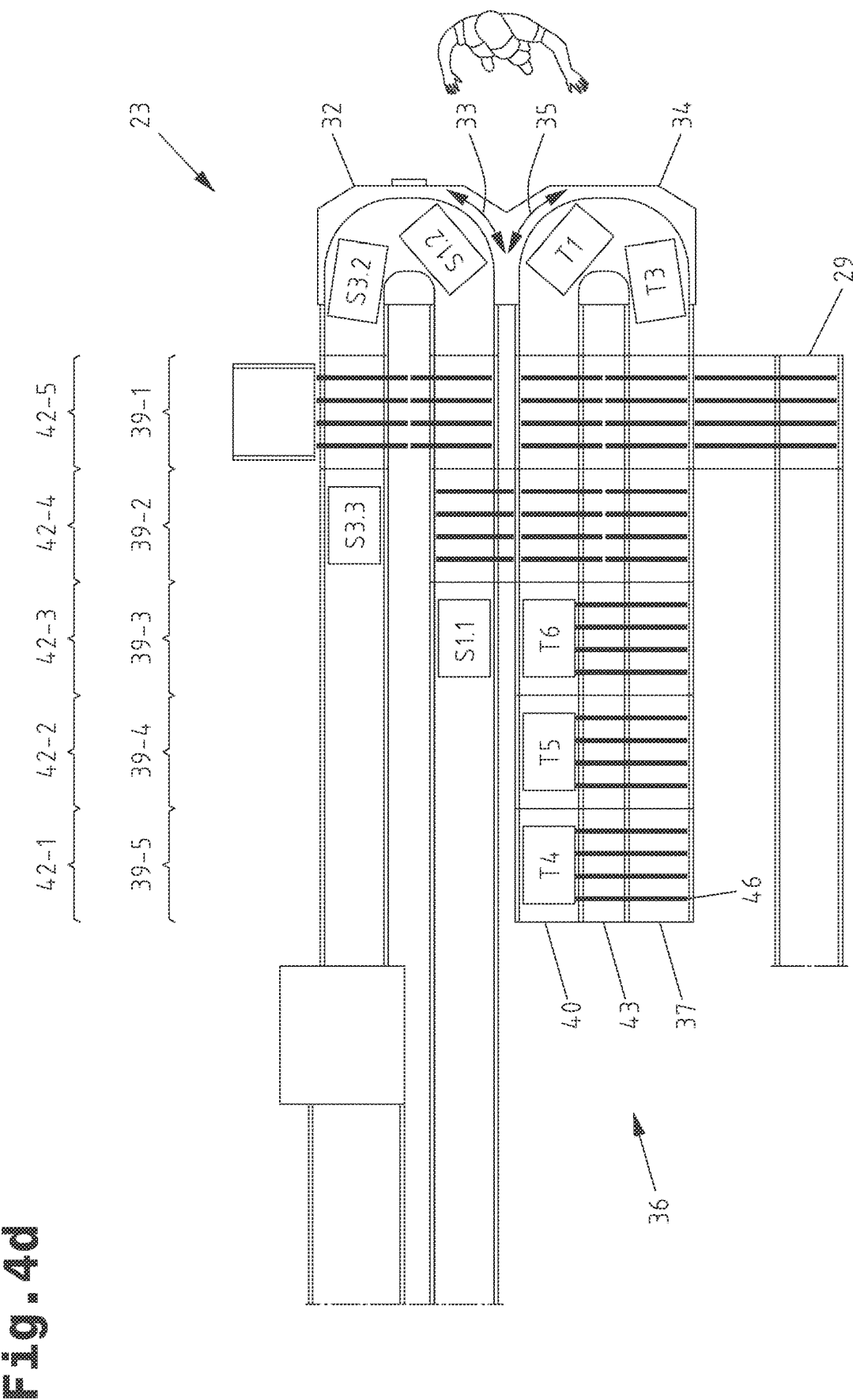

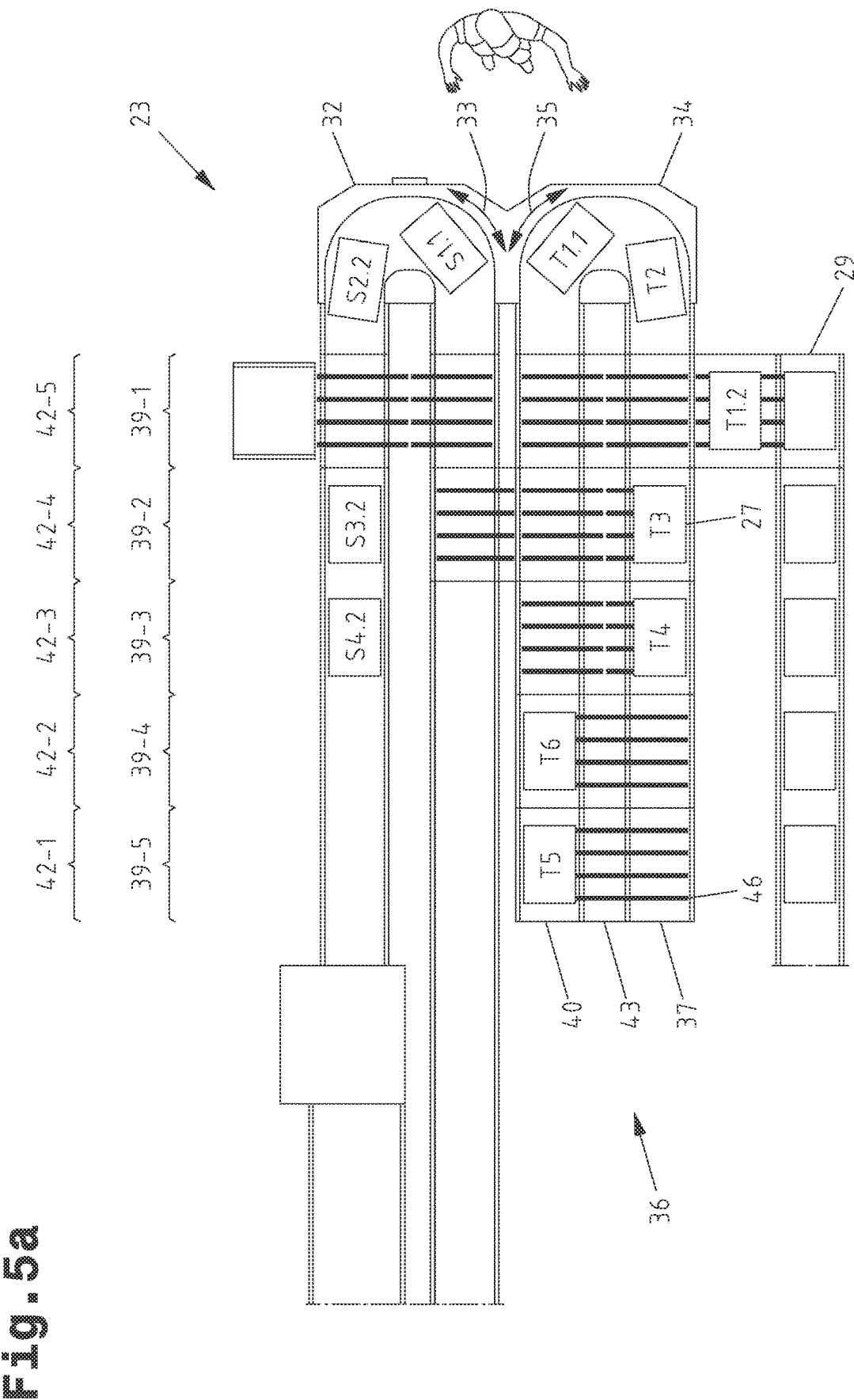

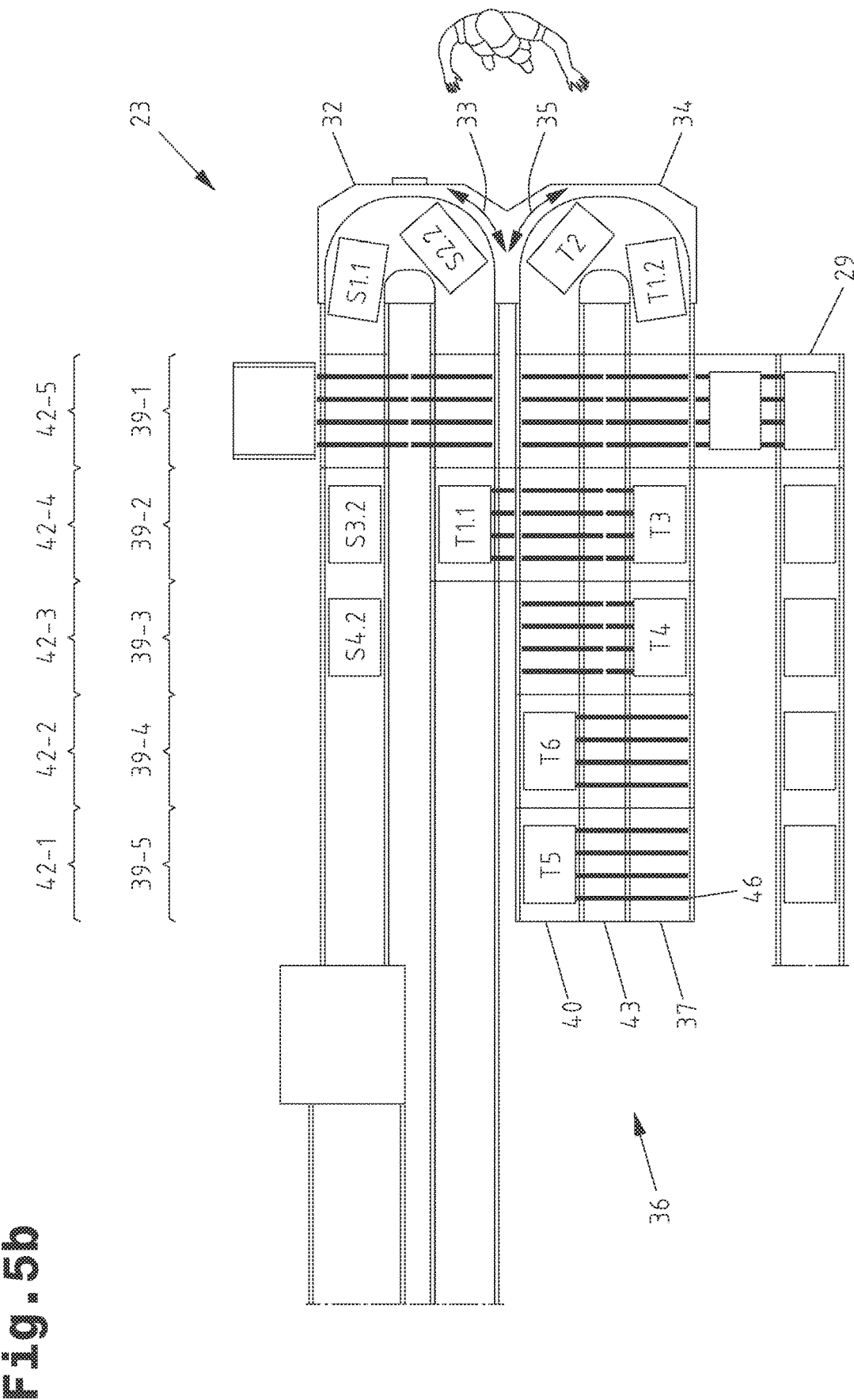

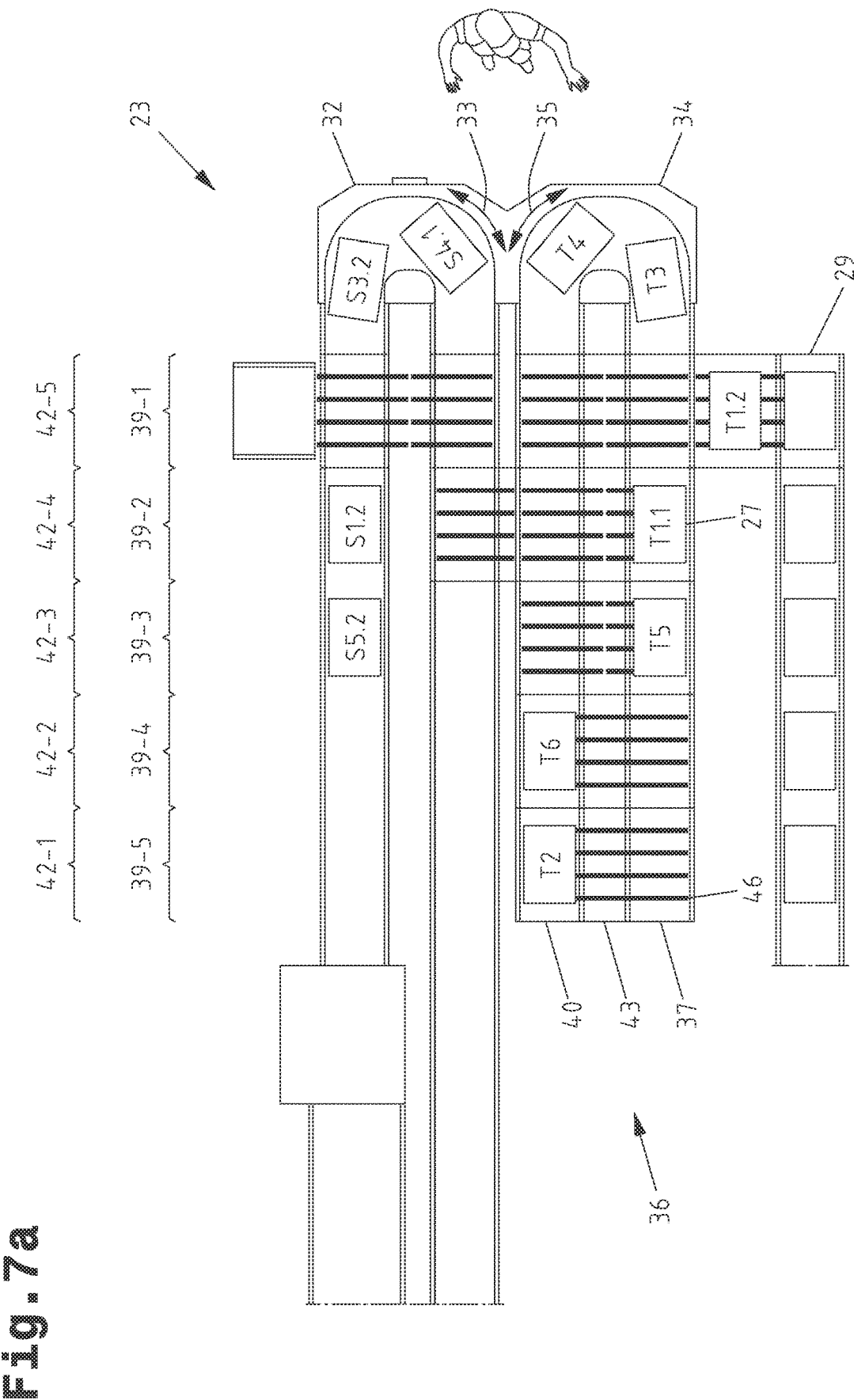

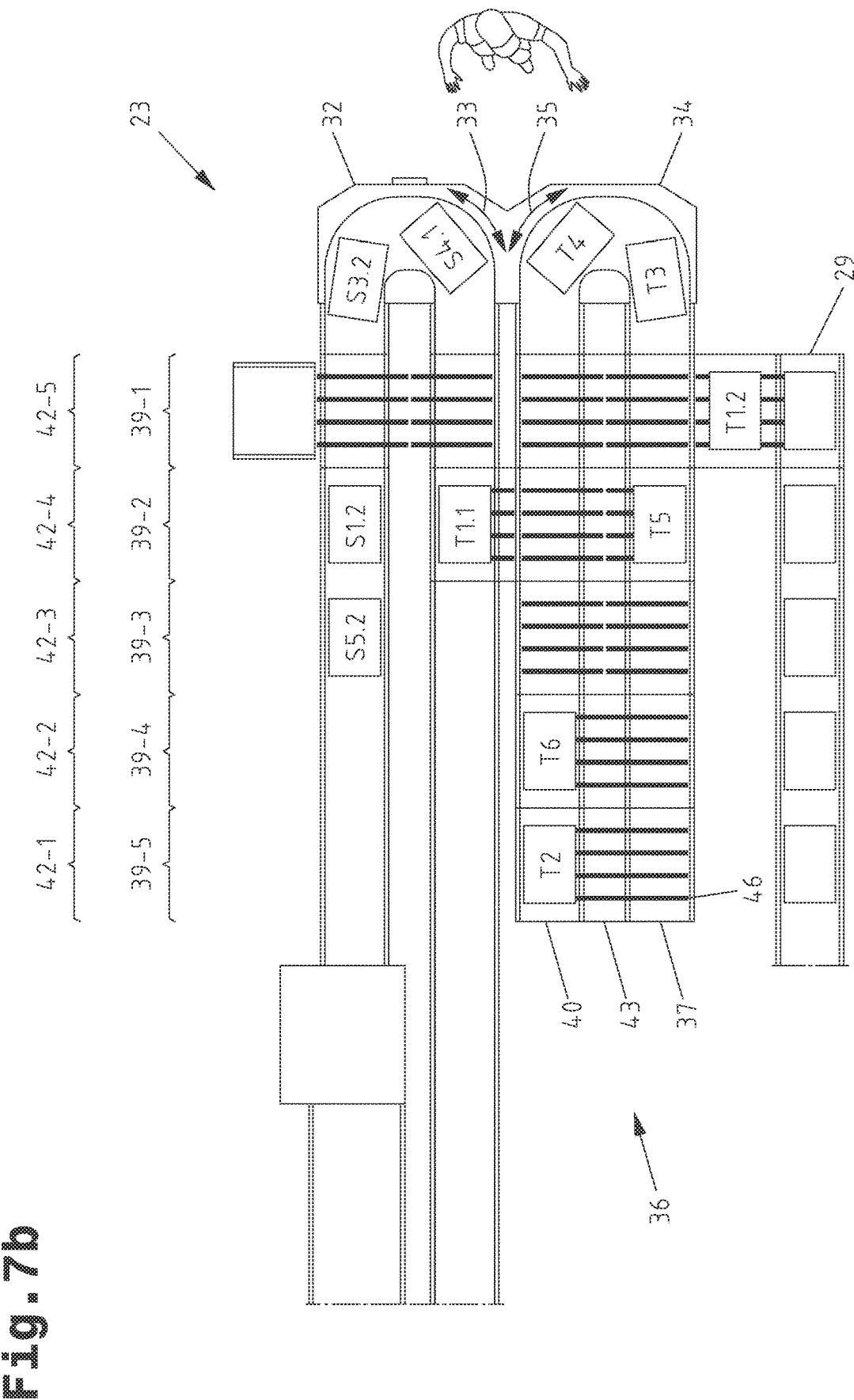

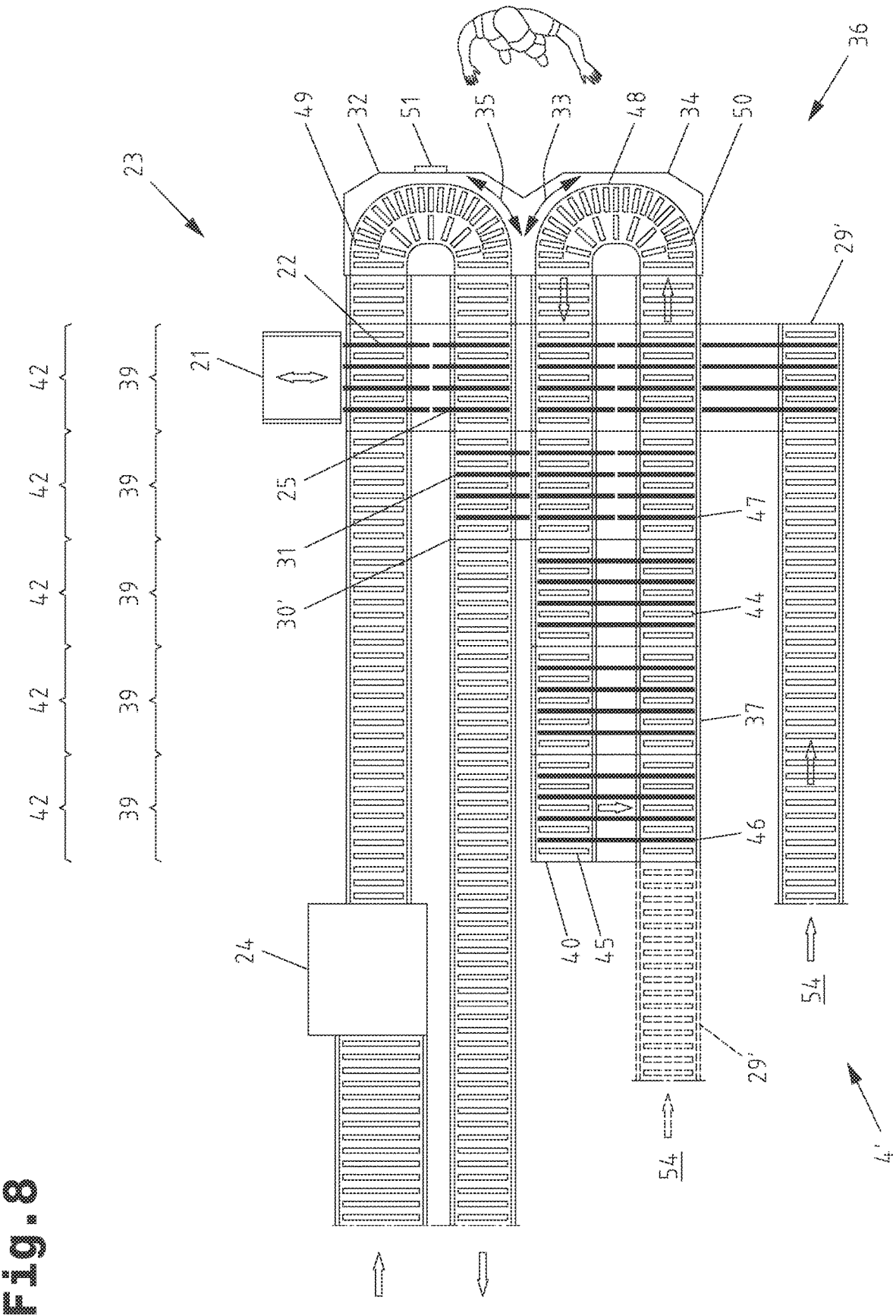

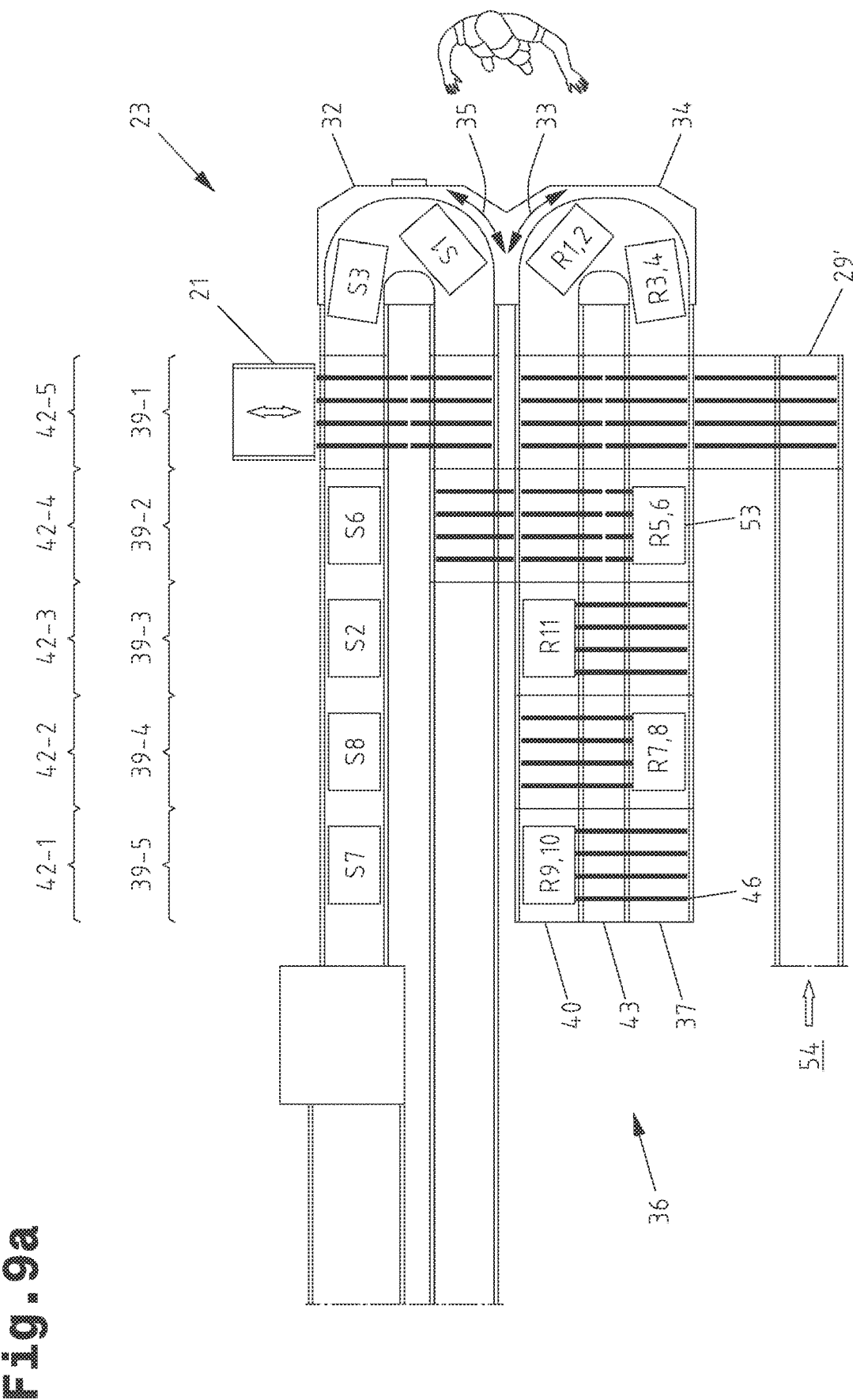

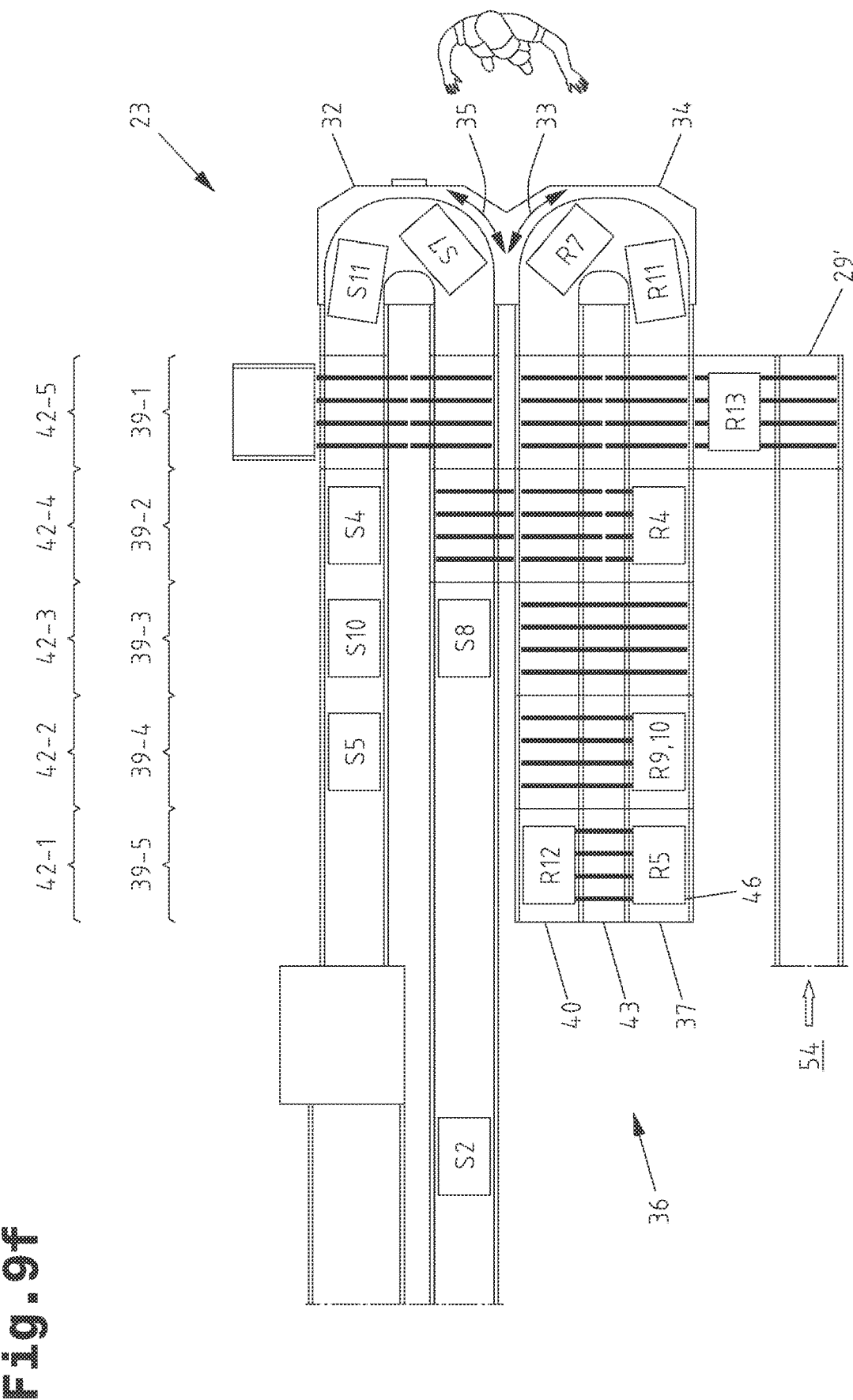

METHOD FOR THE ORDER-PICKING OF ARTICLES, AND ORDER-PICKING STATION

CROSS REFERENCE TO RELATED APPLICATIONS

This application is the National Stage of PCT/AT2017/060168 filed on Jul. 6, 2017, which claims priority under 35 U.S.C. § 119 of Austrian Application No. A 50610/2016 filed on Jul. 8, 2016, the disclosure of which is incorporated by reference. The international application under PCT article 21(2) was not published in English.

The invention relates to a method for order picking of items, in particular inventory items or returned items, and to a picking station for carrying out the method, as described in the preambles of claims 1, 11, 19, and 24.

WO 2011/103404 A1 discloses a method for manual order picking of items at a picking station. In this method, the source containers are retrieved from a warehouse, transported to the picking station, and finally are made available at a (single) retrieval position. The target containers are stored in a sorting buffer, and are delivered in a sequence from the sorting buffer onto a conveyor system, and ultimately are made available sequentially (one after the other) at a (single) loading position. Transport of the source containers from the warehouse to the retrieval position and transport of the target containers from the sorting buffer to the loading position are matched to one another such that a source container and a target container for an order arrive at the retrieval position and loading position approximately simultaneously. The order picking person can retrieve items from the source container that is provided at the retrieval position, and place these items in the target container that is provided at the loading position. The target container is conveyed from the loading position back into the sorting buffer if the order assigned to this target container still contains an unprocessed order line. The order picking person always has a single source container and a single target container at hand. Picking stations of this nature are also called one-to-one picking stations. These are characterized by a high pick rate (approximately 1000 items picked per hour), and a low number of mis-picks. The sorting buffer of the known picking system comprises storage racks and at least one storage and retrieval device that is movable between the storage racks, with which device the target containers can be stored at buffer positions and retrieved from the buffer positions. The great mechanical effort for the sorting buffer and the complexity of the control device are disadvantageous. Furthermore, the target containers must travel long transport paths, for which reason the provision of the target containers takes a relatively long time.

EP 1 767 472 A1 discloses a method for manual order picking of items at a picking station. In this method, the source containers are retrieved from a warehouse, transported to the picking station, and finally are made available at a minimum of two retrieval positions. The target containers are stored in a sorting buffer, and are delivered in a sequence from the sorting buffer onto a conveyor system, and ultimately are made available at least at two loading positions next to one another. At least over relatively short phases of operation, the order picking person has multiple source containers and multiple target containers at hand. Consequently, a high pick rate can be achieved in principle, but a relatively high number of mis-picks must be expected. Furthermore, the target containers must travel long transport paths, for which reason the provision of the target containers takes a relatively long time.

EP 2 098 464 B1 discloses a method for manual order picking of items at a picking station. The source containers are repeatedly delivered to the order picking person in a circulating manner, on a circulating conveyor device, until a predefined number of items is picked into the target containers from the respective source container. The target containers are each repeatedly delivered to the order picking person in a circulating manner on multiple circulating conveyor devices until the items from the delivered source container have been picked in the desired number to the respective target container in circulation. The order picking person always has one source container and multiple target containers at hand.

Similarly, in EP 3 015 404 A1, a method is known for manual picking or returning to stock of items at a picking station, wherein a picking area is divided into picking zones located one behind the other, and each picking zone is assigned a plurality of retrieval positions arranged side by side, one source container being provided at each position. The source containers contain different items. Groups of target containers are moved successively through the picking zones on a target container conveyor system. An order is divided into suborders, and the source containers are delivered to the respective target container group in accordance with the suborders. The order picking person always has multiple source containers and multiple target containers at hand.

From EP 2 173 644 B1, a method is known for picking of returned items at a picking station, wherein the returned items are provided at a delivery position, and each returned item is detected. The returned items are transported from the delivery position to the picking station on a returned-item conveyor system. For each returned item, a source container is identified in which the returned item is placed. The source container is retrieved from a warehouse while the returned item is transported to the picking station.

One task of the invention is therefore to specify an improved method for order picking of items, in particular inventory items or returned items, and an improved picking station for carrying out the method. In particular, efficient picking at the picking station is to be made possible.

The task of the invention is accomplished in that a first target container for processing of different order lines for at least one order is transported back into the sorting buffer after placement of an item for a first order line, and is temporarily buffered at a first sorting position at least until a source container with an item for a second order line is conveyed onward into a buffer track section provided upstream of the retrieval position, and said first target container can be moved from the first sorting position to one of the buffer positions and subsequently to the loading position once the source container having an item for a second order line has been transported into the buffer track section, and a second target container for processing of different order lines for at least one order is transported back into the sorting buffer after placement of an item for a first order line, and is moved through a second sorting position to one of the buffer positions and subsequently to the loading position if a source container with an item for a second order line has already been transported into a buffer track section provided upstream of the retrieval position.

Furthermore, the task of the invention is accomplished in that the sorting buffer has buffer positions arranged one behind the other in a delivery direction on a first conveyor device, and sorting positions arranged one behind the other in a return direction on a second conveyor device, and third conveyor devices connecting the sorting positions to the buffer positions in terms of conveying, and in that the delivery device is configured with the single loading position on a fourth conveyor device, wherein the first conveyor device and the second conveyor device are connected to one another by the fourth conveyor device in order to convey the target containers onward from the sorting buffer to the loading position, and to convey them away from the loading position to the sorting buffer, for processing of different order lines for at least one order, and wherein the first conveyor device has at least one conveyor unit for transport of the target containers, and the second conveyor device has at least one conveyor unit for transport of the target containers, and wherein conveyor units for transport of the target containers are assigned to the buffer positions and to the sorting positions, and a control unit controls the conveyor units selectively and in such a manner that the target containers in the sorting buffer are sorted into a sequence that is determined as a function of the sequence in which the source containers are provided at the retrieval position, and in that a source container and a target container for an order arrive at the retrieval position and loading position approximately simultaneously.

The sorting function is performed by the sorting buffer. In this process, a small number of target containers in comparison with the number of source containers is sorted. The sorting buffer is in the immediate vicinity of the loading position. The target containers can be transported to the loading position especially rapidly. Specifically, the sorting buffer implements the sorting function of the target containers, the provision of the target containers in the sorted sequence, and the transport of the target containers out of the sorting buffer and into the sorting buffer. Standardized conveyor devices, which operate reliably, are used for this purpose. In the sorting buffer, transport of the target containers preferably takes place on a horizontal transport plane that is formed by the conveyor units.

In a preferred embodiment, the items are held in the source container in a "single-product" manner, and the items are held in the target containers in a "single-order" manner. Therefore a single item type is contained in a source container, and a single order is contained in a target container. However, for performance improvement/maximization of the range of items in the warehouse/optimization of the sorting buffer, source containers can each contain different item types and/or the target containers can each contain different orders. In this context, an order comprises one order line or multiple order lines. This is made possible by compartments in the source container and/or target container.

The picking station comprises a single retrieval position for a source container and a single loading position for a target container. As a result, mis-picks can be reduced to a minimum if picking is performed manually. Similarly, the order picking person need hardly move from the station.

It also proves to be advantageous when the following measures of the method are carried out:

retrieval of the source containers from the warehouse by means of a source container distribution system having at least one storage and retrieval device and a source container conveyor system between the warehouse and the picking station, wherein the source container conveyor system comprises at least the buffer track section for transport of the source containers to the retrieval position, transport of the source containers in random (chaotic) sequence on the source container conveyor system from the at least one storage and retrieval device to the retrieval position, and determination, at a sequence determination point that is located along the transport path between the at least one storage and retrieval device and the retrieval position, of the random (chaotic) sequence of the source containers that are required for processing of different order lines for at least one order.

Even though the required source containers for processing of the order lines are delivered to the retrieval position in a random sequence, this sequence is detected at the sequence determination point. The target containers in the sorting buffer determine which source containers must be retrieved. The target containers are sorted in and by the sorting buffer into a sequence that is determined by the sequence of the source containers. It is advantageous that the demands on the sequence in which the source containers are delivered to the retrieval position are negligible, and a high retrieval rate is thus achieved. The picking station can be supplied with source containers essentially without interruption. Moreover, the complexity of the control of the retrieval process is reduced.

An additional performance improvement (number of item picks per hour) can be achieved when the following method steps are carried out:

determination of a modified sequence of the source containers, in which sequence the source containers are to be transported to the retrieval position, changing the sequence of the source containers into the modified sequence by discharge, from the buffer track section into a bypass buffer, of at least one source container that is ahead in the sequence in order to move at least one source container that is behind in the sequence past the at least one source container in the bypass buffer, and by feeding of the at least one source container from the bypass buffer back into the buffer track section in order to insert the at least one source container from the bypass buffer behind the at least one source container in the buffer track section, sequential provision at the retrieval position of at least some of the source containers in the modified sequence.

In this regard, it is possible to provide that the source container distribution system has, connected to the buffer track section, a bypass buffer with a conveyor unit, and the control unit is equipped to evaluate the sequence of the source containers that are required for processing of different order lines for at least one order and to determine a modified sequence in which the source containers are to be transported to the retrieval position, and the control unit controls the conveyor unit in order to discharge, from the buffer track section into the bypass buffer, at least one source container that is ahead in the sequence in order to move at least one source container that is behind in the sequence past the source container in the bypass buffer, and after that to feed the at least one source container from the bypass buffer into the buffer track section.

According to one embodiment of the invention, the following method steps are possible:

provision of a first source container at the loading position for sequential processing of at least one first order line having multiple items for a first order, retrieval of an item from the first source container that is provided at the retrieval position, and placement of this item in a first target container that is provided at the loading position, in accordance with the first order if this item can be placed in the first target container, triggering of a control signal after the last retrieval of an item from the first source container or once it has been ascertained that an item cannot be placed in the first target container, with which signal a conveyor device of a source container distribution system arranged between the retrieval position and the buffer track section is controlled by a control unit such that the first source container is conveyed from the retrieval position to the buffer track section, and the buffer track section and a conveyor unit at the retrieval position are controlled by the control unit such that a second source container is transported to the retrieval position for processing of one or more order lines for a second order, a conveyor unit at the loading position and a conveyor unit of a target container distribution system are controlled by the control unit such that the first target container is transported away from the loading position, and a second target container is delivered to the loading position, provision of the second source container at the retrieval position for processing of at least one or more order lines for the second order, retrieval of an item from the second source container that is provided at the retrieval position, and placement of this item in a second target container that is provided at the loading position, in accordance with the second order, transfer of the first source container from the conveyor device to the buffer track section, transport of the first source container from the buffer track section to the retrieval position, repeated provision of the first source container at the retrieval position for the purpose of picking the remaining items of the first order line, retrieval of an item from the first source container that is provided at the retrieval position, and placement of the item in a second target container that is provided at the loading position, in accordance with the first order.

It also proves to be advantageous when the following method steps are carried out:

provision of a target container distribution system having the sorting buffer, and of a target container conveyor system for transport of empty target containers to the loading position while bypassing the sorting buffer, identification of an empty target container and assignment to an acquired order, request and transport of the empty target container to the loading position after the triggering of a control signal following the last retrieval of an item from the first source container, with which signal the target container conveyor system is controlled by the control unit such that the empty target container is transported to the loading position for processing of the at least one first order line for the first order.

In this regard, it is possible to provide that the source container distribution system has, connecting to the buffer track section, a conveyor device with a conveyor unit, and the control unit is equipped to process a control signal after the last retrieval of an item from the source container, and, based on the control signal, the control unit controls the conveyor unit in order to convey the first source container from the retrieval position to the buffer track section after the retrieval of the at least one item.

These said measures of the method permit an efficient picking process in which the loading volume of the target containers can be maximally utilized and the order picking person decides which items and/or what number of items can still be picked into a target container. If a control signal is triggered by the order picking person, for example by pressing of a confirmation key, the (full) first target container is transported away and an (empty) second target container is automatically provided in order to process the first order. During the provision of the (empty) second target container, a second order can be processed. After that, the first source container is provided again, and the first order is processed. Due to the capability of repeated provision of the first source container, a "time-consuming" process of returning the first source container to stock in the warehouse and retrieving the first source container from the warehouse is not necessary. As a result, the source container distribution system is also subjected to less stress.

The following method steps can also be implemented advantageously:

acquisition of at least one item-specific parameter for each item of an order having one or more order lines, wherein the item-specific parameter is chosen from the group comprising measurement, weight, volume and/or geometric shape, determination of an order-specific parameter based on the one or more order lines that are processed for an order and on the item-specific parameters for each item, determination of a load-specific parameter of at least one first target container into which the items for the said order are to be placed, determination of the number of second target containers additionally required for processing of the said order based on the order-specific parameter and load-specific parameter if an item cannot be placed in the first target container, provision of at least a first source container at the retrieval position for processing of at least a first order line for the order, provision of the first target container at the loading position for processing of one or more order lines for the order, retrieval of an item from at least the first source container, and placement of this item in the first target container in accordance with the order, triggering of a control signal after the delivery of an item as the last item for the first target container, with which signal a conveyor unit at the loading position is controlled by the control unit such that the completed first target container is transported away from the loading position and a second target container is delivered to the loading position, provision of at least the second target container at the loading position for processing of at least one order line for the order, retrieval of an item from the first source container, and placement of this item in the second target container in accordance with the order.

The following method steps also prove advantageous in this regard:

provision of a target container distribution system having the sorting buffer, and of a target container conveyor system having a conveyor device for transport of empty target containers to the loading position while bypassing the sorting buffer, identification of an empty target container and assignment to an acquired order, request and transport of the empty target container to the loading position after the triggering of a control signal following the delivery of an item as the last item for the first target container, with which signal the conveyor device is controlled by the control unit such that the empty target container is transported to the loading position for processing of the at least one order line for the order.

By means of this measure of the method, an optimum fill level of the target containers is determined from an advance calculation. If the picking process is carried out by an order picking person, the person need only act in accordance with picking instructions. The picking process proves to be especially simple, and the order picking person requires no particular specialist knowledge. Otherwise, a robot can perform picking of the items based on the advance calculation.

The following measures of the method are also advantageous:

acquisition of at least one item-specific parameter for each item of an order having one or more order lines, wherein the item-specific parameter is chosen from the group comprising measurement, weight, volume and/or geometric shape, determination of an order-specific parameter based on the one or more order lines that are processed for an order and on the item-specific parameters for each item, determination of a load-specific parameter of at least one first target container into which the items for the said order are to be placed, determination of the number of second target containers additionally required for processing of the said order based on the order-specific parameter and load-specific parameter if an item cannot be placed in the first target container, triggering of a control signal once it has been ascertained that an item cannot be placed in the first target container, with which signal at least one conveyor unit in the sorting buffer is controlled by the control unit such that the first target container that cannot be filled further is transported away from the sorting buffer on a target container conveyor system for removal of the first target container, provision of at least a first source container at the retrieval position for processing of at least a first order line for the order, provision of the second target container at the loading position for processing of one or more order lines for the order, retrieval of an item from at least the first source container, and placement of this item in the second target container in accordance with the order.

The following method steps also prove advantageous in this regard:

provision of a target container distribution system having the sorting buffer, and of a target container conveyor system having a conveyor device for transport of empty target containers to the loading position while bypassing the sorting buffer, identification of an empty target container and assignment to an acquired order, request and transport of the empty target container to the loading position after the triggering of a control signal once it has been ascertained that an item cannot be placed in the first target container, with which signal the conveyor device is controlled by the control unit such that the empty target container is transported to the loading position for processing of the at least one order line for the order.

By means of this measure of the method, an optimum fill level of the target containers is determined from an advance calculation. If it is determined in this regard that a target container in the sorting buffer cannot be loaded further, the container is immediately transported out of the sorting buffer. The loading position is not obstructed, which has a beneficial effect on the pick rate.

The following measures of the method also prove advantageous:

provision of a target container distribution system having the sorting buffer, and of a target container conveyor system having a conveyor device for transport of empty target containers either to the sorting buffer or to the loading position while bypassing the sorting buffer, evaluation of the sequence of the source containers in the buffer track section that are required for processing of order lines for different orders, evaluation of the target containers present in the sorting buffer, triggering of a control signal once it has been ascertained that a source container for processing of one or more order lines for an order is being conveyed onward in the buffer track section and a target container must be requested in addition to the target containers in the sorting buffer, identification of the empty target container and assignment to the order, transport of the empty target container either to the sorting buffer or to the loading position after the triggering of a control signal, with which signal the conveyor device is controlled by the control unit such that the empty target container is transported either to the sorting buffer or to the loading position for processing of the at least one order line for the order.

According to a first embodiment, the empty target containers are transported directly to the loading position. The empty target containers are only requested and provided at the loading position when needed. In this case, only target containers are held in the sorting buffer that already contain an item for an order line. According to a second embodiment, empty target containers are also transported into the sorting buffer. In this case, empty target containers and target containers that already contain an item for an order line are held in the sorting buffer.

It is also advantageous when the target container distribution system has a target container conveyor system for delivery of empty or partially picked target containers to the loading position and for removal of loaded target containers from the loading position, wherein the target container conveyor system for removal of loaded target containers from the loading position and the source container conveyor system for removal of source containers from the retrieval position are connected to one another by a conveyor device having a conveyor unit, and the control unit controls the conveyor unit in order to discharge the target containers from the target container distribution system to the source container distribution system. A space-saving configuration of the picking station is achieved by this embodiment.

It is also possible to provide that the target container distribution system has a target container conveyor system for delivery of empty or partially picked target containers to the loading position and for removal of loaded target containers from the loading position, wherein the target container conveyor system for delivery of empty or partially picked target containers to the loading position connects to the delivery device with the loading position, and the target container conveyor system for removal of loaded target containers from the loading position connects to the delivery device with the loading position. A space-saving configuration of the picking station is achieved by this embodiment.

According to one embodiment of the invention, it is also possible to provide that the target container distribution system has a target container conveyor system for delivery of empty or partially picked target containers to the loading position and for removal of loaded target containers from the loading position, wherein the target container conveyor system for delivery of empty or partially picked target containers to the loading position connects to the first conveyor device or second conveyor device of the sorting buffer, and the target container conveyor system for removal of loaded target containers from the loading position connects to the delivery device with the loading position. Depending on the arrangement of the conveyor system for delivery of empty or partially picked target containers, these containers can be transported on either the first conveyor device or the second conveyor device. Thus it is possible, for example, that a partially picked target container that was processed in a previous picking station is transported on the first conveyor device and hence to a buffer position if a source container assigned to it is already located in the buffer track section. Otherwise, a partially picked target container that was processed in a previous picking station is transported on the second conveyor device and hence to a sorting position if a source container assigned to it is not yet located in the buffer track section. The transport of empty target containers into the sorting buffer is also possible in accordance with this embodiment. This application case exists when an empty target container is used as a consolidation container. Such consolidation containers are used chiefly for less extensive orders, in particular for orders with only one order line. In this case, a consolidation container can contain multiple orders with one order line apiece.

According to one embodiment of the invention, the delivery direction of the first conveyor device is and the return direction of the second conveyor device are opposite. A sorting buffer with maximum functionality can be created in the smallest possible space as a result of this measure together with the third conveyor devices. Moreover, the paths of movement of the target containers along the first conveyor device and second conveyor device, as well as between these conveyor devices, are optimized so that the sorting times are short and a high sorting rate is achieved.

It proves to be advantageous when the sorting buffer has a maximum of 20 sorting positions and a maximum of 20 buffer positions.

The task of the invention is accomplished in that
a first returned-item container for processing of return orders is transported back into the sorting buffer after placement of a returned item for a first return order, and is temporarily buffered at a first sorting position at least until a source container for placement of a returned item for a second return order is conveyed onward into a buffer track section provided upstream of the loading position, and said first returned-item container can be moved from the first sorting position to one of the buffer positions and subsequently to the retrieval position once the source container for placement of a returned item for a second return order has been transported into the buffer track section, and a second returned-item container for processing of return orders is transported back into the sorting buffer after placement of a returned item for a first return order, and is moved via a second sorting position to one of the buffer positions and subsequently to the retrieval position if a source container for placement of a returned item for a second return order has already been transported into the buffer track section provided upstream of the loading position.

Furthermore, the task of the invention is accomplished in that
the sorting buffer has buffer positions arranged one behind the other in a delivery direction on a first conveyor device, and sorting positions arranged one behind the other in a return direction on a second conveyor device, and third conveyor devices connecting the sorting positions to the buffer positions in terms of conveying, and in that the delivery device is configured with the single retrieval position on a fourth conveyor device,
wherein the first conveyor device and the second conveyor device are connected to one another by the fourth conveyor device in order to convey the returned-item containers onward from the sorting buffer to the retrieval position, and to convey them away from the retrieval position to the sorting buffer, for processing of return orders, and
wherein the first conveyor device has at least one conveyor unit for transport of the returned-item containers, and the second conveyor device has at least one conveyor unit for transport of the returned-item containers,
wherein conveyor units for transport of the returned-item containers are assigned to the buffer positions and to the sorting positions, and
a control unit controls the conveyor units selectively and in such a manner that the returned-item containers in the sorting buffer are sorted into a sequence that is determined as a function of the sequence in which the source containers are provided at the loading position, and that a source container and a returned-item container for an order arrive at the loading position and retrieval position approximately simultaneously.

The sorting function is performed by the sorting buffer. In this process, a small number of returned-item containers in comparison with the number of source containers is sorted. The sorting buffer is in the immediate vicinity of the retrieval position. The returned-item containers can be transported to the retrieval position especially rapidly. Specifically, the sorting buffer implements the sorting function of the returned-item containers, the provision of the returned-item containers in the sorted sequence, and the transport of the returned-item containers out of the sorting buffer and into the sorting buffer. Standardized conveyor devices, which operate reliably, are used for this purpose. In the sorting buffer, transport of the returned-item containers preferably takes place on a horizontal transport plane that is formed by the conveyor units.

In a preferred embodiment, different types of returned items are held in the respective returned-item containers. As a result, multiple return orders are also combined into one returned-item container, and a source container is provided for each of these return orders. Should the source containers accommodate different item types, then returned items for different return orders can be placed in one source container.

The picking station comprises a single loading position for a source container and a single retrieval position for a returned-item container. As a result, mis-picks can be reduced to a minimum if picking is performed manually.

Similarly, the order picking person need hardly move from the station. Generally speaking, however, more than one loading position for source containers and more than one retrieval position for returned-item containers can also be provided.

The method steps are also advantageous:
transport of at least some of the returned-item containers from a staging position to the sorting buffer by a returned-item conveyor system,
transfer of at least some of the returned-item containers into the sorting buffer,
transport of the returned-item containers from the sorting buffer to the retrieval position in the sorted sequence and one after the other.

The returned-item containers are transported initially into the sorting buffer, and are not transported to the retrieval position until after an assigned source container is present in the buffer track section.

The measure of the method is also advantageous:
transport of at least some of the returned-item containers from a staging position to the retrieval position by a returned-item conveyor system while bypassing the sorting buffer.

A returned-item container can be transported directly to the retrieval position if an assigned source container is present in the buffer track section, or if return mode is to be started and the first returned-item container is to be processed.

For better understanding, the invention is explained in detail on the basis of the following figures.

Figure 5C:
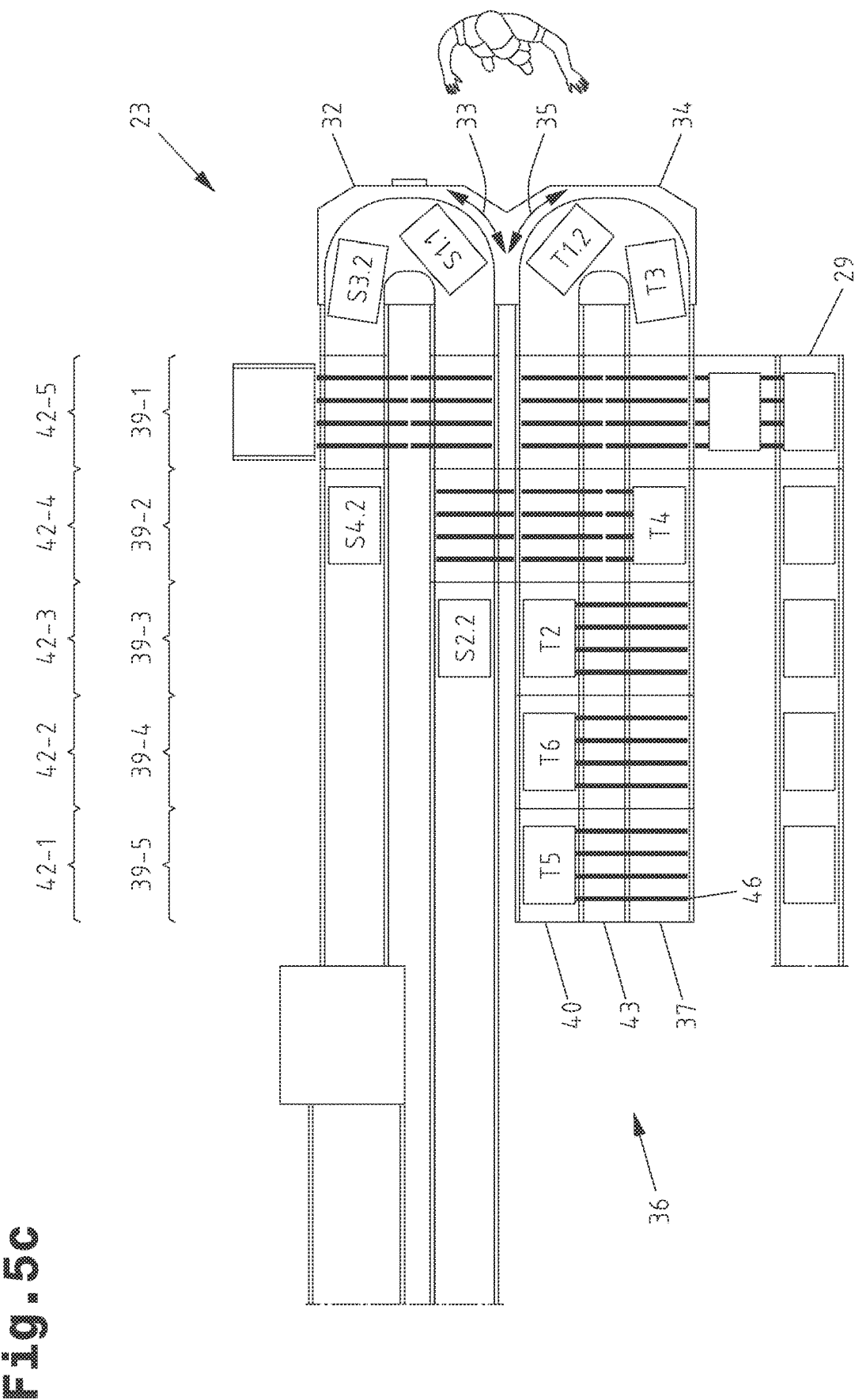
Figure 6A:
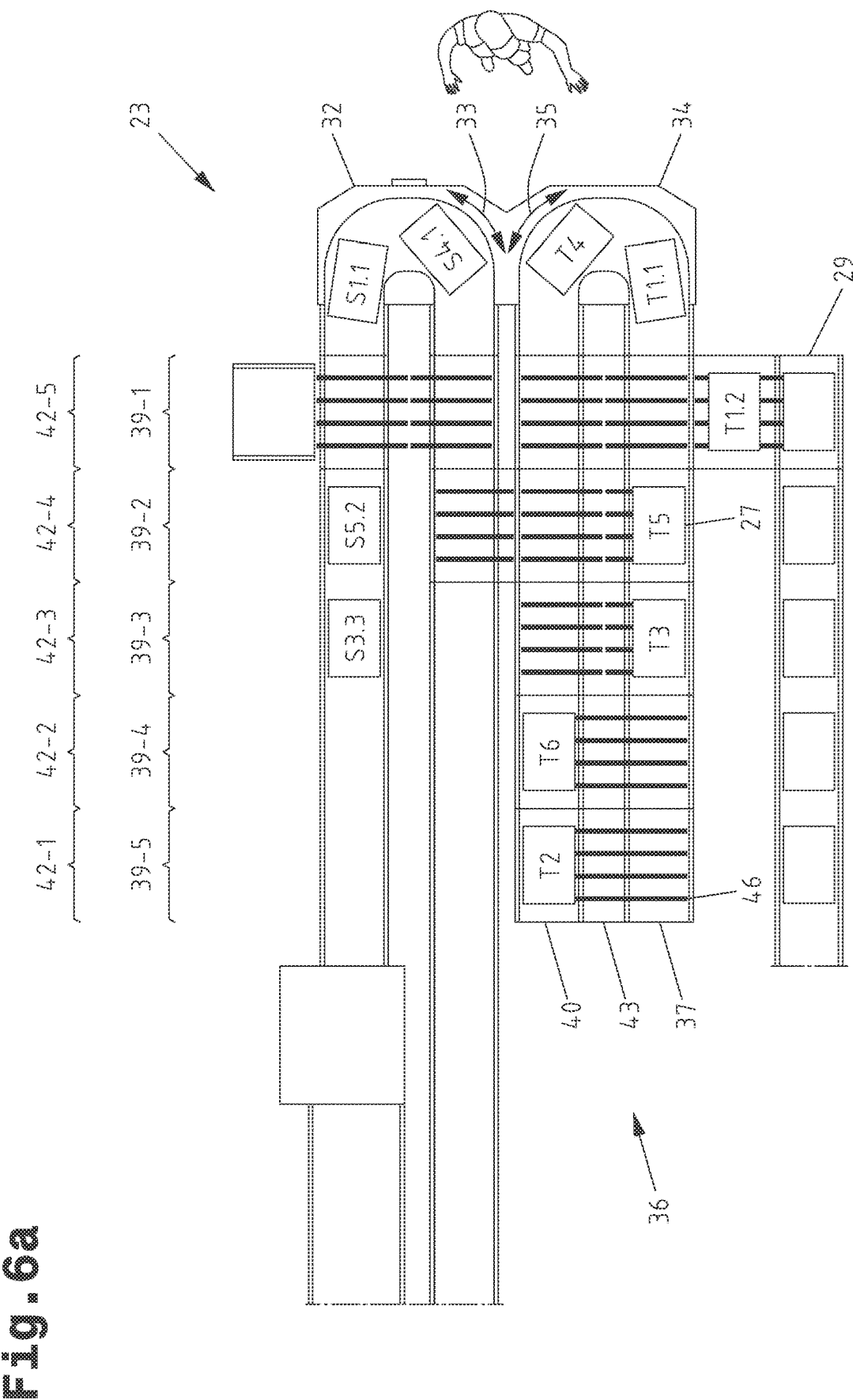
Figure 6B:
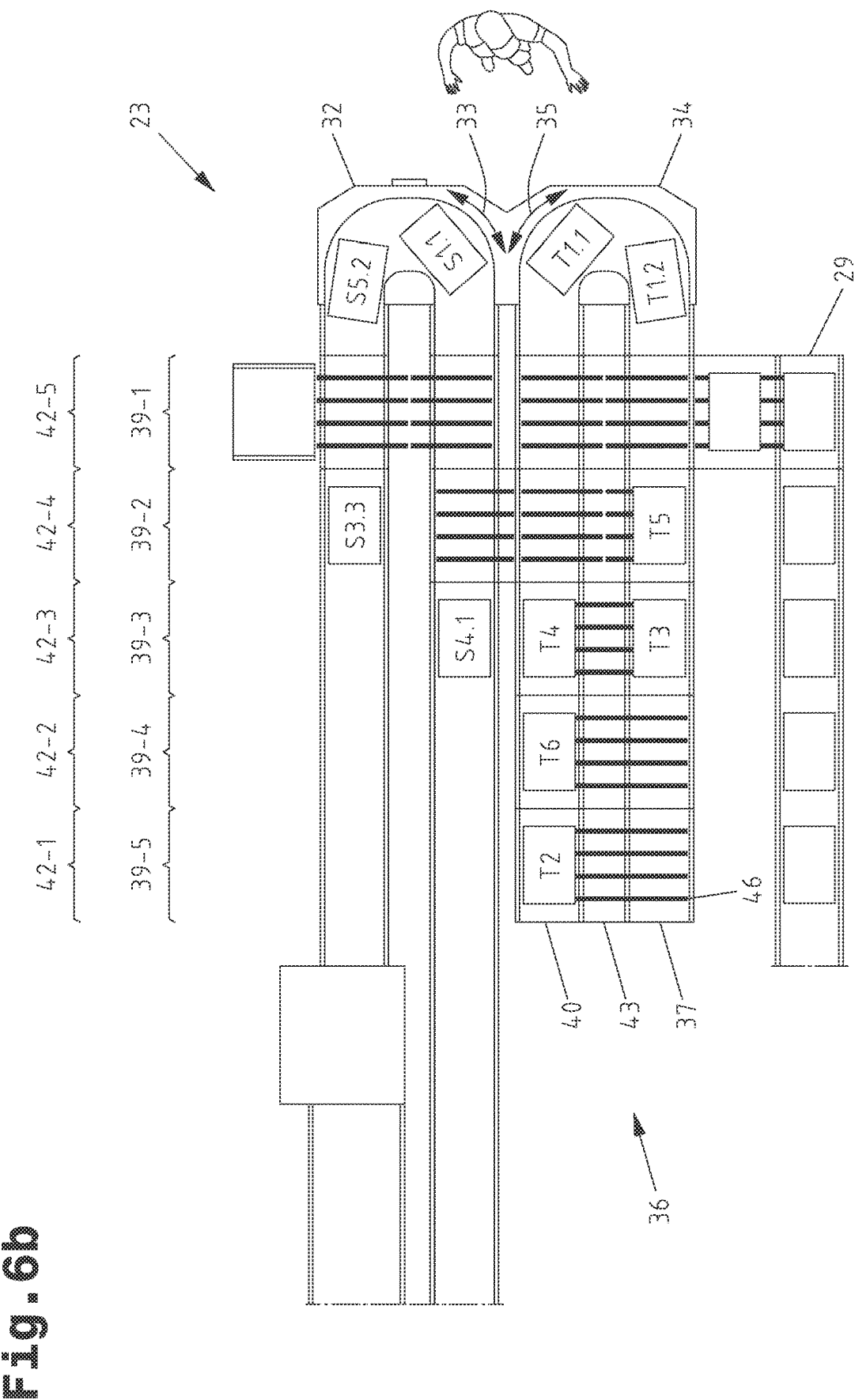
Figure 6C:
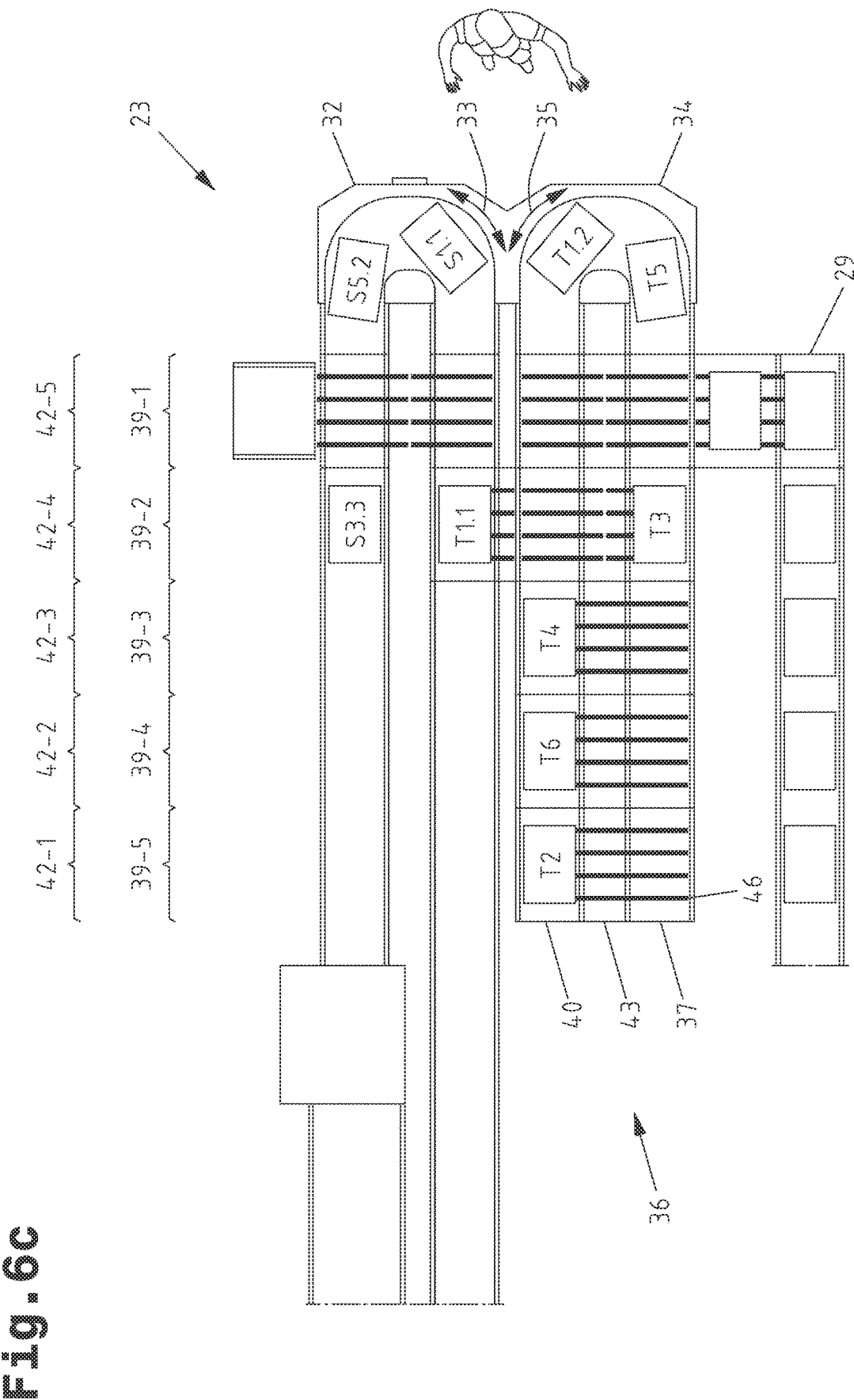

The figures show, respectively:

FIG. 1 a detail of a picking system having a warehouse and multiple picking stations;

FIG. 2 a picking station for picking of (inventory) items in a "picking mode," and a detail of a source container distribution system and a target container distribution system;

FIGS. 3a to 3j an ordered sequence of picking steps for processing of a number of picking orders;

FIGS. 4a to 4d an ordered sequence of picking steps for processing of a number of orders and provision of the source containers in a modified sequence at the retrieval position;

FIGS. 5a to 5c an ordered sequence of picking steps for processing of a number of orders and provision of an additionally requested target container;

FIGS. 6a to 6c an ordered sequence of picking steps for processing of a number of orders and provision of an existing target container from the sorting buffer for receiving an item;

FIGS. 7a to 7d an ordered sequence of picking steps for processing of a number of orders and removal of an existing target container from the sorting buffer on a target container conveyor system and provision of a target container additionally requested by the control unit;

FIG. 8 a picking station for picking/returning to stock of returned items in a "return mode," and a detail of a source container distribution system and a returned-item container distribution system;

FIGS. 9a to 9f an ordered sequence of picking steps for processing of a number of return orders.

As an introduction, it should be stated that the same parts are labeled with the same reference symbols or the same component designations in the different embodiments described, wherein the disclosures contained in the description as a whole can be applied analogously to the same parts having the same reference symbols or the same component designations. Also, the position information chosen in the description, such as top, bottom, lateral, etc., for example, refers to the figure being directly described and shown, and this position information must be transferred analogously to the new position in the event of a change in position.

In FIG. 1, a picking system is shown, having a warehouse 1, one or more automatically operated picking stations 2, a source container distribution system 3, and a target container distribution system 4.

The purpose of the warehouse 1 shown by way of example is primarily the provision of a plurality of source containers 5, in which (inventory) items—not shown—are contained. The source containers can each contain a single item type. For example, a first source container contains the (inventory) item "A," a second source container contains the (inventory) item "B," etc. On the other hand, the source containers 5 can be subdivided by partitions into multiple compartments and hold different item types, wherein an (inventory) item "A" can be held in the first compartment, and an (inventory) item "B" can be held in the second compartment. The number of items in the warehouse 1 can be increased due to segmented source containers 5.

As a matter of principle, it is also possible that the target containers are subdivided by partitions into multiple compartments and hold different orders, wherein a first order with one or more items can be held in the first compartment, and a second order with one or more items can be held in the second compartment. However, the target containers can also be designed without partitions and hold different orders. The sorting buffer described below can be reduced in size due to segmentation of the target containers, and the number of sorting positions and buffer positions can be reduced as a result.

Returned items may also be held in these source containers 5, wherein the returned items are placed in the source containers 5 in a single-product manner or in the compartments in a single-product manner.

The invention should not be understood to be restricted to containers. It is rather the case that other loading aids, such as trays, cartons, and the like, can also be used.

The warehouse 1 preferably is an automatically operated warehouse. The warehouse 1 comprises parallel storage racks 6 and an aisle 7 provided between the storage racks 6 in accordance with the exemplary embodiment shown. Each storage rack 6 forms a plurality of storage locations 8 in stacked tiers side by side, at which storage locations the source containers 5 are stored. In the example shown, two storage racks 6 are shown. However, more than two storage racks 6 may also be provided within the scope of the invention, wherein one aisle 7 is formed respectively between adjacent storage racks 6.

The purpose of the source container distribution system 3 is transport of source containers 5 between the warehouse 1 and the picking station(s) 2. The source container distribution system 3 preferably is an automatically operated source container distribution system. Retrieval of source containers 5 from the warehouse 1 can take place automatically, and transport of the source containers 5 from the warehouse 1 to the picking station 2 can take place automatically. The source container distribution system 3 comprises, for example, one or more storage and retrieval devices 9 and a source container conveyor system between the warehouse 1 and the picking station 2 in order to transport source containers 5 from the warehouse 1 to the relevant picking stations 2 and in order to transport source containers 5 from the picking stations 2 to the warehouse 1. The source container conveyor system can have, for example, a first conveyor device 10 for delivery of source containers 5 to the warehouse 1 and a second conveyor device 11 for removal of source containers 5 from the warehouse 1 and a third conveyor device 12 for delivery of source containers 5 to the picking station 2 and a fourth conveyor device 13 for removal of source containers 5 from the picking station 2 and, lastly, a fifth conveyor device 14 for transport of source containers 5 between the conveyor devices 10, 11, 12, 13. The fifth conveyor device 14 comprises infeed and/or discharge devices 15 in order to transport the source containers 5 between the conveyor devices 10 to 14. The fifth conveyor device 14 is, for example, a closed conveyor loop. The infeed and/or discharge device 15 is composed of a belt transfer unit, for example. On the other hand, the infeed and/or discharge device 15 can also be composed of a slide (not shown) that can be operated by means of an actuator.

The source container distribution system 3 can additionally comprise a transfer device 16 for the transport of source containers 5 between the storage and retrieval device 9 and the source container conveyor system.

If single-level shuttles are used as the storage and retrieval device 9 in the warehouse 1, then guideways 17 are arranged in pairs in stacked (horizontal) travel levels. The guideways 17 preferably are attached to the adjacent storage racks 6. The single-level shuttles (shuttles), which can be controlled independently of one another by a control unit, are capable of travel along the aisle 7, and can be moved in the stacked travel levels in front of the storage locations 8.

The storage and retrieval device 9 comprises a load platform and a transport device 18 (load handling device). The transport device 18 can manipulate the source containers 5 between the load platform and the storage location 8, namely can store source containers 5 in the storage racks 6 located on both sides of the storage and retrieval device 9 and retrieve source containers 5 from the storage racks 6 located on both sides of the storage and retrieval device 9. It is possible to provide that at least one storage and retrieval device 9 is assigned to each tier. Consequently, a storage and retrieval device 9 serves a tier through the transport device 18.

The storage and retrieval of source containers 5 by means of the storage and retrieval devices 9, the transfer device 16, and the conveying devices 10, 11 is described in detail in WO 2013/090970 A2.

The transfer device 16 comprises a first buffer device 19a, a first lifting device 20a, a second buffer device 19b, and a second lifting device 20b.

The buffer device 19a comprises, for each travel level, staging devices for temporary buffering of one or more source containers 5 that are to be stored, and the buffer device 19b comprises, for each travel level, staging devices for temporary buffering of one or more source containers 5 that are to be retrieved. Other variant embodiments are also possible, as described in WO 2013/090970 A2.

The lifting devices 20a, 20b are installed in fixed locations and each comprise a transfer apparatus that can be raised and lowered by a lifting drive. Preferably, the transfer apparatuses are each supported on a vertical mast, and each comprise a drivable conveyor device.

The source container distribution system 3 can comprise an optional bypass buffer 21 with a conveyor unit 22. The conveyor unit 22 is composed of a belt transfer unit, for example. The bypass buffer 21 is connected to a buffer track section 23. The buffer track section 23 is provided upstream of the retrieval position. Preferably, the buffer track section 23 connects to the retrieval position, and extends along the third conveyor device 12. The conveyor unit 22 is controlled by a control unit 26 in order to discharge at least one source container 5 that is ahead in the (conveying) sequence from the buffer track section 23 to the bypass buffer 21, and in order to move at least one source container 5 that is behind in the sequence past the source container 5 in the bypass buffer 21, and after that to feed the at least one source container 5 from the bypass buffer 21 into the buffer track section 23 (see double-headed arrow). The control unit 26 is equipped to evaluate the sequence of the source containers 5 that are required for processing of different order lines for at least one order and are transported on the buffer track section 23, and to determine a modified sequence in which the source containers are to be transported to the retrieval position.

The source container distribution system 3 can also comprise an optional turning station 24 with which the source containers 5 that are discharged from the fifth conveyor device 14 are rotated from a transverse orientation to a longitudinal orientation.

The source container distribution system 3 can also comprise an optional sixth conveyor device with a conveyor unit 25. The conveyor unit 25 is composed of a belt transfer unit, for example. The sixth conveyor device is connected to the buffer track section 23. The conveyor unit 25 is controlled by the control unit 26 on the basis of a control signal (to be described in detail below) in order to convey a first source container 5 from the retrieval position to the buffer track section 23 after the retrieval of an item. However, the control signal can also be triggered when the source container 5 is to be removed from the retrieval position 33 even though no item or no additional items have been placed in the target container 27, as will be described later. The control unit 26 is equipped to process the control signal after the last retrieval of an item from the source container 5 or the last placement of an item into the target container 27.

The target container distribution system 4 serves to transport completed target containers 27 between the picking station(s) 2 and a shipping area, as indicated with the arrow 28, or to transport partially picked target containers 27 between a first picking station 2 and a second picking station 2. The target container distribution system 4 also serves to deliver empty target containers 27 or partially picked target containers 27 to the picking station(s) 2. The target container distribution system 4 preferably is an automatically operated target container distribution system. The transport of said target containers 27 can take place automatically.

The target container distribution system 4 comprises a target container conveyor system. The target container conveyor system can comprise, for example, a first conveyor device 29 for delivery of empty target containers 27 and/or partially picked target containers 27 to the relevant picking station(s) 2 and a second conveyor device 30 for removal of partially picked target containers 27 or completed target containers 27 from the relevant picking station(s) 2. The first conveyor device 29 for delivery of empty target containers 27 and/or partially picked target containers 27 connects to a delivery device with the loading position for a target container 27. The second conveyor device 30 for removal of partially picked target containers 27 or completed target containers 27 connects either to the delivery device with the loading position for a target container 27 or to the sorting buffer 36. If the second conveyor device 30 connects to the sorting buffer 36, then the target containers 27 in the sorting buffer 36 are transported via the second conveyor device 40 to the second conveyor device 40 of the target container conveyor system, and are discharged there from the sorting buffer 36 to the target container conveyor system via the conveyor unit 31.

Optionally, the target container conveyor system can, by means of its first conveyor device 29 for delivery of empty target containers 27 and/or partially picked target containers 27 to the relevant picking station(s) 2, connect to the sorting buffer 36 (as shown in dashed lines in FIG. 1 by way of example) so that empty target containers 27 and/or partially picked target containers 27 are transported initially to the sorting buffer 36 and subsequently, in sorted order if applicable, to the relevant picking station(s) 2. The first conveyor device 29 can connect either to the first conveyor device 37—to be described in detail later—of the sorting buffer or to the second conveyor device 40—to be described in detail later—of the sorting buffer. In contrast to the depiction in FIG. 1, the first conveyor device 29 can also connect to the fifth conveyor device 14 in order to deliver empty target containers 27 and/or partially picked target containers 27. The empty target containers 27 and/or partially picked target containers 27 are transferred to a buffer position 39-5, and after that are transported to the loading position 35, or transferred to a sorting position 42-1. A partially picked target container 27 can also be transported from a buffer position 39-5 and to a sorting position 42-1 if the source container assigned to the partially picked target container 27 has not yet been transported into the buffer track section 23.

It is also possible, however, that the target container conveyor system comprises a first conveyor device 29 with separate delivery of empty target containers 27 and partially picked target containers 27, wherein one of the first conveyor devices 29 for delivery of empty target containers 27 connects to the delivery device of the picking station 2 and the other first conveyor device 29 for delivery of partially picked target containers 27 connects to the sorting buffer.

The conveyor device 13 for removal of source containers 5 from the retrieval position and the conveyor device 30 for removal of loaded target containers 27 from the loading position are connected to one another by a third conveyor device with a conveyor unit 31. The conveyor unit 31 is composed of a belt transfer unit, for example. The conveyor unit 31 is controlled by the control unit 26 to discharge the loaded target containers 27 from the target container conveyor system to the source container conveyor system. According to the embodiment shown, a single conveyor device 13 for removal of loaded target containers 27 from the loading position and for removal of source containers 5 from the retrieval position is used for space-saving reasons. It would also be possible, however, to use two separate conveyor devices 13, 30.

The picking station(s) 2 is/a are connected to the source container conveyor system of the source container distribution system and to the target container conveyor system of the target container distribution system.

The picking station 2 comprises a delivery device 32 for provision of a source container 5 at a single retrieval position 33 (retrieval position), and a delivery device 34 for provision of a target container 27 at a single loading position 35 (loading position), and a sorting buffer 36. The sorting buffer 36 is an automatically operated sorting buffer. The transport of the target containers 27 in the sorting buffer 36 (in particular between the buffer positions and sorting positions 39, 42) and the sorting of the target containers 27 by the sorting buffer 36 is accomplished automatically.

In particular, the transport of the target containers 27 from the sorting buffer 36 to the loading position 35 and the return transport of the target containers 27 from the loading position 35 into the sorting buffer 36 are also accomplished automatically, and therefore the provision of the target containers 27 at the loading position 35 is accomplished automatically. In like manner, the transport of the source containers 5 to the retrieval position 33 and the transport of the source containers 5 from the retrieval position 33 can be accomplished automatically, and therefore the provision of the source containers 5 at the retrieval position 33 is accomplished automatically.

The sorting buffer 36 comprises buffer positions 39 arranged one behind the other in a delivery direction (arrow from left to right) on a first conveyor device 37, and sorting positions 42 arranged one behind the other in a return direction (arrow from right to left) on a second conveyor device 40, and third conveyor devices 43 connecting the buffer positions 39 to the sorting positions 42. According to a preferred embodiment, the first conveyor device 37 and the second conveyor device are arranged to be parallel, while the third conveyor devices 43 are arranged to be perpendicular to the first conveyor device 37/second conveyor device 40. The delivery direction of the requested target containers 27 on the first conveyor device 37 and the return direction of the returned target containers 27 on the second conveyor device 40 are opposite directions. The delivery device 34 for the target containers 27 is implemented on a fourth conveyor device 48. The first conveyor device 37 and the second conveyor device are connected to one another by the fourth conveyor device 48 in order to convey the target containers 27 onward from the sorting buffer 36 to the loading position 35, and to convey them away from the loading position 35 to the sorting buffer 36, for processing of different order lines for at least one order. The first conveyor device 37 and second conveyor device 40 have respective conveyor units 44, 45. The target containers 27 are transported to the loading position 35 for processing of orders on the first conveyor device 37 by means of the conveyor unit 44 in the delivery direction, and in sorted order. The conveyor unit 44 forms a horizontal conveying plane. On the other hand, target containers 27 that, after a processing of orders, still require items for orders can be transported in the return direction from the loading position 35 to the sorting positions 42 on the second conveyor device 40 by means of the conveyor unit 45. The conveyor unit 45 forms a horizontal conveying plane.

The conveyor units 44, 45 each have conveyor rollers rotatably mounted on a frame, for example, and each form a roller conveyor. At least one conveyor unit 44 for transport of the target containers 27 in the delivery direction is assigned to the buffer positions 39, and at least one conveyor unit 45 for transport of the target containers 27 in the return direction is assigned to the sorting positions 42. The conveyor unit 44 is driven, and is coupled to a first drive motor.

The conveyor unit 45 is driven, and is coupled to a second drive motor. According to the exemplary embodiment shown, each buffer position 39 comprises a conveyor unit 44 with multiple conveyor rollers, of which at least one conveyor roller is driven and is coupled to a drive motor. Moreover, each sorting position 42 comprises a conveyor unit 45 with multiple conveyor rollers, of which at least one conveyor roller is driven and is coupled to a drive motor.

The drive motors are connected to the control unit 26, and the conveyor units 44, 45 can be controlled separately by the control unit 26.

The third conveyor devices 43 connect the mutually opposing buffer positions 39 and sorting positions 42 in order to deliver the target containers 27 from the sorting positions 42 to the buffer positions 39 in a manner that is time-controlled by the control unit 26 such that the target containers 27 are already in a sorted sequence leaving the sorting buffer 36, and are delivered to the loading position 35 one after the other in this sorted sequence. The third conveyor devices 43 have conveyor units 46, 47, respectively. The target containers 27 are transported from the sorting positions 42 to the buffer positions 39 on the third conveyor device 43 by means of the conveyor units 46, 47 for processing of orders. The conveyor units 46, 47 form a horizontal conveying plane. The conveyor unit 46, 47 of every third conveyor device 43 is driven and is coupled to a third drive motor.

As is evident from FIGS. 1 and 2, one shared conveyor unit 46 in each case can be assigned to some of the buffer positions 39 and sorting positions 42. Otherwise, one conveyor unit 47 per buffer position 39 and one conveyor unit 47 per sorting position 42 can be assigned to some of the buffer positions 39 and sorting positions 42.

The conveyor units 46, 47 are each composed of a belt transfer unit, for example. Such belt transfer units (and this also applies to the belt transfer units mentioned elsewhere) have conveyor belts that are coupled to a drive motor and are mounted on a lifting mechanism, and form the conveying plane. By means of the lifting mechanism, the conveyor belts can be moved between a raised conveying position in which a target container 27 is lifted from a sorting position 42 and conveyed to a buffer position 39 via the conveyor belts, and a lowered idle position in which the conveyor belts are lowered below the conveying plane of the conveyor units 44, 45 and a target container 27 is transported to a sorting position by the conveyor unit 45 or a target container 27 is transported from a first sorting position to a second sorting position by the conveyor unit 45.

On the other hand, the conveyor units 46, 47 can each be composed of a slide (not shown) that can be operated by means of an actuator, wherein the buffer positions 39 and sorting positions 42 are then connected by a "passive" sliding surface.

The conveyor unit 47 at the sorting position 42-4 and the conveyor unit 47 at the buffer position 39-2 can be operated bidirectionally. The conveyor unit 47 at the sorting position 42-5 and the conveyor unit 47 at the buffer position 39-2 can also be operated bidirectionally if applicable. However, the conveyor units 46 for the sorting positions 42-1 to 42-3 and buffer positions 39-3 to 39-5 can also be operated bidirectionally.

The conveyor units 44, 45, 46, 47 are controlled by the control unit 26 in such a manner that the target containers 27 in the sorting buffer 36 are sorted into a sequence that is determined as a function of the sequence in which the source containers 5 are provided at the retrieval position, and that a source container 5 and a target container 27 for an order arrive at the retrieval position and loading position approximately simultaneously.

As can also be seen in the Fig., a transfer direction (arrow from top to bottom) of the target containers 27 returned into the sorting buffer 36 from the loading position 35 is essentially perpendicular to the delivery direction and return direction.

The drive motors/actuators are connected to the control unit 26, and the conveyor units 46, 47 can be controlled separately by the control unit 26.

In one advantageous embodiment, the sorting buffer 36 comprises a maximum of 20 buffer positions and a maximum of 20 sorting positions. The number of buffer positions and sorting positions can be determined as a function of the range of items and/or lot sizes and/or container type. The number of buffer positions and sorting positions will tend to be higher when there is a wide product range but small lot sizes. In contrast, the sorting buffer 36 can have a minimal number of buffer positions and sorting positions when the product range is decreased and there are larger lot sizes. For simple applications, the sorting buffer 36 can also have only two buffer positions and two sorting positions.

The delivery device 32 shown for provision of a source container 5 at a single retrieval position 33 (retrieval position) comprises a turnaround conveyor system of curved design that connects the third conveyor device 12, for delivery of source containers 5 to the picking station 2, and the fourth conveyor device 13, for removal of source containers 5 from the picking station 2, to one another. The turnaround conveyor system has conveyor units 49. The source containers 5 are delivered to the delivery device 32 by means of the third conveyor device 12 for processing of orders, and are transported further on the delivery device 32 to the retrieval position 33 by means of the conveyor units 49. Preferably, the source container 5 is stopped briefly at the retrieval position 33 for the picking process to be carried out by an order picking person (as shown) or a robot. The conveyor unit 49 is driven, and is coupled to a drive motor. The conveyor unit 49 has conveyor rollers rotatably mounted on a frame, for example.

The delivery device 34 shown for provision of a target container 27 at a single loading position 35 (loading position) comprises a turnaround conveyor system of curved design that connects the first conveyor device 37 and the second conveyor device 40 to one another. The turnaround conveyor system has conveyor units 50. The target containers 27 are delivered to the delivery device 34 by means of the first conveyor device 37 for processing of orders, and are transported further on the delivery device 34 to the loading position 35 by means of the conveyor units 50. Preferably, the target container 27 is stopped briefly at the loading position 35 for the picking process to be carried out by an order picking person (as shown) or a robot. The conveyor unit 50 is driven, and is coupled to a drive motor. The conveyor unit 50 has conveyor rollers rotatably mounted on a frame, for example.

In addition, the picking station 2 can comprise an input and/or output system 51 that is connected to the control unit 26.

If the picking is carried out by an order picking person, then an input and/or output system 51 having a confirmation key and a display is provided. The display comprises a display field by means of which a numeric or alphanumeric (visual) output of picking instructions can be accomplished. For example, the number of items to be retrieved from the source container 5 and placed in the target container 27 is indicated on the display for the order picking person. After the last retrieval of an item from the source container 5 or after the last placement of an item into the target container 27, a control signal is triggered if the order picking person presses the confirmation key on the input and/or output system 51. However, a control signal can also be triggered by pressing of the confirmation key if the order picking person has ascertained that no item or no additional items can be placed in the target container 27. The control signal can also be triggered in other ways, however, for example through voice input, gestures (hand motions, for example), and the like.

If the picking is carried out by a robot, then an input system 51 is provided, having a camera system or another suitable sensor system by means of which a loading state in the target container 27 can be ascertained, for example. The control unit 26 determines, based on the loading state, what number of items are to be retrieved from the source container 5 and placed in the target container 27. After the last retrieval of an item from the source container 5 or the last placement of an item into the target container 27, a control signal is triggered if an acknowledgment signal has been transmitted to the control unit 26, for example by the camera system. However, a control signal can also be triggered, for example by the camera system, if it has been ascertained by the control unit 26 that no item or no additional items can be placed in the target container 27.

As illustrated in FIG. 1, a sequence determination point 52, where the sequence of the source containers 5 is determined, is provided along the transport path between the at least one storage and retrieval device 9 and the retrieval position 33. The buffer track section 23 preferably extends between the sequence determination point 52 and the retrieval position 33. The sequence of the source containers 5 is not changed after this. For performance reasons alone, the sequence of at least some source containers 5 can be modified, as described further below. The sequence determination point 52 is preferably provided at the infeed and/or discharge device 15 at which the source containers 5 are transported from the fifth conveyor device 14 to the third conveyor device 12. Detection of the sequence of the source containers 5 is carried out by the control unit 26, wherein tracking systems (tracking system) that are known per se are used that can detect the location of each source container 5 along the transport path. It is necessary for this purpose that the source containers 5 are identified and detected by the control unit 26 prior to their storage in the warehouse 1. The source containers 5 are each supplied with an unmistakable (unique) identification code, for example an identification number. In addition, the transport of the source containers 5 from the fifth conveyor device 14 to the third conveyor device 12 can be monitored by means of a sensor system (not shown) at the infeed and/or discharge device 15. Once the location of each source container 5 is known from the tracking, and the sensor system is monitoring the transport of the source containers 5 from the fifth conveyor device 14 to the third conveyor device 12, the control unit 26 can reliably determine the sequence in which the source containers 5 are transported in the buffer track section 23 on the third conveyor device 12.

In the jointly described FIGS. 3a to 3j, a method is described for picking of items at a picking station 2 at which orders are processed. For reasons of better clarity, the conveyor units 44, 45, 49, 50 were not drawn in these figures. An order can be processed at a single picking station 2 even in suborders. Otherwise the orders, or the suborders of the orders, can also be processed at multiple picking stations 2. In this process, a target container 27 is initially delivered to a first picking station 2, and at least one item is picked. After that, the target container 27 is delivered to a second picking station 2, and at least one item is picked. In other words, the order cannot be fully processed at a single picking station 2, and the target container 27 is transported to the second picking station 2 by the fifth conveyor device 14 (FIG. 1) after partial picking at the first picking station 2.

In the following, "orders" are referred to for the sake of simplicity. An order can also be understood as a picking order. A customer order comprises at least one order. The orders are present as data records. The orders are electronically acquired at a computer (not shown) and transmitted to the control unit 26 (FIG. 1). Each order comprises one or more order lines. If the order specifies multiple order lines, then different items are required. Each order line has, at a minimum, information about a quantity of an ordered item and about an item type. In e-commerce, the lot sizes are small so there is a relatively high number of different orders, each with a small number of order lines. A first order can comprise a single order line, for example 1 book. A second order can comprise a first order line, for example 2 DVDs, and a second order line, for example 7 CDs. A third order can comprise a first order line, for example 20 ballpoint pens, a second order line, for example 12 notebooks, a third order line, for example 1 package of copier paper, and a fourth order line, for example 3 packages of staples, etc.

For initial processing of (new) orders, empty target containers 27 are delivered by the conveyor device 29. The empty target containers 27 are identified, and an empty target container 27 is linked by data means to an acquired order.

Transport of the identified and empty target container 27 to the loading position 35 takes place after triggering of an above-described control signal by manual pressing of a confirmation key at the input and/or output system 51, or by detection of a confirmation signal, for example from a camera system. With this control signal, the conveyor device 29 is controlled by the control unit 26 such that the empty target container 27 is transported to the loading position 35 (while bypassing the sorting buffer) for processing of the at least one order line for the order.

In the sorting buffer 36, target containers 27 are temporarily buffered that require items for more than one order line and already contain a first order line. Therefore, at least one item has been placed in each of the target containers 27. However, some target containers 27, which are delivered by the conveyor system 29 that connects to the sorting buffer 36, may also be empty.

If, for example, the order comprises a first order line (2 DVDs) and a second order line (7 CDs), and if a (first) source container 5 provided at the retrieval position 33 contains the items for the first order line, after picking of the items for the first order line has occurred, the target container 27 is transported into the sorting buffer 36 for the time being. If a (second) source container 5 with the items for the second order line is provided at the retrieval position 33, then the target container 27 is again provided at the (single) loading position 35, and the item for the second order line is picked. This process is carried out at the picking station 2 over a number of orders.

The source containers 5 are retrieved in a random (chaotic) sequence from the warehouse 1, and are conveyed to the retrieval position 33 in a random (chaotic) sequence. The sequence in which the source containers 5 are conveyed to the retrieval position 33 may differ from the sequence in which the source containers 5 are retrieved from the warehouse 1. Preferably, each of the source containers 5 stores a single item type. This is referred to as so-called "single-product" source containers 5.

Customarily, a number of orders are to be processed at the picking station 2, and these include some orders that comprise more than one order line. This has the consequence that the target containers 27 must be provided several times at the (single) loading position 35 and in a sequence that is determined as a function of the sequence in which the source containers 5 are provided at the retrieval position 33, as described above.

FIG. 3a shows one possible operating state at the picking station 2. The orders "A1 to A6" are assigned to this picking station 2, and each order comprises multiple order lines. Each of the order lines (item 1, item 2, etc.) has, at a minimum, information about the associated quantity of an ordered item and about its item type.

| Item | Quantity | Item Type |
|------|----------|-----------|
| Order 1 | | |
| 1 | 2 | pen, red |
| 2 | 4 | pen, yellow |
| 3 | 1 | pen, green |
| Order 2 | | |
| 1 | 3 | cleaning agent |
| 2 | 5 | cleaning cloth |
| 3 | 1 | polish |
| 4 | 1 | cleaning brush |
| 5 | 1 | dish detergent |
| Order 3 | | |
| 1 | 1 | T-shirt, blue |
| 2 | 1 | T-shirt, green |
| 3 | 1 | T-shirt, black |
| Order 4 | | |
| 1 | 1 | book |
| 2 | 4 | glue |
| Order 5 | | |
| 1 | 1 | pants, black |
| 2 | 1 | sunglasses |
| Order 6 | | |
| 1 | 1 | shoes, brown |
| 2 | 1 | shoes, black |
| 3 | 1 | sweater, green |
| 4 | 1 | boots, black |

As is evident, target containers 27 for different orders are located in the sorting buffer 36 at the sorting positions 42-1 to 42-3 and at the buffer position 39-2, for example a target container "T3" for an order "A3," a target container "T4" for an order "A4," a target container "T5" for an order "A5," and a target container "T6" for an order "A6." In addition, target containers 27 for different orders are located on the delivery device 34, for example a target container "T2" for an order "A2," and a target container "T1" for an order "A1." Order "A1" is currently being processed.

As is not shown in detail, an empty target container 27 for the order "A1" is delivered beforehand to the picking station 2 by the conveyor device 29. The empty target container 27 is identified and linked by data means to the order "A1." The target container 27 now corresponds to the target container "T1." In the meantime, the source container "S1.1" is also transported from the buffer track section 23 to the retrieval position 33. If the source container "S1.1" is provided at the retrieval position 33 and the target container "T1" is provided at the loading position 35, a first order line can be processed, thus two red pens are retrieved from the source container "S1.1" and placed in the target container "T1." The target container "T1" is then transported from the loading position 35 back into the sorting buffer 36 and to a sorting position 42-4 determined by the control unit 26, since a second order line (item 2) still remains to be processed.

For further processing of the orders "A1 to A6," the source containers 5 are retrieved from the warehouse 1 and transported by the source container conveyor system to the picking station 2. Each source container 5 contains an item for processing of an order line for an order. This means that the source container "S1.2" stores the item "yellow pen" for the second order line (item 2), the source container "S2.3" stores the item "polish" for the third order line (item 3), the source container "S3.2" stores the item "green T-shirt" for the second order line (item 2), the source container "S1.3" stores the item "green pen" for the third order line (item 3), the source container "S2.4" stores the item "cleaning brush" for the fourth order line (item 4), and the source container "S3.3" stores the item "black T-shirt" for the third order line (item 3). The first digit in the term "Sx.y" denotes the order, and the second digit denotes the order line.

As is evident, some of the source containers "S1.2 to S3.3" required for the orders "A1 to A6" are already located in a buffer track section 23 of the source container distribution system, in particular of the source container conveyor system.

Even though the source containers "S1.2 to S3.3" are delivered to the retrieval position 33 in a random sequence, this sequence is detected at the sequence determination point 52 (FIG. 1). The target containers "T1 to T3" are sorted in and by the sorting buffer 36 into a sequence that is determined by the sequence of the source containers "S1.2 to S3.3."

In FIG. 3a, the source container "S1.2" for the second order line (item 2) is located at the retrieval position 33, and the target container "T1" is located at the loading position 35. The second order line (item 2) comprises 4 yellow pens, which are retrieved from the source container "S1.2" and placed in the target container "T1." After the last (manual or automatic) retrieval of an item from the source container "S1.2" or the last placement of an item into the target container "T1," a control signal is triggered. With this control signal, at least the buffer track section 23 and the conveyor unit 49 on the delivery device 32 and the conveyor unit 50 on the delivery device 34 and the conveyor unit 45 on the conveyor device 40 are controlled by the control unit 26 such that the source container "S1.2" is transported away from the retrieval position 33, the source container "S2.3" is delivered to the retrieval position 33, the previously processed target container "T1" is transported away from the loading position 35, and the yet-to-be processed target container "T2" is delivered to the loading position 35.

As can be seen in FIG. 3b, the previously processed target container "T1" is transported from the loading position 35 back into the sorting buffer 36 and to a sorting position 42-4 determined by the control unit 26, since a third order line (item 3) still remains to be processed. The source container "S1.2" is transported away from the retrieval position 33 on the source container conveyor system, and returned to stock in the warehouse 1. If the source container "S2.3" is provided at the retrieval position 33 and the target container "T2" is provided at the loading position 35, then the third order line (item 3) can be processed, thus 1 unit of polish is retrieved from the source container "S2.3" and placed in the target container "T2." After the (manual or automatic) retrieval of the single item from the source container "S2.3" or the last placement of the single item into the target container "T2," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S2.3" is transported away from the retrieval position 33, the source container "S3.2" is delivered to the retrieval position 33, the previously processed target container "T2" is transported away from the loading position 35, and the yet-to-be processed target container "T3" is delivered to the loading position 35. The source container "S2.3" is transported away by the source container conveyor system (FIG. 3d).

The previously processed target container "T2" is transported from the loading position 35 back into the sorting buffer 36 and to a sorting position 42-4 determined by the control unit 26, since a fourth order line (item 4) still remains to be processed (FIG. 3d). In the meantime, the source container "S2.5" for the fifth order line (item 5) with the item "dish detergent" has been transported into the buffer track section 23.

As can be seen in FIG. 3c, the target container "T1" can be moved directly from the sorting position 42-4 to one of the buffer positions 39-2 determined by the control unit 26, and after that to the delivery device 34 once the source container "S1.3" having an item for the third order line (item 3) has been transported into the buffer track section 23. Transport of the target container "T1" from one of the sorting positions 42-4 to one of the buffer positions 39-2 is accomplished by means of the conveyor unit 46, 47 of one of the third conveyor devices 43, for example the conveyor units 47 of the sorting position 42-4 and of the buffer position 39-2. The conveyor unit 46, 47 is controlled by the control unit 26 in this process. The target container "T1" is moved past the target containers "T4 to T6" temporarily buffered at the sorting positions 42-1 to 42-3 in the sorting buffer 36. Consequently, a sorting process is performed by the sorting buffer 36 via the sorting positions 42-1 to 42-5.

As can be seen in FIG. 3d, the target container "T2" was transported from the loading position 35 back into the sorting buffer 36 and to a sorting position 42-4 determined by the control unit 26, since a fourth order line (item 4) still remains to be processed. The target container "T1" was transported from one of the buffer positions 39-2 out of the sorting buffer 36 to the delivery device 34. In this process, the target container "T1" is transported from the buffer position 39-2 to the delivery device 34 after the (manual or automatic) retrieval of the item from the source container "S2.3," and after the yet-to-be processed target container "T3" has been transported to the loading position 35 and the previously processed target container "T2" has been transported to one of the sorting positions 42-4 determined by the control unit 26. To this end, after the (manual or automatic) retrieval of the item from the source container "S2.3" or last placement of the item in the target container "T2," a control signal is triggered, and the conveyor unit 44 of the first conveyor device 37 and the conveyor unit 50 of the delivery device 34 are controlled by the control unit 26 such that the target container "T1" is transported from the buffer position 39-2 to the loading position 35 (FIG. 3e).

As illustrated, the source container "S3.2" for the second order line (item 2) is located at the retrieval position 33 and the target container "T3" is located at the loading position 35. The second order line (item 2) comprises 1 green T-shirt, which is retrieved from the source container "S3.2" and placed in the target container "T3."

After the (manual or automatic) retrieval of the item from the source container "S3.2" or the last placement of an item into the target container "T3," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S3.2" is transported away from the retrieval position 33, the source container "S1.3" is delivered to the retrieval position 33, the previously processed target container "T3" is transported away from the loading position 35, and the yet-to-be processed target container "T1" is delivered to the loading position 35. The source container "S3.2" is transported away by the source container conveyor system (FIG. 3e). The previously processed target container "T2" is transported from the loading position 35 back into the sorting buffer 36 and to a sorting position 42-4 determined by the control unit 26, since a fourth order line (item 4) still remains to be processed. In the meantime, the source container "S5.2" for the second order line (item 2) with the item "sunglasses" has been transported into the buffer track section 23.

As can be seen in FIG. 3e, the target container "T5" can be transported from the sorting position to one of the buffer positions 39-4 determined by the control unit 26 after the source container "S5.2" with an item for the second order line (item 2) has already been transported into the buffer track section 23. However, the target container "T5" cannot yet be moved to the loading position 35 or the delivery device 34 because the target container "T2" must still be placed in line ahead of this target container "T5." Transport of the target container "T2" from one of the sorting positions 42-4 to one of the buffer positions 39-2 is accomplished by means of the conveyor unit 46, 47 of one of the third conveyor devices 43, for example the conveyor units 47 of the sorting position 42-4 and of the buffer position 39-2. Transport of the target container "T5" from one of the sorting positions 42-2 to one of the buffer positions 39-4 is accomplished by means of the conveyor unit 46, 47 of one of the third conveyor devices 43, for example the conveyor units 46 for the sorting position 42-2 and buffer position 39-4. The conveyor units 46 and the third conveyor devices 43 are controlled independently of one another by the control unit 26. Accordingly, the target containers "T2 and T5" can be transported in parallel between the sorting positions 42-2, 42-4 and the buffer positions 39-4, 39-2. The target container "T5" can be transported from the sorting position 42-2 to the buffer position 39-4 before the target container "T2." As a basic principle, however, the target container "T5" could also not be transported from the sorting position 42-2 to the buffer position 39-4 until after the target container "T2." The target container "T2" can be moved past the target container "T5" located at the buffer position 39-4 in the sorting buffer 36 and/or target containers "T4 to T6" temporarily buffered at sorting positions 42-1, 42-2. Consequently, a sorting process is performed by the sorting buffer 36 via the buffer positions 39-1 to 39-5 and/or sorting positions 42-1 to 42-5.

After the target container "T5" has been transported from the sorting position 42-2 to the buffer position 39-4, the target container "T4" can be transported downstream in the return direction from a sorting position 42-3 to a sorting position 42-2. Transport of the target container "T4" from the sorting position 42-3 to the sorting position 42-2 is accomplished by means of the conveyor unit 45 of the second conveyor device 40 or by means of the conveyor unit 45 of the sorting positions 42-2, 42-3. The conveyor unit(s) 46 is/are controlled by the control unit 26 in this process. The target container "T3," in contrast, is not transported from the sorting position 42-4 to the sorting position 42-3, because it must be transported directly to the loading position 35.

As can also be seen, the previously processed target container "T3" is transported from the loading position 35 back into the sorting buffer 36 and to a sorting position 42-4 determined by the control unit 26, since a third order line (item 3) still remains to be processed. It would of course also be possible that the target container "T3" is transported via the sorting position 42-4 to a sorting position 42-3 determined by the control unit 26.

As can be seen in FIG. 3f, the target container "T2" was transported from the buffer position to the delivery device 34 by means of the conveyor unit 44 of the first conveyor device 37 and the conveyor unit 50 of the delivery device 34.

The target container "T5" was transported by means of the conveyor unit 44 of the first conveyor device 37 to the buffer position 39-4. In contrast, the source container "S1.3" for the third order line (item 3) is located at the retrieval position 33 and the target container "T1" is located at the loading position 35 in order to process the third order line (item 3). One green pen is retrieved from the source container "S1.3" and placed in the target container "T1." After the (manual or automatic) retrieval of the single item from the source container "S1.3" or the last placement of an item into the target container "T1," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S1.3" is transported away from the retrieval position 33, the source container "S2.4" is delivered to the retrieval position 33, the previously processed target container "T1" is transported away from the loading position 35, and the yet-to-be processed target container "T2" is delivered to the loading position 35. The source container "S1.3" is transported away by the source container conveyor system. The fully picked target container "T1" for this order will be transported on the target container conveyor system. Transport of the target container "T1" from the loading position 35 on the target container conveyor system is accomplished by the conveyor unit 45 of the second conveyor device 40, the conveyor unit 47 at the sorting position 42-4, and the conveyor unit 31 of the conveyor system 30. Preferably, the source container conveyor system is also used as target container conveyor system, and the target container "T1" is discharged from the conveyor system 30 to the conveyor system 13 before or after the source container "S1.3," as depicted in FIG. 3g. The target container "T1" is transported to the shipping area 28.

As can be seen in FIG. 3g, the target container "T5" was transported from the buffer position 39-3 to the buffer position 39-2. Transport of the target container "T5" in this case is accomplished by means of the conveyor unit 44 of the first conveyor device 37 or the conveyor unit 44 of the buffer positions 39-4, 39-3. The target container "T4" can be transported from the sorting position 42-2 to one of the buffer positions 39-4 determined by the control unit 26 after the source container "S4.2" with an item for the second order line (item 2) has already been transported into the buffer track section 23. However, the target container "T4" cannot yet be moved to the loading position 35 because the target container "T5" is in line ahead of this target container "T4." Transport of the target container "T4" from one of the sorting positions 42-2 to one of the buffer positions 39-4 is accomplished by means of the conveyor unit 46 of one of the third conveyor devices 43. The target container "T5" likewise cannot yet be moved to the loading position 35 because the target container "T2" is still to be placed in line ahead of this target container "T5."

Figure 3H:
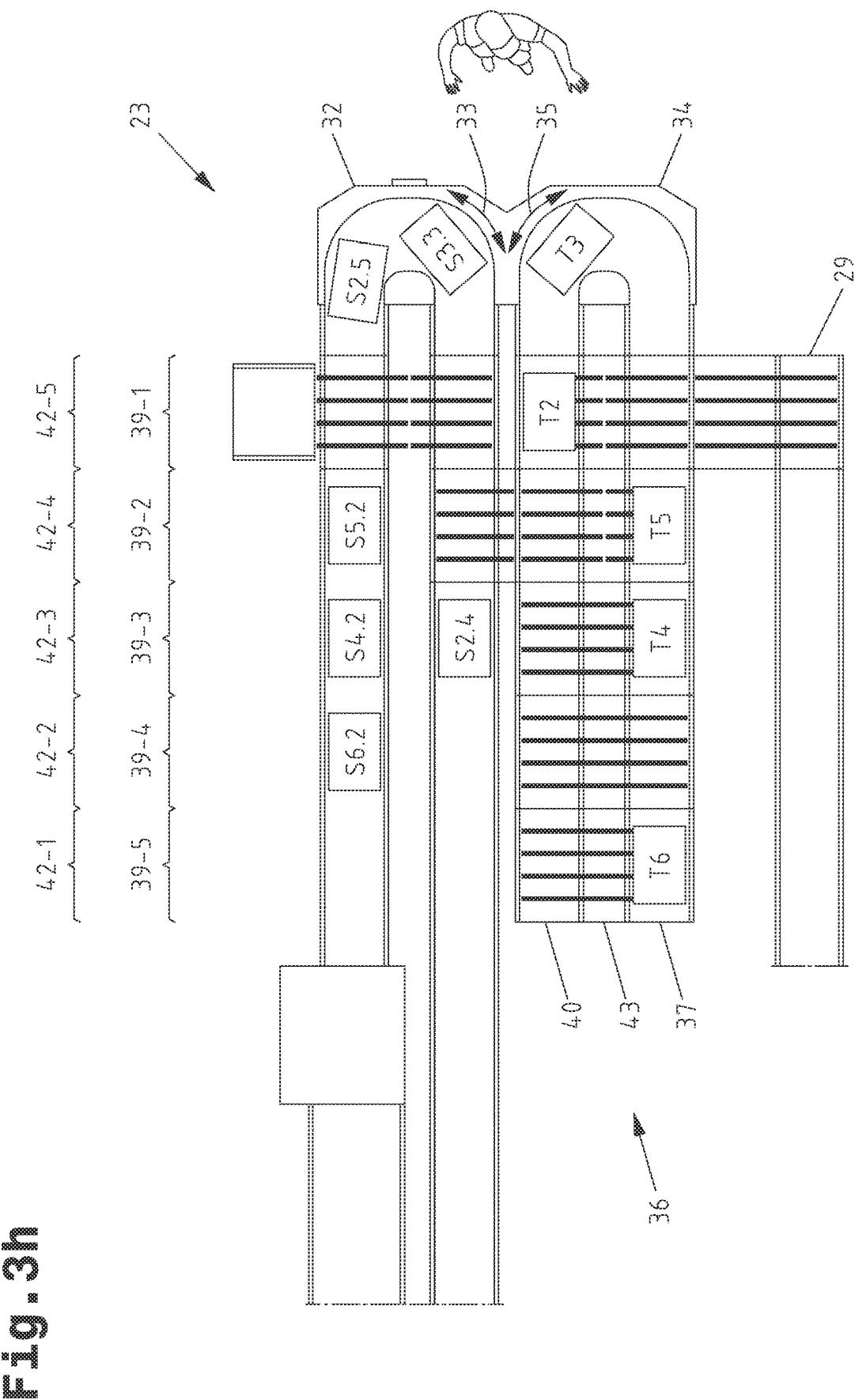

The source container "S2.4" for the fourth order line (item 4) is provided at the retrieval position 33 and the target container "T2" is provided at the loading position 35 in order to process the fourth order line (item 4). One cleaning brush is retrieved from the source container "S2.4" and placed in the target container "T2." After the (manual or automatic) retrieval of the item from the source container "S2.4" or the last placement of an item into the target container "T2," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S2.4" is transported away from the retrieval position 33, the source container "S3.3" is delivered to the retrieval position 33, the previously processed target container "T2" is transported away from the loading position 35, and the yet-to-be processed target container "T3" is delivered to the loading position 35. The source container "S2.4" is transported away by the source container conveyor system (FIG. 3h). The previously processed target container "T2" is transported from the loading position 35 back into the sorting buffer 36 and to a sorting position 42-4 determined by the control unit 26, since a fifth order line (item 5) still remains to be processed.

As can be seen in FIG. 3h, the source container "S3.3" for the third order line (item 3) is located at the retrieval position 33 and the target container "T3" is located at the loading position 35 in order to process the third order line (item 3). In the meantime, the source container "S6.2" for the second order line (item 2) with the item "black shoes" has been transported into the buffer track section 23. Consequently, the target container "T6" can be transported from the sorting position 42-1 to one of the buffer positions 39-5 determined by the control unit 26. The target container "T4" was transported from the buffer position 39-4 to the buffer position 39-3. Transport of the target container "T4" in this case is accomplished by means of the conveyor unit 44 of the first conveyor device 37 or the conveyor unit 44 of the buffer positions 39-4, 39-3.

As is shown in FIG. 3i, the target container "T2" can be moved directly via the sorting position 42-5 to one of the buffer positions 39-1 determined by the control unit 26, and after that to the delivery device 34 or to the loading position 35 once the source container "S2.5" having an item for the fifth order line (item 5) has been transported into the buffer track section 23. The target container "T6" was transported from the buffer position 39-5 to the buffer position 39-4.

Lastly, FIG. 3j shows the target container "T2" at the loading position 35 and the source container "S2.5" at the retrieval position 33 in order to process the fifth order line (item 5). One unit of dish detergent is retrieved from the source container "S2.5" and placed in the target container "T2."

After the (manual or automatic) retrieval of the single item from the source container "S2.5" or the last placement of an item into the target container "T2," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S2.5" is transported away from the retrieval position 33, the source container "S5.2" is delivered to the retrieval position 33, the previously processed target container "T2" is transported away from the loading position 35, and the yet-to-be processed target container "T5" is delivered to the loading position 35. The source container "S2.5" is then transported away by the source container conveyor system. The fully picked target container "T2" for this order will then be transported on the target container conveyor system. Transport of the target container "T2" from the loading position 35 on the target container conveyor system is accomplished by the conveyor unit 45 of the second conveyor device 40, the conveyor unit 47 at the sorting position 42-4, and the conveyor unit 31 of the conveyor system 30. The target container "T2" is transported to the shipping area 28.

Thereafter, the orders "A5, A4, A6" are processed one after the other. The fully picked target containers "T5, T4"

are again transported on the target container conveyor system. Additional order lines are to be processed for the order "A6," and this target container "T6" is again transported from the loading position 35 back into the sorting buffer 36 and to a sorting position determined by the control unit 26 after placement of the item for the second order line (item 2), since a third/fourth order line (item 3, 4) still remains to be processed.

In order to be able to carry out continuous processing of additional orders "A7 . . . An," empty target containers 27 are delivered to the picking station 2 via the conveyor device 29, as shown by way of example in FIG. 3j. The empty target container 27 is identified and linked by data means to the order "A7." The target container 27 now corresponds to the target container "T7." In the meantime, the source container "S7.1" is also transported from the buffer track section 23 to the retrieval position 33. The target container "T7" is placed in line behind the target containers "T4, T6." If the source container "S7.1" is provided at the retrieval position 33 and the target container "T7" is provided at the loading position 35, a first order line can be processed. The target container "T7" is then transported from the loading position 35 back into the sorting buffer 36 and to a sorting position determined by the control unit 26 if a second order line still remains to be processed. If the order "A7" comprises only a single order line, then the target container "T7" is transported directly on the target container conveyor system. The target container "T7" is transported to the shipping area 28.

It should be noted here that a target container "T1 . . . T6" can also be transported from the loading position 35 to the sorting position 42-5 or another sorting position 42-4 to 42-1, depending on which of the sorting positions 42-1 to 42-5 is occupied. Generally speaking, the control unit 26 determines the particular sorting position 42-5 that is unoccupied and is as close as possible to the loading position 35. In this way, short changeover times for the provision of the target containers "T1 . . . T6" at the loading position 35 are achieved.

It will be perceived on the basis of this exemplary embodiment that a first target container "T1 . . . T6" for processing of different order lines for at least one order "A1 . . . A6" is transported back into the sorting buffer 36 after placement of an item for a first order line, and is temporarily buffered at a first sorting position at least until a source container "S1.2 . . . S6.2" with an item for a second order line is conveyed onward into a buffer track section 23 provided upstream of the retrieval position 33. The said first target container "T1 . . . T6" can be moved from the first sorting position to one of the buffer positions and subsequently to the/toward the loading position 35 once the source container "S1.2 . . . S6.2" having an item for a second order line has been transported into the buffer track section 23. In this case, according to a first approach the said target container "T1 . . . T6" is moved to the loading position 35 immediately after having been transported to the buffer position 39 (see, for example, FIGS. 3b to 3d). According to a second approach, another target container "T1 . . . T6" is placed in line ahead of the said target container "T1 . . . T6" in the sequence of target containers "T1 . . . T6" at the buffer positions 39, and the said target container "T1 . . . T6" is not moved to the loading position 35 until after the target container "T1 . . . T6" in line ahead of it (see, for example, FIGS. 3e to 3j). Both approaches customarily occur in operation of the sorting buffer 36.

On the other hand, it can also be perceived on the basis of this exemplary embodiment that a second target container "T1 . . . T6" for processing of different order lines for at least one order "A1 . . . A6" is transported back into the sorting buffer 36 after placement of an item for a first order line, and is moved via a second sorting position to one of the buffer positions and subsequently to the/toward the loading position 35 if a source container "S1.2 . . . S6.2" with an item for a second order line has already been transported into a buffer track section 23 provided upstream of the retrieval position 33.

The target containers "T1 . . . T6" are transported in the sorted sequence and one after the other from the sorting buffer 36 to the loading position 35, wherein transport of the source containers "S1.2 . . . S6.2" from the warehouse 1 to the retrieval position 33 and transport of the target containers "T1 . . . T6" from the sorting buffer 36 to the loading position 35 are matched to one another such that one source container "S1.2 . . . S6.2" and one target container "T1 . . . T6" for one order arrive at the retrieval position 33 and the loading position 35 approximately simultaneously.

In the jointly described FIGS. 4a to 4d, a method is shown for picking of items at an above-described picking station 2 in which the sequence of the source containers 5 is changed into a modified sequence.

Generally speaking, the source containers 5 are retrieved in a random (chaotic) sequence from the warehouse 1, and are conveyed on the buffer track section 23 in a random (chaotic) sequence. This random (chaotic) sequence of some of the source containers 5 may optionally be changed.

The control unit 26 is equipped to determine a modified sequence of the source containers 5 that are required for different order lines for one or more orders. The source containers 5 are then transported to the retrieval position 33 in the modified sequence. As described above, the control unit 26 can determine the random (chaotic) sequence. In other words, the control unit 26 determines the location of each source container 5 along the transport path between the warehouse 1, in particular the sequence determination point 52, and the retrieval position 33.

If the random (chaotic) sequence is to be changed, then the conveyor unit 22 is controlled by the control unit 26 such that a single source container 5 or multiple source containers 5 is/are discharged from the buffer track section 23 to the bypass buffer 21 via the conveyor unit 22, and fed back into the buffer track section 23 from the bypass buffer 21 in a time-controlled manner.

As shown in the exemplary embodiment, the source container "S1.1" for the first order line (item 1), the source container "S3.2" for the second order line (item 2), the source container "S1.2" for the second order line (item 2), and the source container "S3.3" for the third order line (item 3) are transported in the buffer track section 23 in the specified sequence. In the sorting buffer 36, the target containers "T3 to T6" can be buffered, wherein the target containers "T4 to T6" are placed at the sorting positions 42-1, 42-2, 42-3, since none of the source containers 5 required for these orders have as yet been transported into the buffer track section 23. The target container "T3" has been moved from the sorting position 42-4 to the buffer position 39-2. The target container "T1" is still in line ahead of the target container "T3." The target container "T1" is a still-empty target container 27, and was delivered via the conveyor system 29.

It should also be noted that an order can be processed at multiple picking stations 2. In this case, at least one order line of this order is processed at a first picking station 2, and at least one line of this order is processed at a second picking station 2.

Figure 4B:
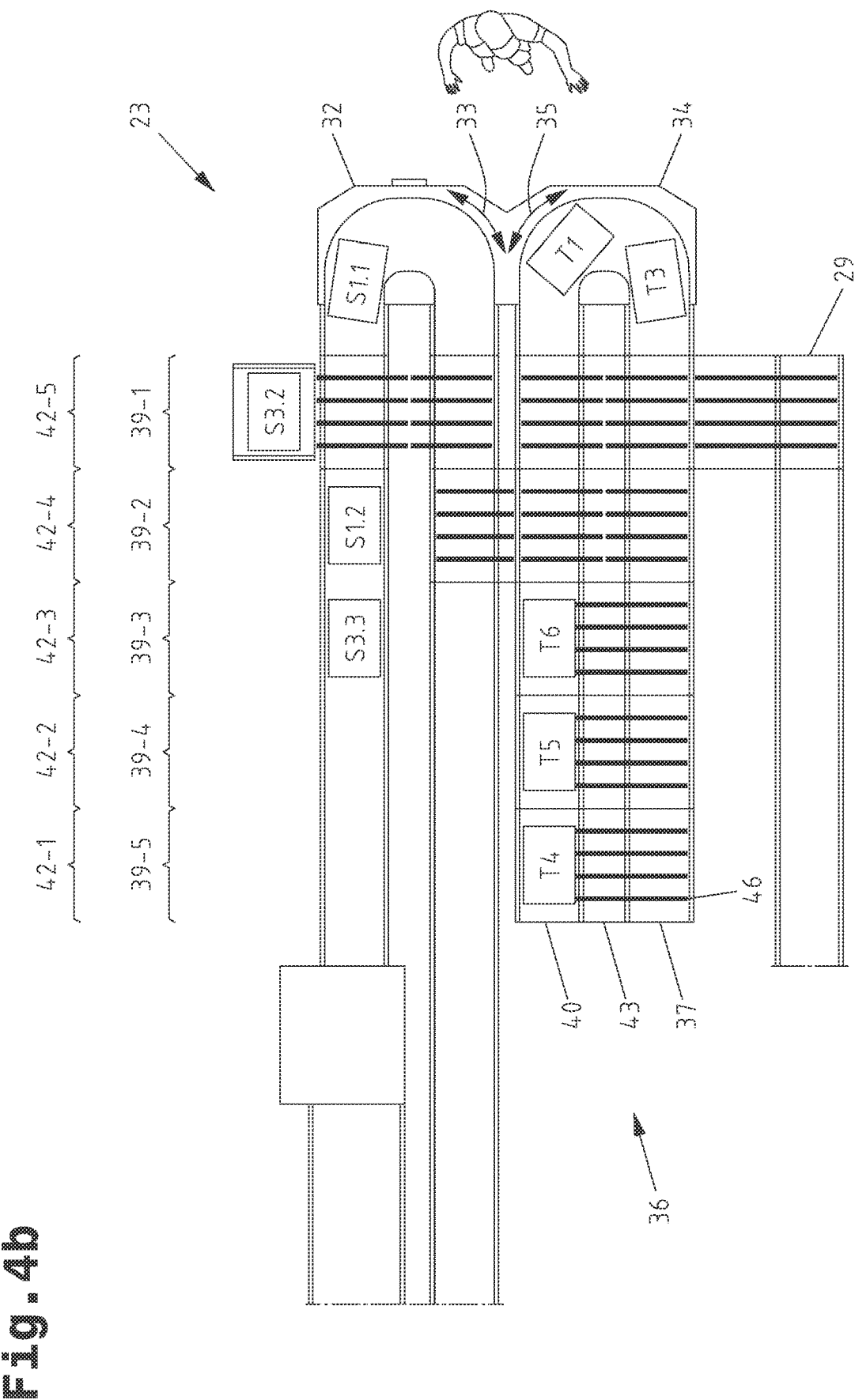

As can be seen in FIGS. 4a to 4c, the first source container "S1.1" is moved past the bypass buffer 21. The source container "S1.1" is provided at the retrieval position 33, and the target container T1 is provided at the loading position 35. After that, an item for the first order line (item 1) can be retrieved from the source container "S1.1" and placed in the target container T1.

After the last (manual or automatic) retrieval of an item from the first source container "S1.1" or the last placement of an item into the target container "T1," a control signal is triggered. With this control signal, at least the buffer track section 23 and the conveyor unit 49 on the delivery device 32 are controlled by the control unit 26 such that the source container "S1.1" is transported away from the retrieval position 33, and the second source container "S1.2" in line ahead of the source container "S3.2" is delivered to the retrieval position 33. The source container "S1.1" is transported away by the source container conveyor system. The target container T1 remains at the loading position 35 until the second source container "S1.2" is provided at the retrieval position 33.

As can be seen in FIG. 4b, the source container "S3.2" following behind the source container "S1.1" is discharged from the buffer track section 23 to the bypass buffer 21 via the conveyor unit 22 controlled by the control unit 26.

As can be seen in FIG. 4c, the source container "S1.2" is moved past the source container "S3.2" parked in the bypass buffer 21, and is transported to the retrieval position 33.

As can be seen in FIG. 4d, the source container "S1.2" is provided at the retrieval position 33, and an item can be retrieved from the source container "S1.2" and placed in the target container T1 for the second order line (item 2). After the last (manual or automatic) retrieval of an item from the source container "S1.2" or the last placement of an item into the target container "T1," a control signal is triggered. With this control signal, at least the buffer track section 23 and the conveyor unit 49 on the delivery device 32 and the conveyor unit 50 on the delivery device 34 and the conveyor unit 45 on the conveyor device 40 and the conveyor unit 47 at the sorting position 42-4 and, if applicable, the conveyor unit 31 of the conveyor system 30 are controlled by the control unit 26 such that the source container "S1.2" is transported away from the retrieval position 33, the source container "S3.2" is delivered to the retrieval position 33, the previously processed target container "T1" is transported away from the loading position 35, and the yet-to-be processed target container "T3" is delivered to the loading position 35. The target container "T1" can either be buffered in the sorting buffer 36 at one of the sorting positions 42-4, 42-5 or be transported on the target container conveyor system.

As can additionally be seen, after the source container "S1.2" has been transported past the bypass buffer 21, the source container "S3.2" is fed from the bypass buffer 21 to the buffer track section 23 via the conveyor unit 22 controlled by the control unit 26. After that, the source container "S3.2" is transported to the retrieval position 33, as is the source container "S3.3" in line behind it.

As is evident from that which has been described, some of the source containers 5, for example the source containers "S1.1, S1.2, S3.2, S3.3," can be transported to the loading position 35 in a modified sequence, and provided sequentially in this modified sequence at the retrieval position 33.

Within the scope of the invention, the bypass buffer 21 shown may also accommodate more than one source container 5, for example two, three, or four source containers 5. For this case, the source containers 5 can be discharged from the buffer track section 23 to the bypass buffer 21 via the conveyor unit 22, or fed back to the buffer track section 23 from the bypass buffer 21, simultaneously or one after the other.

In the jointly described FIGS. 5a to 5c, a method is shown for picking of items at an above-described picking station 2 in which the removal of a target container 27 from the loading position 35 is controlled by an order picking person. Such a measure of the method is applicable when it is visually ascertained by the order picking person that a target container 27 cannot accommodate all the items for an order line and an additional target container 27 is required in order to process the remainder of the items for said order line. Picking by means of robots is fundamentally also possible, wherein an acknowledgment signal is triggered if it is ascertained by the robot or a camera system/a sensor system that a target container 27 cannot accommodate all the items for an order line and an additional target container 27 is required in order to process the remainder of the items for said order line.

As shown in the exemplary embodiment, the source container "S1.1" for the first order line (item 1), the source container "S2.2" for the second order line (item 2), the source container "S3.2" for the second order line (item 2), and the source container "S4.2" for the second order line (item 2) are transported in the buffer track section 23. In the sorting buffer 36, the target containers "T3 to T6" can be buffered, wherein the target containers "T5, T6" are placed at the sorting positions 42-1, 42-2, since none of the source containers 5 required for these orders have as yet been transported into the buffer track section 23. The target containers "T3, T4" have been moved from the sorting positions 42-3, 42-4 to the buffer positions 39-3, 39-2.

As can be seen in FIG. 5a, the source container "S1.1" for the first order line (item 1) of a first order is provided at the retrieval position 33, and the target container "T1.1" is provided at the loading position 35. The first order line comprises multiple items for a first order, which must be placed in multiple target containers "T1.1, T1.2." In this case, at least one item for this first order line is placed in a first target container "T1.1" and at least one item for this first order line is placed in a second target container "T1.2." However, the second target container "T1.2" must be inserted after the target container "T2" because the latter has already been transported on the delivery device 34. The source container "S2.2" has likewise already been transported on the delivery device 32.

After the last retrieval of an item from the source container "S1.1" and placement of this item into the first target container "T1.1," a control signal is triggered. With this control signal, the conveyor unit 49 on the delivery device 32 and the (fourth) conveyor device 13 and the (sixth) conveyor device and the conveyor unit 50 on the delivery device 34 and the conveyor unit 45 on the conveyor device 40 and the conveyor unit 47 at the sorting position 42-4 and the conveyor unit 31 of the conveyor system 30 are controlled by the control unit 26 such that the source container "S1.1" is transported away from the retrieval position 33, the source container "S2.2" is delivered to the retrieval position 33, the previously processed target container "T1.1" is transported away from the loading position 35, and the yet-to-be processed target container "T2" is delivered to the loading position 35.

In this process, as shown in FIG. 5b, the source container "S1.1" is transported via the (fourth) conveyor device 13 and the (sixth) conveyor device 22, 25 from the retrieval position 33 to the buffer track section 23, and transferred to the latter. The target container "T1.1" picked for this order is transported on the target container conveyor system. Transport of the target container "T1.1" from the loading position 35 on the target container conveyor system is accomplished by the conveyor unit 45 of the second conveyor device 40, the conveyor unit 47 at the sorting position 42-4, and the conveyor unit 31 of the conveyor system 30. In addition, after the triggering of this control signal by the order picking person, the target container conveyor system is controlled by the control unit 26 such that an empty target container "T1.2" is requested and is transported to the loading position 35 for further processing of the first order line for the first order.

If the source container "S2.2" for the second order line (item 2) of a second order is provided at the retrieval position 33 and the target container "T2" is provided at the loading position 35, then the second order line can be processed, thus the item/items can be retrieved from the source container "S2.2" and placed in the target container "T2."

After the last retrieval of an item from the source container "S2.2" and placement of this item into the target container "T2," a control signal is triggered. With this control signal, at least the buffer track section 23, the conveyor unit 49 on the delivery device 32 and the conveyor unit 50 on the delivery device 34 are controlled by the control unit 26 such that the source container "S2.2" is transported away from the retrieval position 33, the source container "S1.1" is again delivered from the buffer track section 23 to the retrieval position 33, the previously processed target container "T2" is transported away from the loading position 35, and the yet-to-be processed target container "T1.2" is delivered to the loading position 35. The target container "T2" is transported from the loading position 35 back into the sorting buffer 36 and to a sorting position 42-3 determined by the control unit 26, since a third order line (item 3) still remains to be processed.

If the source container "S1.1" for the first order line (item 1) of a first order is provided at the retrieval position 33 and the target container "T1.2" is provided at the loading position 35, as shown in FIG. 5c, then the first order line can be processed (to completion), thus the (remaining) item/items can be retrieved from the source container "S1.1" and placed in the target container "T1.2." The fully picked target container "T1.2" for this order is transported either to the target container conveyor system or into the sorting buffer 36.

In the exemplary embodiment described, the target containers "T1.1, T1.2" were provided as empty target containers 27. It is also possible that the first target container 27 already contains items and that the items for the first order line cannot be accommodated in this target container 27 for this reason. For example, the item for the first order line is too big. In this case, the control signal is triggered once it has been ascertained that an item cannot be placed in the first target container 27. The retrieval of an item from the source container 5 is thus not strictly necessary for triggering a control signal.

In the jointly described FIGS. 6a to 6c, a method is shown for picking of items at an above-described picking station 2 in which a first, loaded target container 27 is transported away from the loading position 35 and a second, empty target container 27 is delivered to the loading position 35 by the control unit 26 on the basis of a "load-specific" parameter (and without control intervention by an order picking person) because the first target container 27 cannot accommodate all the items for an order line and at least one additional target container 27 is required in order to process the remainder of the items for said order line.

To this end, at least one item-specific parameter for each item of an order having one or more order lines is electronically acquired, for example at a computer, and is processed by the control unit 26. In particular, a measurement for each item, such as the weight and/or volume and/or geometric shape, is acquired as the item-specific parameter.

In a first step, the control unit 26 determines an order-specific parameter based on the one or more order lines that are processed for an order and on the item-specific parameters for each item. In particular, a total volume or total weight of all items for an order or a load configuration (packing pattern) for the items in the target container 27 is determined as the order-specific parameter.

In a second step, the control unit 26 determines a load-specific parameter of at least one target container 27 into which the items for the said order are to be placed. In particular, an available loading volume or maximum weight of load or which items can still be/can no longer be accommodated in the target container due to their geometric shapes is determined as the order-specific parameter. In other words, whether the target container 27 is empty or already partially filled is also taken into account. Thus, for example, an item with small measurements can still be accommodated in the target container 27, whereas an item with large measurements must be placed in an additional target container 27.

In a third step, the control unit 26 determines the number of second target containers 27 additionally required for processing of the said order based on the order-specific parameter and the load-specific parameter if an item cannot be placed in the first target container 27. If no additional target container 27 is required, the number is zero.

Provision of the target containers 27 in the requisite number and provision of the source containers 5 are coordinated in accordance with this advance calculation by the control unit 26.

As shown in the exemplary embodiment, the source container "S1.1" for the first order line (item 1), the source container "S5.2" for the second order line (item 2), and the source container "S3.3" for the third order line (item 3) are transported in the buffer track section 23. In the sorting buffer 36, the target containers "T2, T3, T5, T6" can be buffered, wherein the target containers "T2, T6" are placed at the sorting positions 42-1, 42-2, since none of the source containers 5 required for these orders have as yet been transported into the buffer track section 23. The target containers "T3, T5" have been moved from the sorting positions 42-3, 42-4 to the buffer positions 39-3, 39-2.

As can be seen in FIG. 6a, the source container "S4.1" for the first order line (item 1) of a fourth order is provided at the retrieval position 33, and the target container "T4" is provided at the loading position 35. After that, an item for the first order line (item 1) is retrieved from the source container "S4.1" and placed in the target container "T4." After the last retrieval of an item from the source container "S4.1" and placement of this item into the target container "T4," a control signal is triggered, and the process proceeds in the manner described above. Therefore, the target container "T4" is transported into the sorting buffer 36 and to the sorting position 42-3. The source container "S4.1" is transported to the source container conveyor system. In addition, after the triggering of this control signal by the order picking person, the target container conveyor system is controlled by the control unit 26 such that an empty target container "T1.2" is requested and is transported to the loading position 35 for further processing of an order line or of multiple order lines for an order or for multiple orders.

As can be seen in FIG. 6b, the source container "S1.1" for the first order line (item 1) of a first order is provided at the retrieval position 33, and the target container "T1.1" is provided at the loading position 35. The first order line comprises multiple items for a first order, which must be placed in multiple target containers "T1." As is not additionally shown, the first order can also comprise a second order line (item 2). As described above, the requisite number of target containers 27 is determined by the control unit 26 in the advance calculation, and the target containers 27 are provided one after the other at the loading position 35 accordingly.

As shown, the first order comprises a first order line (item 1) with a number of items, which cannot all be accommodated in a single target container "T1.1."

Firstly, the items for this first order line are retrieved from the source container "S1.1" and placed in the first target container "T1.1."

After the last retrieval of an item from the source container "S1.1" and placement of this item into the first target container "T1.1," a control signal is triggered by the control unit 26. With this control signal, the conveyor unit 50 on the delivery device 34 and the conveyor unit 45 on the conveyor device 40 and the conveyor unit 47 at the sorting position 42-4 and the conveyor unit 31 of the conveyor system 30 are controlled by the control unit 26 such that the previously processed, first target container "T1.1" is transported away from the loading position 35, and the additional, second target container "T1.2" is delivered to the loading position 35. The target container "T1.1" picked for this order is transported on the target container conveyor system in the manner described above. The source container "S1.1" remains at the loading position 35 until the second target container "T1.2" is provided at the loading position 35.

As can be seen in FIG. 6c, the source container "S1.1" for the first order line (item 1) of the first order is now provided at the retrieval position 33, and the target container "T1.2" is now provided at the loading position 35.

After that, an item is again retrieved for the first order line (item 1) from the source container "S1.1" and placed in the target container "T1.2." After the last retrieval of an item from the source container "S1.1" and placement of this item into the target container "T1.2," a control signal is triggered, and the process proceeds in the manner described above. Therefore, the target container "T1.2" is transported into the sorting buffer 36 or to the target container conveyor system. The source container "S1.1" is transported to the source container conveyor system.

In the said exemplary embodiment, the first target container "T1.1" for processing of the first order line (item 1) is described. Therefore, the first target container "T1.1" was provided as an empty target container "T1.1" by the target container conveyor system. Otherwise it is also possible, however, that the first target container "T1.1" is transported out of the sorting buffer 36 and to the loading position 35, since it already contains an item and can additionally have another item loaded into it. In order to be able to finish processing the order line or the order, an empty destination container 27 is then provided by the target container conveyor system as the second target container 27.

In the jointly described FIGS. 7a to 7d, a method is shown for picking of items at an above-described picking station 2 in which a first, loaded target container 27 is transported away from the sorting buffer 36 (while bypassing the loading position 35) and a second, empty target container 27 is delivered to the loading position 35 by the control unit 26 on the basis of a "load-specific" parameter (and without control intervention by an order picking person) in order to process the remainder of the items for one order line or for multiple order lines for an order.

To this end, the process proceeds in the manner described above, and the number of target containers 27 required is determined in advance by the control unit 26, and the provision of target containers 27 and source containers 5 is coordinated.

As shown in the exemplary embodiment, according to FIG. 7a the source container "S3.2" for the second order line (item 2), the source container "S1.2" for the second order line (item 2), and the source container "S5.2" for the second order line (item 2) are transported in the buffer track section 23. In the sorting buffer 36, the target containers "T1.1, T2, T5, T6" can be buffered, wherein the target containers "T2, T6" are placed at the sorting positions 42-1, 42-2, since none of the source containers 5 required for these orders have as yet been transported into the buffer track section 23. The target container "T5" has been moved from the sorting position 42-3 to the buffer position 39-3.

As described above, the random sequence of the source containers 5 in the buffer track section 23 is evaluated by the control unit 26. In like manner, a load-specific parameter for the target container "T1.1" is determined by the control unit 26. Since the sequence of the source containers 5 is "nearly" arbitrary, the case may arise that a source container "S1.2" for processing of the second order line is delivered to the retrieval position 33, which container contains an item that can no longer be placed in the target container "T1.1" on account of its geometric measurement. For this case, provision is made that the target container "T1.1" is not transported to the loading position 35 at all, but instead is transported away from the sorting buffer 36. If the target container "T1.1" has already been moved to one of the buffer positions 39-2 beforehand, it is transported from the buffer position 39-2 to the target container conveyor system via the sorting position 42-4.

A control signal is triggered by the control unit 26 after it has been ascertained that an item cannot be placed in the first target container "T1.1." With the control signal, at least the conveyor unit 47 of the third conveyor device 43 and the conveyor unit 31 of the conveyor device 30 are controlled by the control unit such that the first target container "T1.1" which cannot be filled further is transported away from the sorting buffer 36 to the target container conveyor system, as shown in FIG. 7b.

In addition, after the triggering of this control signal, the target container conveyor system can be controlled by the control unit 26 such that an empty target container "T1.2" is requested and is transported to the loading position 35 for further processing of an order line or of multiple order lines for an order or for multiple orders. In the meantime, the first order line (item 1) for a fourth order can be processed.

Figure 7C:
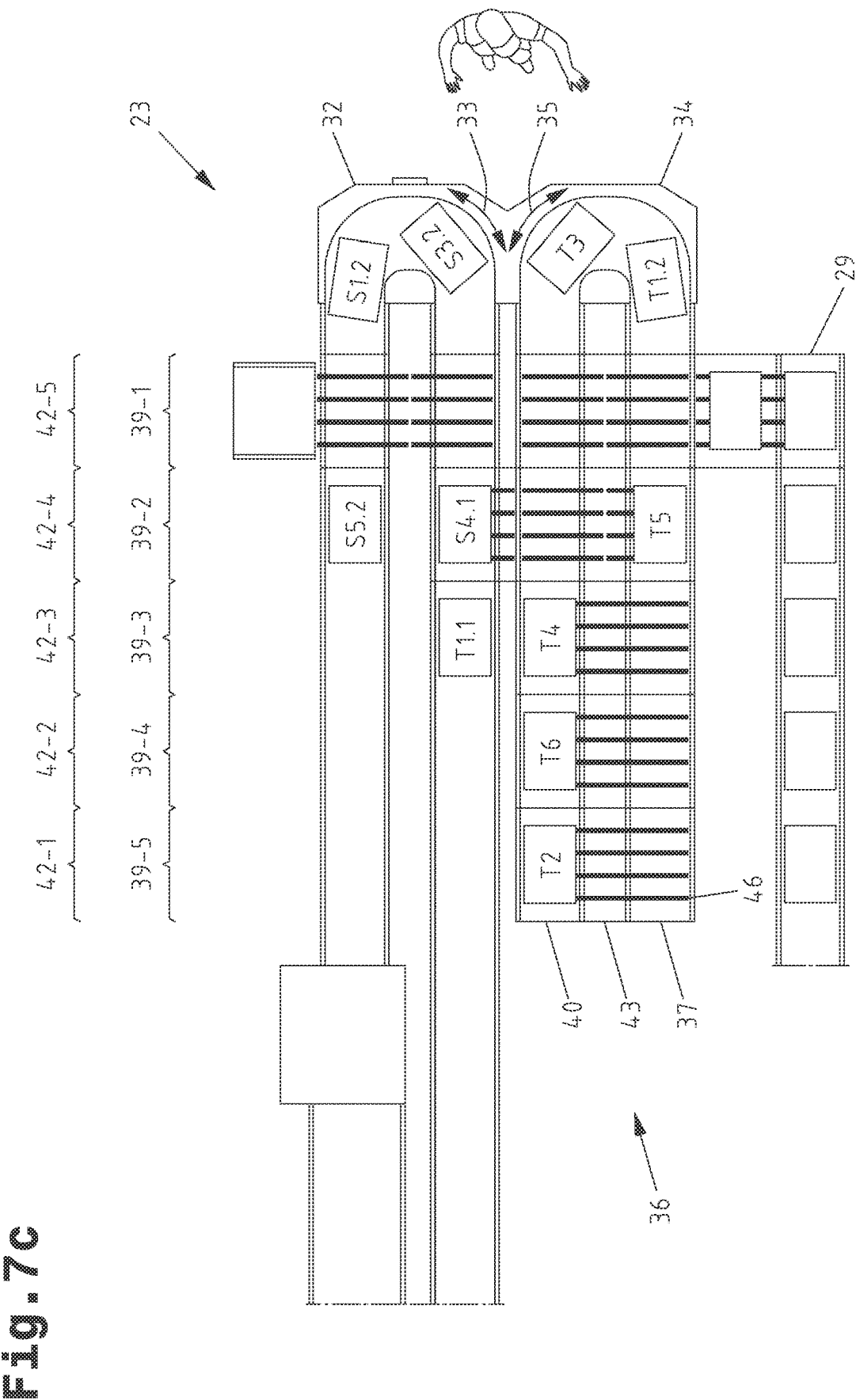
Figure 7D:
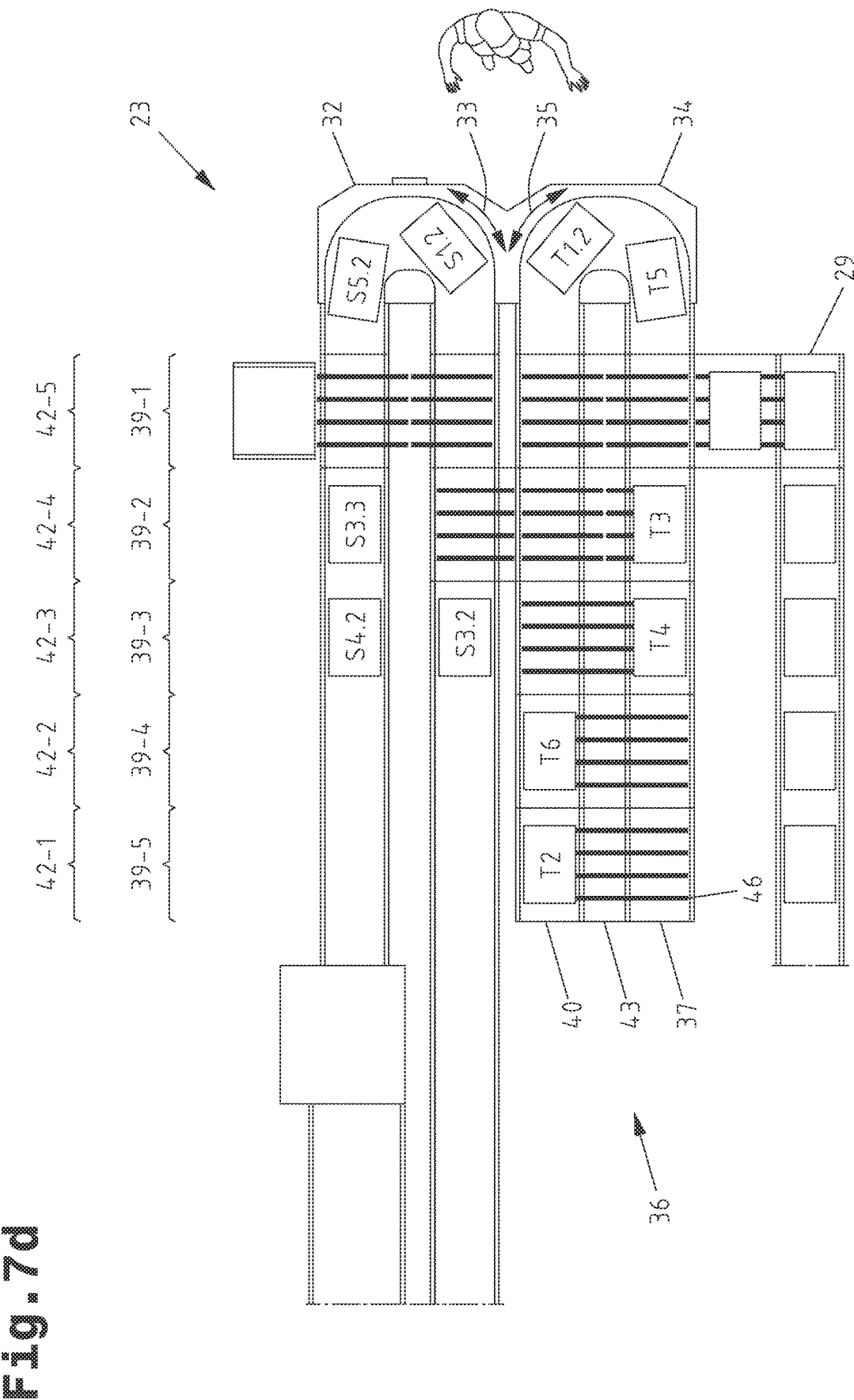

As can be seen in FIG. 7c, after that the target container "T3" is provided at the loading position 35, and the source container "S3.2" is provided at the retrieval position 33 in the manner described above. Beforehand, an item was retrieved from the source container "S4.1" for the first order line (item 1) and placed in the target container "T4." The source container "S4.1" is transported to the source container conveyor system and placed in line behind the target container "T1.1."

Finally, the empty target container "T1.2" is provided at the loading position 35 and the source container "S1.2" is provided at the retrieval position 33 in the manner described above, as shown in FIG. 7d. After that, the at least one item for the second order line (item 2) is retrieved from the source container "S1.2" and placed in the target container "T1.2." After the last retrieval of an item from the source container "S1.2" and placement of this item into the target container "T1.2," a control signal is triggered, and the process proceeds in the manner described above. Therefore, the target container "T1.2" is transported into the sorting buffer 36 or to the target container conveyor system. The source container "S1.2" is transported to the source container conveyor system.

In the following, a method is described for picking of returned items on the basis of the picking station 2 described above in FIGS. 1 and 2. The picking station(s) 2 and the picking system can be used either in an order picking mode for picking of items from the source containers 5 into target containers 27 or in a return mode for picking of returned items from returned-item containers 53 into the source containers 5. Accordingly, the disclosure must be transferred analogously to this embodiment.

For reasons of better intelligibility, the modified nomenclature is specified in FIG. 8. In return mode, the retrieval position 33 is used as loading position 35 for provision of the source containers 5, the loading position 35 is used as retrieval position 33 for provision of the returned-item containers 53, the target container distribution system is used as returned-item container distribution system 4' for delivery of the filled returned-item containers 53 to the retrieval position 33 and for removal of emptied returned-item containers 53 from the retrieval position 33. The returned-item container distribution system comprises a returned-item conveyor system. The returned-item conveyor system can comprise, for example, a first conveyor device 29' for delivery of filled returned-item containers 53 to the relevant picking station(s) 2 and a second conveyor device 30' for removal of empty returned-item containers 53 from the relevant picking station(s) 2. The returned-item container distribution system 4', in particular the first conveyor device 29' for delivery of filled returned-item containers 53, can also connect to the sorting buffer 36. The first conveyor device 29' can also be connected to the source container distribution system, in particular the fifth conveyor device. In this case, returned-item containers 53 can, for example, also be delivered from the warehouse 1 or from a staging position 54 connected to the source container distribution system. The returned items are provided at the staging position 54.

In the jointly described FIGS. 9a to 9f, a method is described for picking of returned items at a picking station 2 at which return orders are processed.

In the exemplary embodiment shown, a staging position 54 is provided that connects to the returned-item container distribution system 4' for delivery of the filled returned-item containers 53. Returned-item containers 53 are provided at the staging position 54. In this regard, the returned items can have already been placed in the returned-item containers 53, or the returned items are manually/automatically placed in the returned-item containers 53 there.

The returned-item container 53 is preferably subdivided by partitions into multiple compartments and can hold different types of returned items, wherein a returned-item type "A" can be held in the first compartment, and a returned-item type "B" can be held in the second compartment. As a matter of principle, it is also possible that the returned-item types are contained in the returned-item container 53 as loose goods. Hence at least some of the returned-item containers 53 contain a multiplicity of different types of returned items in each case.

At the staging position 54, the returned-item containers 53 to be processed and the returned items that are placed in the returned-item containers 53 are identified and return orders are electronically acquired at a computer (not shown). The return orders are transmitted to the control unit 26 (FIG. 1) and are present as data records. The returned-item container 53 contains the returned items for multiple return orders. Each return order comprises at least one returned item. The control unit 26 determines, from the existing source containers 5 in the warehouse 1, which of these source containers 5 the returned item can be assigned to. At this point, the returned item and the source container 5 are linked by data means to one another.

After that, the returned-item containers 53 are transported from the staging position 54 to the sorting buffer 36 and to one of the sorting positions 42.

As described above, the source containers 5 are retrieved from the warehouse 1 in a random (chaotic) sequence, and are conveyed to the loading position 35 in a random (chaotic) sequence. The sequence in which the source containers 5 are conveyed to the loading position 35 may differ from the sequence in which the source containers 5 are retrieved from the warehouse 1. Preferably, each of the source containers 5 stores a single item type. This is referred to as so-called "single-product" source containers 5. Even though the source containers 5 are delivered to the loading position 35 in a random sequence, this sequence is detected at the sequence determination point 52 (FIG. 1). The returned-item containers 53 are sorted in and by the sorting buffer 36 into a sequence that is determined by the sequence of the source containers 5.

In FIG. 9a, the source container "S1" for the returned item "R1" is located at the loading position 35, and the returned-item container "R1, 2" is located at the retrieval position 33. The returned item "R1" is retrieved from the returned-item container "R1, 2" and placed in the source container "S1."

If the picking is carried out by an order picking person, then an input and output system 51 having a confirmation key and a display is provided. The display comprises a display field by means of which a numeric or alphanumeric (visual) output of picking instructions can be accomplished. For example, which returned items are to be retrieved from the returned-item container "R1, 2" and placed in the source container 5 is indicated on the display for the order picking person. In the example shown, the returned items "R1" are to be retrieved. After the last retrieval of an item from the returned-item container "R1, 2" or after the last placement of a returned item into the source container "S1," a control signal is triggered if the order picking person presses the confirmation key on the input and/or output system 51.

After the last (manual or automatic) retrieval of an item from the returned-item container "R1, 2," a control signal is triggered. With this control signal, at least the buffer track section 23 and the conveyor unit 49 on the delivery device 32 and the conveyor unit 50 on the delivery device 34 and the conveyor unit 45 on the conveyor device 40 are controlled by the control unit 26 such that the source container "S1" is transported away from the loading position 35, the source container "S3" is delivered to the loading position 35, the previously processed returned-item container "R1, 2" is transported away from the retrieval position 33, and the yet-to-be processed returned-item container "R3, 4" is delivered to the retrieval position 33.

In addition, it can be seen that the returned-item container "R7, 8" has already been moved from one of the sorting positions 42-4 to one of the buffer positions 39-4 after at least one of the source containers "S7, S8" assigned to these returned items for placement of a returned item (for a return order) has been transported into the buffer track section 23. In contrast, the returned-item containers "R9, 10, R11" are temporarily buffered at the sorting positions 42-1, 42-3 at least until the source containers "S9, S10, S11" for placement of the returned items (for a return order) assigned to these returned items are conveyed into the buffer track section 23. It is also possible within the scope of the invention that some of the returned-item containers, for example the returned-item container "R11," contain only one type of returned item. However, the other returned-item containers, for example the returned-item containers "R1, 2 to R9, 10," contain different types of returned items, which significantly increases the efficiency of the picking system for picking of returned items.

Figure 9B:
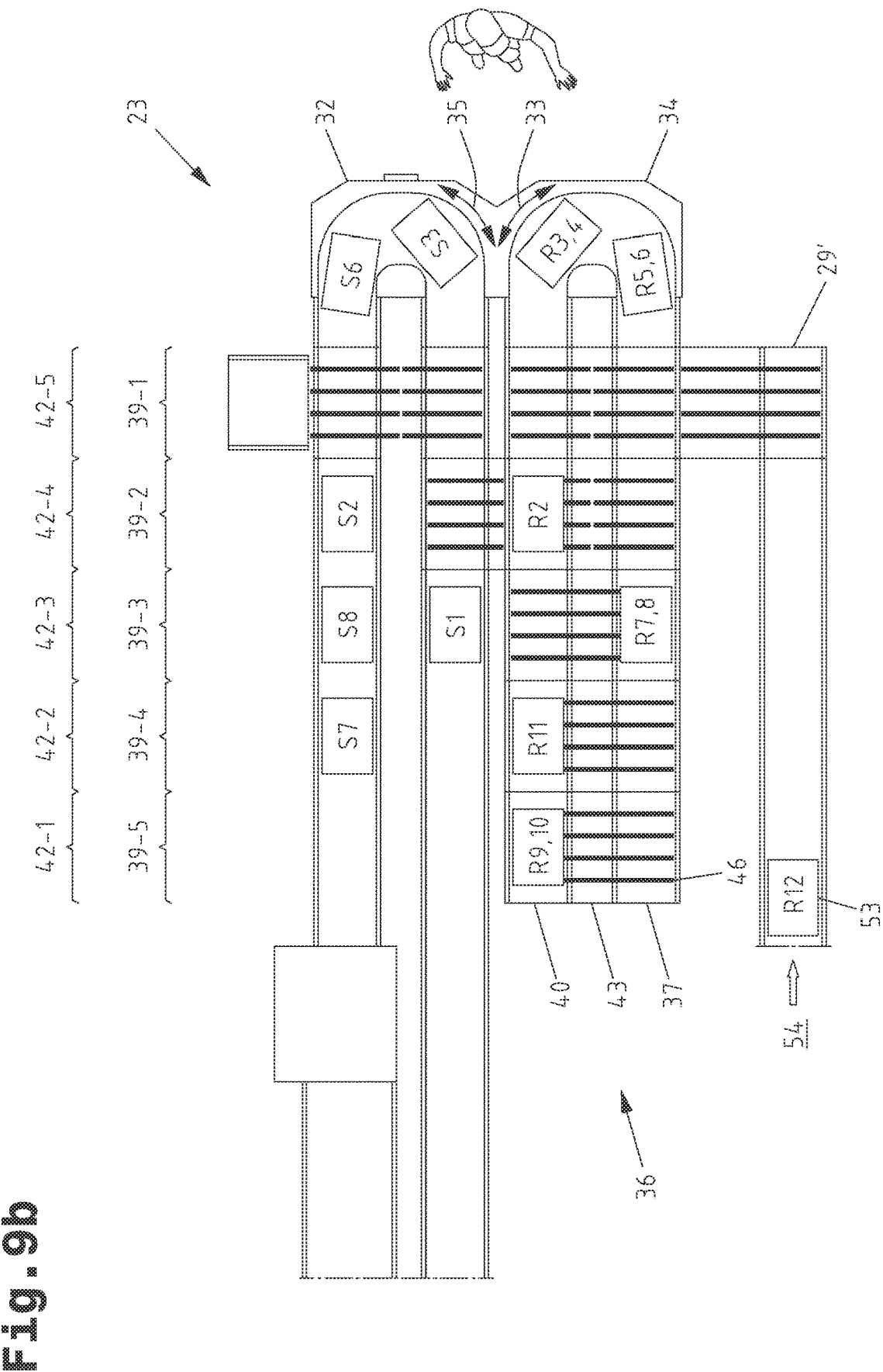

As can be seen in FIG. 9b, the previously processed returned-item container "R1, 2" is transported from the retrieval position 33 back into the sorting buffer 36 and to a sorting position 42-4 determined by the control unit 26, since the returned item "R2" is still contained in the returned-item container. The source container "S1" is transported away from the loading position 35 on the source container conveyor system, and returned to stock in the warehouse 1. The source container "S1" now contains the inventory items and the returned item.

If the source container "S3" is provided at the loading position 35 and the returned-item container "R3, 4" is provided at the retrieval position 33, then the returned item "R3" can be retrieved from the returned-item container "R3, 4" and placed in the source container "S3." After the (manual or automatic) retrieval of the returned item(s) from the returned-item container "R3, 4," a control signal is triggered. With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S3" is transported away from the loading position 35, the source container "S6" is delivered to the loading position 35, the previously processed returned-item container "R3, 4" is transported away from the retrieval position 33, and the yet-to-be processed returned-item container "R5, 6" is delivered to the retrieval position 33. The source container "S3" is transported away via the source container conveyor system. The previously processed returned-item container "R3, 4" is transported from the retrieval position 33 back into the sorting buffer 36 and to a sorting position 42-4 determined by the control unit 26, since the returned item "R4" is still contained in the returned-item container. The returned-item container "R7, 8" is transported from the buffer position 39-4 to the buffer position 39-3 by the conveyor unit 44.

As is also shown in this Fig., a returned-item container "R12" is provided at the staging position 54 and delivered to the returned-item container distribution system 4'. This returned-item container "R12" is transported by the returned-item container distribution system 4' to the sorting buffer 36, as described below.

Figure 9C:
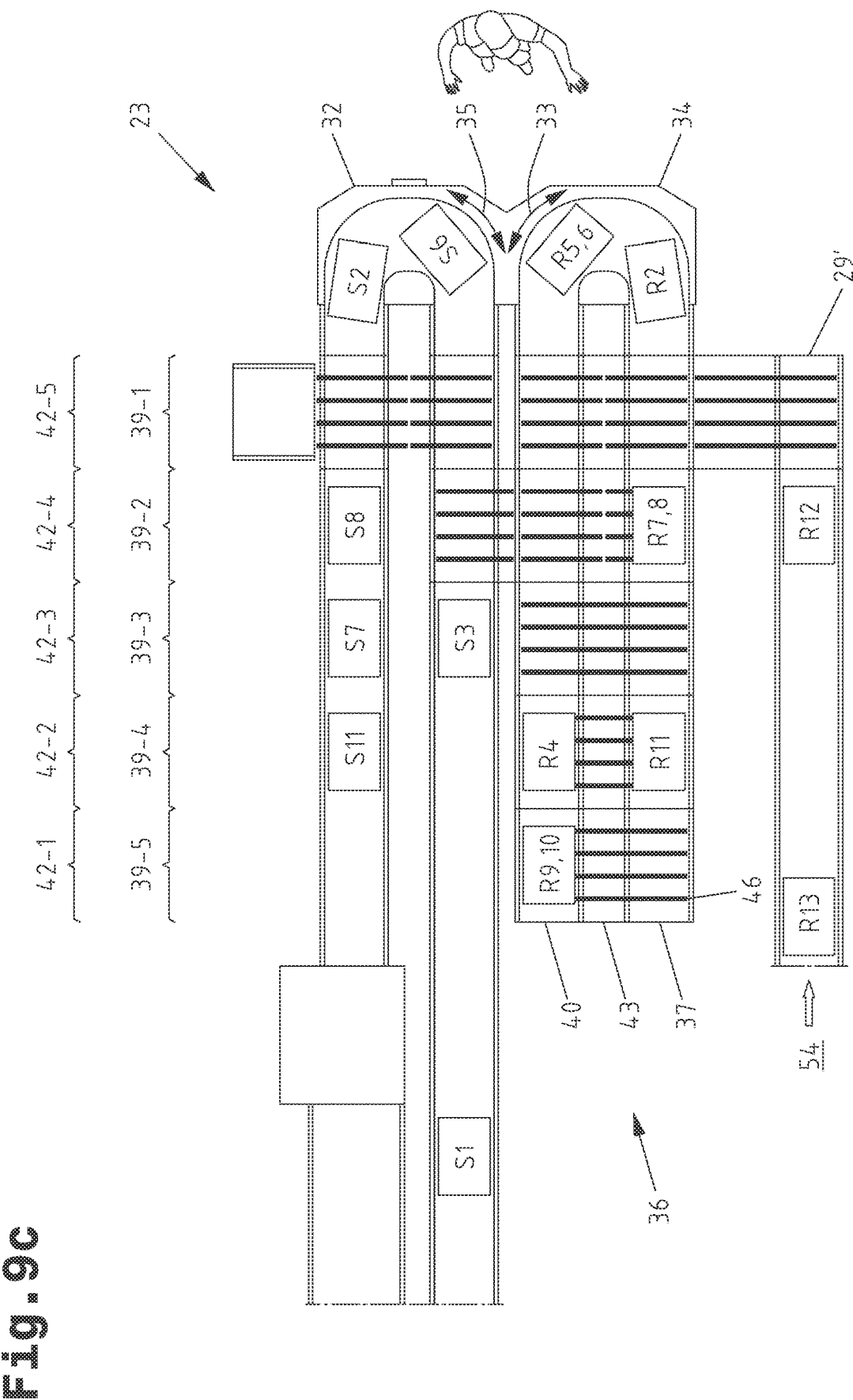

As can be seen in FIG. 9c, the returned-item container "R2" can be moved directly from the sorting position 42-4 to one of the buffer positions 39-2 determined by the control unit 26, and after that to the delivery device 34 once the source container "S2" has been transported into the buffer track section 23. Transport of the returned-item container "R2" from one of the sorting positions 42-4 to one of the buffer positions 39-2 is accomplished by means of the conveyor unit 46, 47 of one of the third conveyor devices 43. The conveyor unit 46, 47 is controlled by the control unit 26 in this process. The returned-item container "R2" is moved past the returned-item containers "R9, 10, R4" temporarily buffered at the sorting positions 42-1 to 42-2 in the sorting buffer 36. Consequently, a sorting process is performed by the sorting buffer 36 via the sorting positions 42-1 to 42-5. In the meantime, the source container "S11" has been transported into the buffer track section 23. Consequently, the returned-item container "R11" can also be moved from one of the sorting positions 42-2 to one of the buffer positions 39-4 by the conveyor unit 46 of one of the third conveyor devices 43. The returned-item container "R7, 8" is transported from the buffer position 39-3 to the buffer position 39-2 by the conveyor unit 44.

If the source container "S6" is provided at the loading position 35 and the returned-item container "R5, 6" is provided at the retrieval position 33, then the returned item "R6" can be retrieved from the returned-item container "R5, 6" and placed in the source container "S6." After the (manual or automatic) retrieval of the returned item(s) from the returned-item container "R5, 6," a control signal is triggered. Consequently, the source container "S6" can be transported away from the loading position 35, the source container "S2" can be delivered to the loading position 35, the previously processed returned-item container "R5, 6" can be transported away from the retrieval position 33, and the yet-to-be processed returned-item container "R2" can be delivered to the retrieval position 33 in the manner described above. The source container "S6" is transported away via the source container conveyor system. The previously processed returned-item container "R5, 6" is transported from the retrieval position 33 back into the sorting buffer 36 and to a sorting position 42-2 determined by the control unit 26, since the returned item "R5" is still contained in the returned-item container.

Figure 9D:
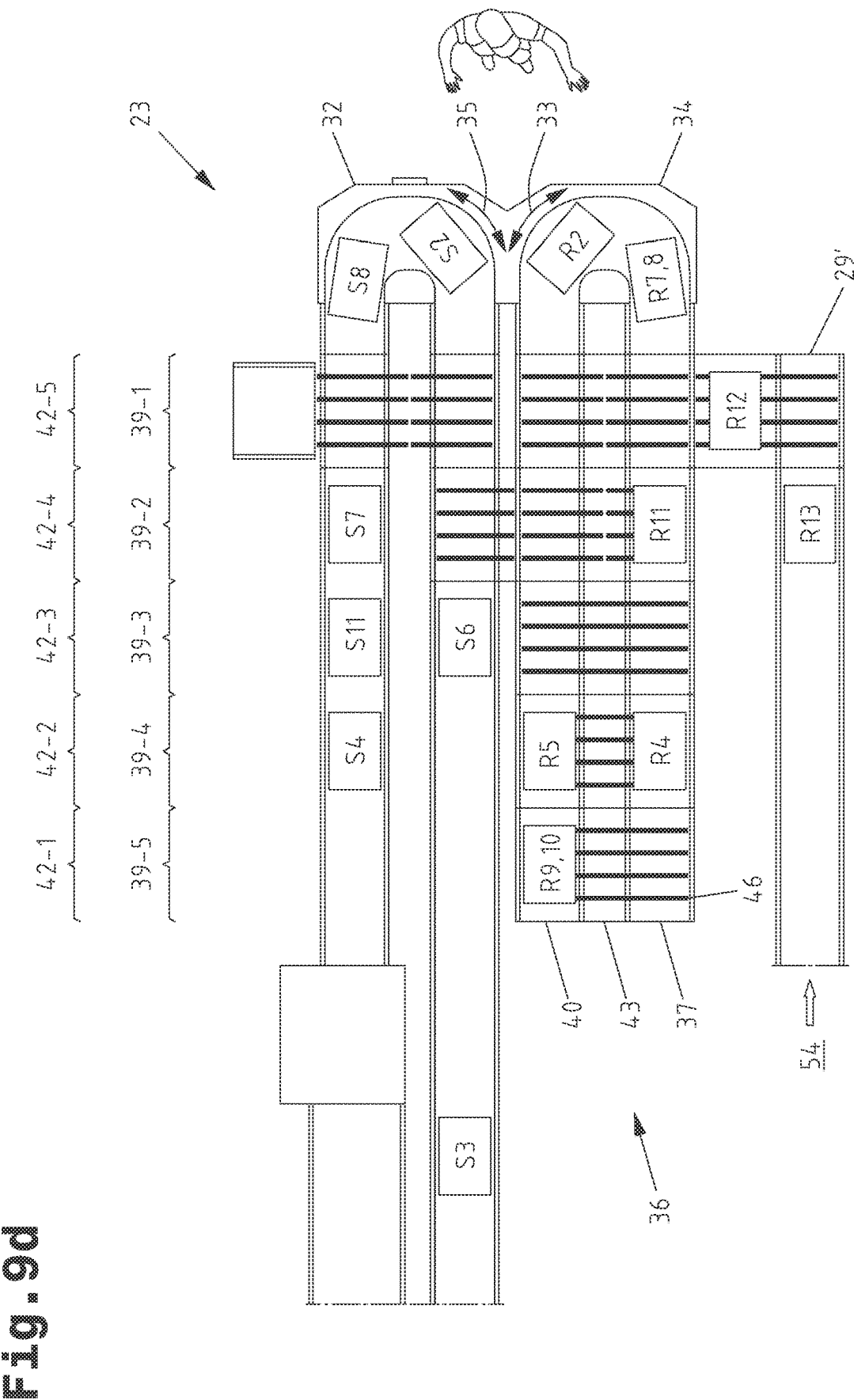

As can be seen in FIG. 9d, the source container "S2" for the returned item "R2" is located at the loading position 35, and the returned-item container "R2" is located at the retrieval position 33. The returned item "R2" is retrieved from the returned-item container "R2" and placed in the source container "S2." After the (manual or automatic) retrieval of the last returned item from the returned-item container "R2," a control signal is triggered.

Figure 9E:
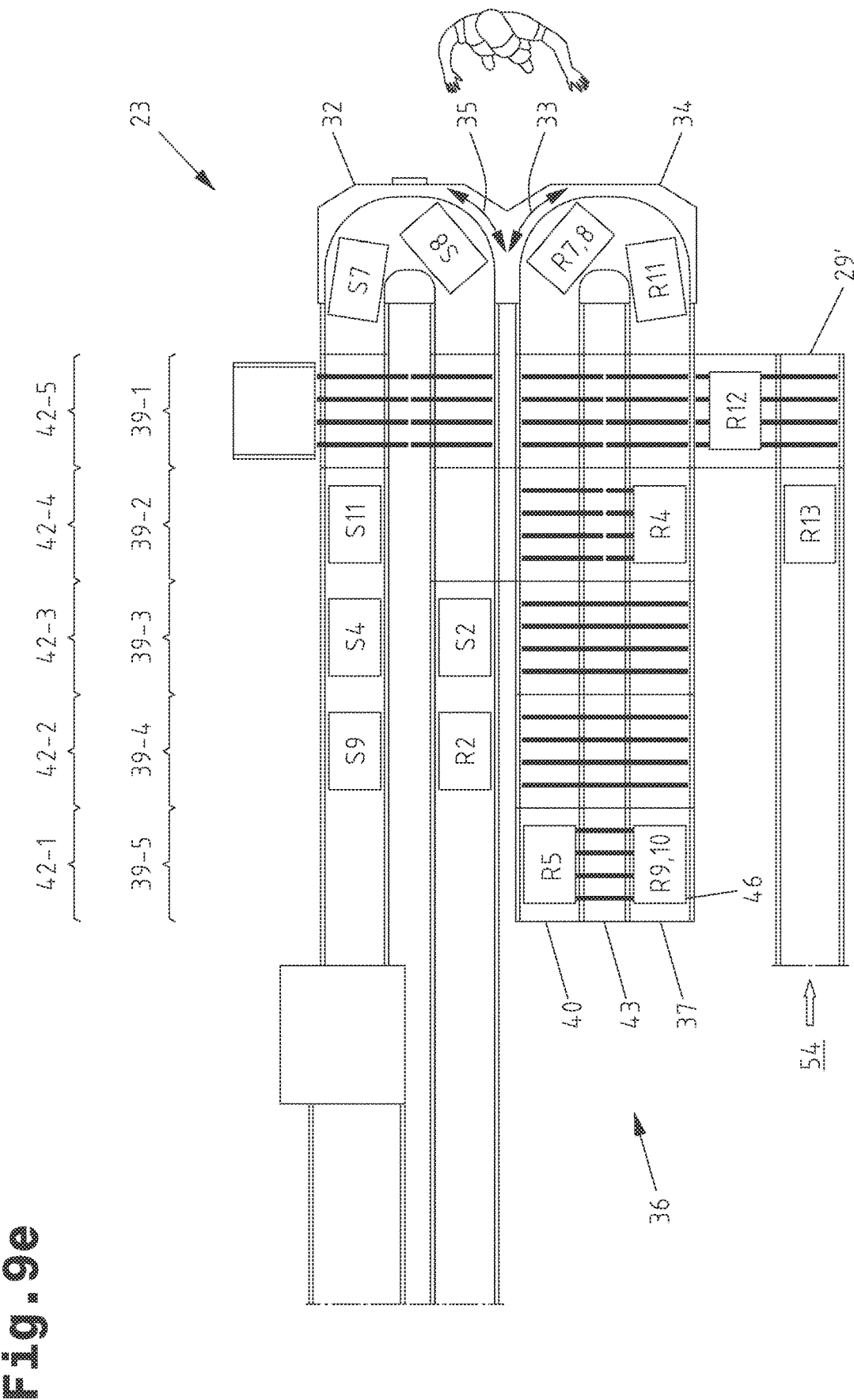

With this control signal, at least the buffer track section 23 and the conveyor unit 49 on the delivery device 32 and the conveyor unit 50 on the delivery device 34 and the conveyor unit 45 of the conveyor device 40 are controlled by the control unit 26 such that the source container "S2" is transported away from the loading position 35, the source container "S8" is delivered to the loading position 35, the previously processed (empty) returned-item container "R2" is transported away from the retrieval position 33, and the yet-to-be processed returned-item container "R7, 8" is delivered to the retrieval position 33. The source container "S2" is transported away via the source container conveyor system. The returned-item container "R2," which was completely emptied for this return order, is transported on the returned-item container conveyor system. Transport of the returned-item container "R2" from the retrieval position 33 on the returned-item conveyor system is accomplished by the conveyor unit 45 of the second conveyor device 40, the conveyor unit 47 at the sorting position 42-4, and the conveyor unit 31 of the conveyor system 30, as can be seen in FIG. 9e. Preferably the source container conveyor system is also used as returned-item conveyor system, and the returned-item container "R2" is discharged from the conveyor system 30 to the conveyor system 13 before or after the source container "S6," as depicted in FIG. 9e. The empty returned-item container "R2" is transported to an empty container collecting station (not shown) so that it can be reused later as a returned-item container 53.

As can be seen in FIG. 9f, the returned-item container with the returned item "R12" is transported to the sorting buffer 36 by the optional conveyor device 29'. After that, the returned-item container "R12" is transferred to the sorting buffer 36, wherein the control unit 26 controls the conveyor unit 47 for the buffer position 39-1 and the conveyor unit 47 for the sorting position 42-5 such that the returned-item container "R12" is transported to the sorting position 42-5 by the conveyor device 29'. After that, the returned-item container "R12" can be transported via the conveyor unit 45 to a free sorting position 42-1 to 42-5 determined by the control unit 26, for example the sorting position 42-1.

As a matter of principle, it would also be possible that the returned-item container "R12" is transported directly to the retrieval position 33 by the conveyor device 29'. This may be the case when a first returned-item container 53 of a number of returned-item containers 53 is to be processed, wherein it is necessary to ensure that the source container 5 assigned to this returned-item container 53 can likewise be provided.

In this way, the return orders are processed sequentially.

On the basis of this exemplary embodiment, it will be perceived that a first returned-item container 53 for processing of return orders is transported back into the sorting buffer 36 after placement of a returned item for a first return order, and is temporarily buffered at a first sorting position 42 at least until a source container 5 for placement of a returned item for a second return order is conveyed onward into a buffer track section 23 provided upstream of the loading position 35. The said first returned-item container 53 can be moved from the first sorting position 42 to one of the buffer positions 39 and subsequently to the retrieval position 33 once the source container 5 for placement of a returned item for a second return order has been transported into the buffer track section 23.

In this case, according to a first approach, the returned-item container "R2," for example, is moved to the retrieval position 33 immediately after having been transported to the buffer position 39 (see, for example, FIGS. 9b to 9d). According to a second approach, the returned-item container "R11," for example, is placed in line ahead of another returned-item container "R4" in the sequence of the returned-item containers "R2 . . . R11" at the buffer positions 39, and the said returned-item container "R4" is not moved to the retrieval position 33 until after the returned-item container "R11" in line ahead of it (see, for example, FIGS. 9c and 9d). Both approaches customarily occur in operation of the sorting buffer 36.

On the other hand, it can also be perceived on the basis of this exemplary embodiment that a second returned-item container 53 for processing of return orders is transported back into the sorting buffer 36 after placement of a returned item for a first return order, and is moved via a second sorting position 42 to one of the buffer positions 39 and subsequently to the retrieval position 33 if a source container 5 for placement of a returned item for a second return order has already been transported into the buffer track section 23 provided upstream of the loading position 35.

The returned-item containers 53 are transported in the sorted sequence and one after the other from the sorting buffer 36 to the retrieval position 33, wherein transport of the source containers 5 from the warehouse 1 to the loading position 35 and transport of the returned-item containers 53 from the sorting buffer 36 to the retrieval position 33 are matched to one another such that one source container 5 and one returned-item container 53 for one order arrive at the loading position 35 and the retrieval position 33 approximately simultaneously.

It should be mentioned at this point that it is also possible in this embodiment that the sequence of at least some source containers 5 can be modified for performance reasons as described above. The control unit 26 is equipped to evaluate the sequence of the source containers 5 that are required for processing of different return orders and are transported on the buffer track section 23, and to determine a modified sequence in which the source containers are to be transported to the retrieval position. The source containers 5 are then transported to the loading position 35 in the modified sequence.

The exemplary embodiments show possible embodiment variants of a picking system and of a method for picking of items/returned items, wherein it must be noted here that the invention is not restricted to the embodiment variants specifically shown of the same, but rather various combinations of the individual embodiment variants with one another are also possible, and this possibility for variation lies within the ability of a person skilled in the art of this technical field, on the basis of the teaching for technical action provided by the present invention. Therefore, all conceivable embodiment variants that are possible through combinations of individual details of the embodiment variant shown and described are also included in the scope of protection.

As a matter of form, it should be noted in conclusion that, for a better understanding of the structure of the picking station or picking system, it or some components thereof were shown not to scale and/or greater in size and/or smaller in size.

REFERENCE SYMBOL LIST 1 warehouse
2 picking station
3 source container distribution system
4 target container distribution system
5 source container
6 storage rack
7 aisle
8 storage location
9 storage and retrieval device
10 conveyor device
11 conveyor device
12 conveyor device
13 conveyor device
14 conveyor device
15 infeed and/or discharge device
16 transfer device
17 guideway
18 transport device
19 buffer device
20 lifting device
21 bypass buffer
22 conveyor unit
23 buffer track section
24 turning station
25 conveyor unit
26 control unit
27 target container
28 shipping area
29 conveyor device 30 conveyor device
31 conveyor unit
32 source container delivery device
33 retrieval position
34 target container delivery device
35 loading position
36 sorting buffer
37 conveyor device
39 buffer position
40 conveyor device
42 sorting position
43 conveyor device
44 conveyor device
45 conveyor unit
46 conveyor unit
47 conveyor unit
48 conveyor device
49 conveyor unit
50 conveyor unit
51 input and/or output system
52 sequence determination point
53 returned-item container
54 staging position

The invention claimed is:

1. A method for order picking of items at a picking station (2), comprising the steps:
acquisition of orders, each having one or more order lines, wherein each order line specifies at least one item by an item type and a quantity ordered,
retrieval of source containers (5) from a warehouse (1), and transport of the source containers (5) from the warehouse (1) to the picking station (2) having a single retrieval position (33),
detection of a sequence of the source containers (5) in which at least some of the source containers (5) are delivered to the retrieval position (33),
sequentially providing of the source containers (5) at the retrieval position (33),
providing of target containers (27) for orders, each having one or more order lines, in a sorting buffer (36) with a plurality of buffer positions (39) ahead of a single loading position (35),
sorting of the target containers (27) by the sorting buffer (36) into a sequence that is determined as a function of the sequence in which the source containers (5) are provided at the retrieval position (33),
transport of the target containers (27) in the sorted sequence and one after the other from the sorting buffer (36) to the loading position (35), wherein transport of the source containers (5) from the warehouse (1) to the retrieval position (33) and transport of the target containers (27) from the sorting buffer (36) to the loading position (35) are coordinated with one another such that one source container (5) and one target container (27) for one order arrive at the retrieval position (33) and the loading position (35) approximately simultaneously,
removing of an item from the source container (5) that is provided at the retrieval position (33), and placing of the item in the target container (27) that is provided at the loading position (35), in accordance with an order,
return transport of a target container (27) from the loading position (35) into the sorting buffer (36) if the order assigned to this target container (27) still contains an unprocessed order line,
wherein
a first target container (27) for processing of different order lines for at least one order is transported back into the sorting buffer (36) after placing of an item for a first order line, and is temporarily buffered at a first sorting position (42) at least until a source container (5) with an item for a second order line is conveyed into a buffer track section (23) provided upstream of the retrieval position (33), and said first target container (27) is moved from the first sorting position (42) to one of the buffer positions (39) and subsequently to the loading position (35) once the source container (5) having an item for a second order line has been transported into the buffer track section (23), and
a second target container (27) for processing of different order lines for at least one order is transported back into the sorting buffer (36) after placing of an item for a first order line, and is moved over a second sorting position (42) to one of the buffer positions (39) and subsequently to the loading position (35) if a source container (5) with an item for a second order line has already been transported into a buffer track section (23) provided upstream of the retrieval position (33).

2. The method according to claim 1, comprising the steps:
retrieval of the source containers (5) from the warehouse (1) by means of a source container distribution system (3) having at least one storage and retrieval device (9) and a source container conveyor system between the warehouse (1) and the picking station (2), wherein the source container conveyor system comprises at least the buffer track section (23) for transport of the source containers (5) to the retrieval position (33),
transport of the source containers (5) in random (chaotic) sequence on the source container conveyor system from the at least one storage and retrieval device (9) to the retrieval position (33), and
determination, at a sequence determination point (52) that is located along the transport path between the at least one storage and retrieval device (9) and the retrieval position (33), of the random (chaotic) sequence of the source containers (5) that are required for processing of different order lines for at least one order.

3. The method according to claim 1, comprising the steps:
determination of a modified sequence of the source containers (5), wherein the source containers (5) are to be transported in the modified sequence to the retrieval position (33),
changing the sequence of the source containers (5) into the modified sequence by discharge, from the buffer track section (23) into a bypass buffer (21), of at least one source container (5) that is ahead in the sequence in order to move at least one source container (5) that is behind in the sequence past the at least one source container (5) in the bypass buffer (21), and by feeding of the at least one source container (5) from the bypass buffer (21) back into the buffer track section (23) in order to insert the at least one source container (5) from the bypass buffer (21) behind the at least one source container (5) in the buffer track section (23),
sequentially providing at the retrieval position (33) of at least some of the source containers (5) in the modified sequence.

4. The method according to claim 1, comprising the steps:
providing of a target container distribution system (4) having the sorting buffer (36) and a target container conveyor system having a conveyor device (29) for transport of empty target containers (27) either to the sorting buffer (36) or to the loading position (35) while bypassing the sorting buffer (36), evaluation of the sequence of the source containers (5) in the buffer track section (23) that are required for processing of order lines for different orders, evaluation of the target containers (27) present in the sorting buffer (36), triggering of a control signal once it has been ascertained that a source container (5) for processing of one or more order lines for an order is being conveyed in the buffer track section (23) and a target container (27) must be requested in addition to the target containers (27) in the sorting buffer (36), identification of the empty target container (27) and assignment to the order, transport of the empty target container (27) either to the sorting buffer (36) or to the loading position (35) after the triggering of a control signal, and by the control signal the conveyor device (29) is controlled by the control unit (26) such that the empty target container (27) is transported either to the sorting buffer (36) or to the loading position (35) for processing of the at least one order line for the order.

5. The method according to claim 1, comprising the steps:

providing of a first source container (5) at the retrieval position (33) for sequential processing of at least one first order line having multiple items for a first order, removing of an item from the first source container (5) that is provided at the retrieval position (33), and placing of the item in a first target container (27) that is provided at the loading position (35), in accordance with the first order if the first target container (27) has available space to receive the item, triggering of a control signal after the last retrieval of an item from the first source container (5) or once it has been ascertained that an item cannot be placed in the first target container (27), and by the control signal
 a conveyor device of a source container distribution system (3) arranged between the retrieval position (33) and the buffer track section (23) is controlled by a control unit (26) such that the first source container (5) is conveyed from the retrieval position (33) to the buffer track section (23),
 the buffer track section (23) and a conveyor unit (49) at the retrieval position (33) are controlled by the control unit (26) such that a second source container (5) is transported to the retrieval position (33) for processing of one or more order lines for a second order, and
 a conveyor unit (50) at the loading position (35) and a conveyor unit (31) of a target container distribution system (4) are controlled by the control unit (26) such that the first target container (27) is transported away from the loading position (35), and a second target container (27) is delivered to the loading position (35), providing of the second source container (5) at the retrieval position (33) for processing of at least one or more order lines for the second order, removing of an item from the second source container (5) that is provided at the retrieval position (33), and placing of the item in a second target container (27) that is provided at the loading position (35), in accordance with the second order, transfer of the first source container (5) from the conveyor device to the buffer track section (23), transport of the first source container (5) from the buffer track section to the retrieval position (33), repeatedly providing of the first source container (5) at the retrieval position (33) for the purpose of picking the remaining items of the first order line, removing of an item from the first source container (5) that is provided at the retrieval position (33), and placing of the item in a second target container (27) that is provided at the loading position (35), in accordance with the first order.

6. The method according to claim 5, comprising the steps:

providing of a target container distribution system (4) having the sorting buffer (36) and a target container conveyor system for transport of empty target containers (27) to the loading position (35) while bypassing the sorting buffer (36), identification of an empty target container (27) and assignment to an acquired order, request and transport of the empty target container (27) to the loading position (35) after the triggering of a control signal following the last removal of an item from the first source container (5), and by the control signal the target container conveyor system is controlled by the control unit (26) such that the empty target container (27) is transported to the loading position (35) for processing of the at least one first order line for the first order.

7. The method according to claim 1, comprising the steps:

acquisition of at least one item-specific parameter for each item of an order having one or more order lines, wherein the item-specific parameter is chosen from the group comprising measurement, weight, volume and/or geometric shape, determination of an order-specific parameter based on the one or more order lines that are processed for an order and on the item-specific parameters for each item, determination of a load-specific parameter of at least one first target container (27) into which the items for the said order are to be placed, determination of the number of second target containers (27) additionally required for processing of the said order based on the order-specific parameter and load-specific parameter if an item cannot be placed in the first target container (27), providing of at least a first source container (5) at the retrieval position (33) for processing of at least one first order line for the order, providing of the first target container (27) at the loading position (35) for processing of one or more order lines for the order, removing of an item from at least the first source container (5), and placing of the item in the first target container (27) in accordance with the order, triggering of a control signal after the delivery of an item as the last item for the first target container (27), and by the control signal a conveyor unit (50) at the loading position (35) is controlled by the control unit (26) such that the completed first target container (27) is transported away from the loading position (35) and a second target container (27) is delivered to the loading position (35), providing of at least the second target container (27) at the loading position (35) for processing of at least one order line for the order, removing of an item from the first source container (5), and placing of the item in the second target container (27) in accordance with the order.

8. The method according to claim 7, comprising the steps:
providing of a target container distribution system (4) having the sorting buffer (36) and a target container conveyor system having a conveyor device (29) for transport of empty target containers (27) to the loading position (35) while bypassing the sorting buffer (36),
identification of an empty target container (27) and assignment to an acquired order,
request and transport of the empty target container (27) to the loading position (35) after the triggering of a control signal following the delivery of an item as the last item for the first target container (27), and by the control signal the conveyor device (29) is controlled by the control unit (26) such that the empty target container (27) is transported to the loading position (35) for processing of the at least one order line for the order.

9. The method according to claim 1, comprising the steps:
acquisition of at least one item-specific parameter for each item of an order having one or more order lines, wherein the item-specific parameter is chosen from the group comprising measurement, weight, volume and/or geometric shape,
determination of an order-specific parameter based on the one or more order lines that are processed for an order and on the item-specific parameters for each item,
determination of a load-specific parameter of at least one first target container (27) into which the items for the said order are to be placed,
determination of the number of second target containers (27) additionally required for processing of the said order based on the order-specific parameter and load-specific parameter if an item cannot be placed in the first target container (27),
triggering of a control signal once it has been ascertained that an item cannot be placed in the first target container (27), and by the control signal at least one conveyor unit (47) in the sorting buffer (36) is controlled by the control unit (26) such that the first target container (27) that cannot be filled further is transported away from the sorting buffer (36) on a target container conveyor system for removal of the first target container (27),
providing of at least a first source container (5) at the retrieval position (33) for processing of at least a first order line for the order,
providing of the second target container (27) at the loading position (35) for processing of one or more order lines for the order,
removing of an item from at least the first source container (5), and placing of the item in the second target container (27) in accordance with the order.

10. The method according to claim 9, comprising the steps:
providing of a target container distribution system (4) having the sorting buffer (36) and a target container conveyor system having a conveyor device (29) for transport of empty target containers (27) to the loading position (35) while bypassing the sorting buffer (36),
identification of an empty target container (27) and assignment to an acquired order,
request and transport of the empty target container (27) to the loading position (35) after the triggering of a control signal once it has been ascertained that an item cannot be placed in the first target container (27), and by the control signal the conveyor device (29) is controlled by the control unit (26) such that the empty target container (27) is transported to the loading position (35) for processing of the at least one order line for the order.

11. A picking station (2) for picking of items, wherein the picking station (2) is connected to a source container distribution system (3) and a target container distribution system (4), the picking station (2) comprising:
a delivery device (32) for providing of a source container (5) at a single retrieval position (33),
a delivery device (34) for providing of a target container (27) at a single loading position (35),
a sorting buffer (36) configured to provide target containers (27) sorted into a sequence, having
a plurality of buffer positions (39) ahead of the single loading position (35) and arranged one behind the other in a delivery direction on a first conveyor device (37),
a plurality of sorting positions (42) arranged one behind the other in a return direction on a second conveyor device (40), and
third conveyor devices (43) connecting the sorting positions (42) with the buffer positions (39) in terms of conveying,
wherein the first conveyor device (37) and the second conveyor device (40) are connected to one another by a fourth conveyor device (48) in order to convey the target containers (27) from the sorting buffer (36) to the loading position (35), and to convey them away from the loading position (35) to the sorting buffer (36), for processing of different order lines for at least one order,
wherein the first conveyor device (37) has at least one conveyor unit (44) for transport of the target containers (27), and the second conveyor device (40) has at least one conveyor unit (45) for transport of the target containers (27),
wherein conveyor units (46, 47) for transport of the target containers (27) are assigned to the buffer positions (39) and to the sorting positions (42), and
wherein the delivery device (34) is configured with the single loading position (35) on the fourth conveyor device (48), and
a control unit (26) configured to selectively control the conveyor units (44, 45, 46, 47) so that the target containers (27) in the sorting buffer (36) are sorted into a sequence that is determined as a function of the sequence in which the source containers (5) are provided at the retrieval position (33), and so that a source container (5) and a target container (27) for an order arrive at the retrieval position (33) and loading position (35) approximately simultaneously.

12. The picking station according to claim 11, wherein the source container distribution system (3) has, connected to the buffer track section (23), a bypass buffer (21) with a conveyor unit (22), and the control unit (26) is configured to evaluate the sequence of the source containers (5) that are required for processing of different order lines for at least one order and to determine a modified sequence in which the source containers (5) are to be transported to the retrieval position (33), and the control unit (26) controls the conveyor unit (22) in order to discharge, from the buffer track section (23) into the bypass buffer (21), at least one source container (5) that is ahead in the sequence in order to move at least one source container (5) that is behind in the sequence past the source container (5) in the bypass buffer (21), and after that to feed the at least one source container (5) from the bypass buffer (21) into the buffer track section (23).

13. The picking station according to claim 11, wherein the source container distribution system (3) has, connecting to the buffer track section (23), a conveyor device with a conveyor unit (25), and the control unit (26) is configured to process a control signal after the last retrieval of an item from the source container (5), and, based on the control signal, the control unit (26) controls the conveyor unit (25) in order to convey the first source container (5) from the retrieval position (33) to the buffer track section (23) after the retrieval of the at least one item.

14. The picking station according to claim 11, wherein the target container distribution system (4) has a target container conveyor system for delivery of empty or partially picked target containers (27) to the loading position (35) and for removal of loaded target containers (27) from the loading position (35), wherein the target container conveyor system for removal of loaded target containers (27) from the loading position (35) and the source container conveyor system for removal of source containers (5) from the retrieval position (33) are connected to one another by a conveyor device (30) having a conveyor unit (31), and the control unit (26) controls the conveyor unit (31) in order to discharge the target containers (27) from the target container distribution system (4) to the source container distribution system (3).

15. The picking station according to claim 11, wherein the target container distribution system (4) has a target container conveyor system for delivery of empty or partially picked target containers (27) to the loading position (35) and for removal of loaded target containers (27) from the loading position (35), wherein the target container conveyor system for delivery of empty or partially picked target containers (27) to the loading position (35) connects to the delivery device (34) with the loading position (35), and the target container conveyor system for removal of loaded target containers (27) from the loading position (35) connects to the delivery device (34) with the loading position (35).

16. The picking station according to claim 11, wherein the target container distribution system (4) has a target container conveyor system for delivery of empty or partially picked target containers (27) to the loading position (35) and for removal of loaded target containers (27) from the loading position (35), wherein the target container conveyor system for delivery of empty or partially picked target containers (27) to the loading position (35) connects to the first conveyor device (37) or second conveyor device (40) of the sorting buffer (36), and the target container conveyor system for removal of loaded target containers (27) from the loading position (35) connects to the delivery device (34) with the loading position (35).

17. The picking station according to claim 11, wherein the delivery direction of the first conveyor device (37) and the return direction of the second conveyor device (40) are opposite.

18. The picking station according to claim 11, wherein the sorting buffer (36) has a maximum of 20 sorting positions (42) and a maximum of 20 buffer positions (39).

19. A method for picking of returned items at a picking station (2), comprising the steps:
providing of returned-item containers (53) having returned items, wherein some of the returned-item containers (53) respectively contain different returned items (mixed items),
detection (identification) of the returned-item containers (53) and returned items that are placed in the returned-item containers (53),
acquisition of return orders for the returned items,
transport of the returned-item containers (53) to a sorting buffer (36) having a plurality of buffer positions (39) ahead of a retrieval position (33),
providing of at least some returned-item containers (53) in the sorting buffer (36) for return orders,
retrieval of source containers (5) from a warehouse (1), and transport of the source containers (5) in which the returned items are to be placed from the warehouse (1) to the picking station (2) having a loading position (35),
detection of a sequence of the source containers (5) in which at least some of the source containers (5) are delivered to the loading position (35),
sequentially providing of the source containers (5) at the loading position (35),
sorting of the returned-item containers (53) by the sorting buffer (36) into a sequence that is determined as a function of the sequence in which the source containers (5) are provided at the loading position (35),
transport of the returned-item containers (53) in the sorted sequence and one after the other from the sorting buffer (36) to the retrieval position (33), wherein transport of the source containers (5) from the warehouse (1) to the loading position (35) and transport of the returned-item containers (53) from the sorting buffer (36) to the retrieval position (33) are coordinated with one another such that one source container (5) and one returned-item container (53) for one return order arrive at the loading position (35) and the retrieval position (33) approximately simultaneously,
removing of a returned item from the returned-item container (53) that is provided at the retrieval position (33), and placing of this returned item in the source container (5) that is provided at the loading position (35), in accordance with a return order,
return transport of a returned-item container (53) from the retrieval position (33) into the sorting buffer (36) if the returned-item container (53) still contains a returned item,
wherein
a first returned-item container (53) for processing of return orders is transported back into the sorting buffer (36) after placing of a returned item for a first return order, and is temporarily buffered at a first sorting position (42) at least until a source container (5) for placing of a returned item for a second return order is conveyed into a buffer track section (23) provided upstream of the loading position (35), and said first returned-item container (53) is moved from the first sorting position (42) to one of the buffer positions (39) and subsequently to the retrieval position (33) once the source container (5) for placing of a returned item for a second return order has been transported into the buffer track section (23), and
a second returned-item container (53) for processing of return orders is transported back into the sorting buffer (36) after placing of a returned item for a first return order, and the second returned-item container (53) is moved over a second sorting position (42) to one of the buffer positions (39) and subsequently to the retrieval position (33) if a source container (5) for placing of a returned item for a second return order has already been transported into the buffer track section (23) provided upstream of the loading position (35).

20. The method according to claim 19, comprising the steps:
retrieval of the source containers (5) from the warehouse (1) by means of a source container distribution system (3) having at least one storage and retrieval device (9) and a source container conveyor system between the warehouse (1) and the picking station (2), wherein the source container conveyor system comprises at least the buffer track section (23) for transport of the source containers (5) to the loading position (35), transport of the source containers (5) in random (chaotic) sequence on the source container conveyor system from the at least one storage and retrieval device (9) to the loading position (35), and determination, at a sequence determination point (52) that is located along the transport path between the at least one storage and retrieval device (9) and the loading position (35), of the random (chaotic) sequence of the source containers (5) that are required for processing of different return orders.

21. The method according to claim 19, comprising the steps:

determination of a modified sequence of the source containers (5), in which the source containers are to be transported to the loading position (35), changing the sequence of the source containers (5) into the modified sequence by discharge, from the buffer track section (23) into a bypass buffer (21), of at least one source container (5) that is ahead in the sequence in order to move at least one source container (5) that is behind in the sequence past the at least one source container (5) in the bypass buffer (21), and by feeding of the at least one source container (5) from the bypass buffer (21) back into the buffer track section (23) in order to insert the at least one source container (5) from the bypass buffer (21) behind the at least one source container (5) in the buffer track section (23), sequentially providing at the loading position (35) of at least some of the source containers (5) in the modified sequence.

22. The method according to claim 19, comprising the steps:

transport of at least some of the returned-item containers (53) from a staging position (54) to the sorting buffer (36) by a returned-item conveyor system, transfer of at least some of the returned-item containers (53) into the sorting buffer (36), transport of the returned-item containers (53) from the sorting buffer (36) to the retrieval position (33) in the sorted sequence and one after the other.

23. The method according to claim 19, comprising the steps:

transport of at least some of the returned-item containers (53) from a staging position (54) to the retrieval position (33) by a returned-item conveyor system while bypassing the sorting buffer (36).

24. A picking station (2) for picking of returned items, wherein the picking station (2) is connected to a source container distribution system (3) and a returned-item container distribution system (4'), the picking station (2) comprising:

a delivery device (32) for providing of a source container (5) at a loading position (35), a delivery device (34) for providing of a returned-item container (53) at a retrieval position (33), a sorting buffer (36) configured to provide returned-item containers (53) sorted into a sequence, having a plurality of buffer positions (39) ahead of the retrieval position (33) and arranged one behind the other in a delivery direction on a first conveyor device (37), a plurality of sorting positions (42) arranged one behind the other in a return direction on a second conveyor device (40), and third conveyor devices (43) connecting the sorting positions (42) with the buffer positions (39), wherein the first conveyor device (37) and the second conveyor device (40) are connected to one another by a fourth conveyor device (48) in order to convey the returned-item containers (53) from the sorting buffer (36) to the retrieval position (33), and to convey them away from the retrieval position (33) to the sorting buffer (36), for processing of return orders, wherein the first conveyor device (37) has at least one conveyor unit (44) for transport of the returned-item containers (53), and the second conveyor device (40) has at least one conveyor unit (45) for transport of the returned-item containers (53), wherein conveyor units (46, 47) for transport of the returned-item containers (53) are assigned to the buffer positions (39) and to the sorting positions (42), and wherein the delivery device (34) is configured with the single loading position (35) on the fourth conveyor device (48), and a control unit (26) configured to selectively control the conveyor units (44, 45, 46, 47) so that the returned-item containers (53) in the sorting buffer (36) are sorted into a sequence that is determined as a function of the sequence in which the source containers (5) are provided at the loading position (35), and so that a source container (5) and a returned-item container (53) for an order arrive at the loading position (35) and retrieval position (33) approximately simultaneously.

25. The picking station according to claim 24, wherein the source container distribution system (3) has, connected to the buffer track section (23), a bypass buffer (21) with a conveyor unit (22), and the control unit (26) is configured to evaluate the sequence of the source containers (5) that are required for processing of return orders and to determine a modified sequence in which the source containers (5) are to be transported to the loading position (35), and the control unit (26) controls the conveyor unit (22) in order to discharge, from the buffer track section (23) to the bypass buffer (21), at least one source container (5) that is ahead in the sequence in order to move at least one source container (5) that is behind in the sequence past the source container (5) in the bypass buffer (21), and after that to feed the at least one source container (5) from the bypass buffer (21) onto the buffer track section (23).

26. The picking station according to claim 24, wherein the source container distribution system (3) has, connected to the buffer track section (23), a conveyor device with a conveyor unit (25), and the control unit (26) is configured to process a control signal after the last transfer of a returned item into the source container (5), and, based on the control signal, the control unit (26) controls the conveyor unit (25) in order to convey the source container (5) from the loading position (35) to the buffer track section (23) after the transfer of the returned item.

27. The picking station according to claim 24, wherein the returned-item container distribution system (4') has a staging position for providing of the filled returned-item containers (53) and a returned-item conveyor system for delivery of the filled returned-item containers (53) to the sorting buffer (36) and for removal of emptied returned-item containers (53) from the retrieval position (33), wherein the returned-item conveyor system for removal of emptied returned-item containers (53) from the retrieval position (33) and the source container conveyor system for removal of source containers (5) from the loading position (35) are connected to one another by a conveyor device (30') with a conveyor unit (31), and the control unit (26) controls the conveyor unit (31) in order to discharge the returned-item containers (53) from the returned-item container distribution system (4') to the source container distribution system (3).

28. The picking station according to claim 24, wherein the returned-item container distribution system (4') has a staging position for providing of the filled returned-item containers (53) and a returned-item conveyor system for delivery of the filled returned-item containers (53) to the retrieval position (33) and for removal of emptied returned-item containers (53) from the retrieval position (33), wherein the returned-item conveyor system for delivery of the filled returned-item containers (53) to the retrieval position (33) connects to the sorting buffer (36) or to the delivery device (34) with the retrieval position (33), and the returned-item conveyor system for removal of emptied returned-item containers (53) from the retrieval position (33) connects to the delivery device (34) with the retrieval position (33).

29. The picking station according to claim 24, wherein the delivery direction of the first conveyor device (37) and the return direction of the second conveyor device (40) are opposite.

30. The picking station according to claim 24, wherein the sorting buffer (36) has a maximum of 20 sorting positions (42) and a maximum of 20 buffer positions (39).

\* \* \* \* \*